(12) United States Patent
Fermann et al.

(10) Patent No.: US 8,761,211 B2
(45) Date of Patent: *Jun. 24, 2014

(54) MULTI-MODE FIBER AMPLIFIER

(75) Inventors: Martin E. Fermann, Dexter, MI (US); Donald J. Harter, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/424,220

(22) Filed: Apr. 25, 2003

(65) Prior Publication Data

US 2003/0202547 A1 Oct. 30, 2003

Related U.S. Application Data

(63) Continuation of application No. 09/785,944, filed on Feb. 16, 2001, which is a continuation of application No. 09/199,728, filed on Nov. 25, 1998, now Pat. No. 6,275,512.

(51) Int. Cl.
H01S 3/08 (2006.01)
H01S 3/10 (2006.01)
H01S 3/067 (2006.01)
H01S 3/11 (2006.01)

(52) U.S. Cl.
CPC .......... H01S 3/067 (2013.01); *H01S 3/06745* (2013.01); *H01S 3/1109* (2013.01); *H01S 3/1115* (2013.01); *H01S 3/06729* (2013.01)
USPC .............. 372/6; 372/70; 359/341.3; 359/345

(58) Field of Classification Search
USPC .......... 372/6, 5, 18, 21, 26, 22, 31, 101, 102, 372/26.31, 70, 91, 92; 385/27, 28, 127, 12; 359/341.3, 345
See application file for complete search history.

(56) References Cited

U.S. PATENT DOCUMENTS 3,308,394 A 3/1967 Snitzer
3,350,654 A 10/1967 Snitzer
(Continued)

FOREIGN PATENT DOCUMENTS

DE 28 44 129 A1 4/1980
DE 44 27 005 A1 2/1995
(Continued)

OTHER PUBLICATIONS

U. Griebner, et al. "Efficient laser operation with nearby diffraction—United output from a diode-pumped heavily Ned-doped multimode fiber". Optic Letters/vol. 21, No. 4/Feb. 15, 1998.*
(Continued)

*Primary Examiner* — Hrayr A Sayadian
(74) *Attorney, Agent, or Firm* — Knobbe, Martens, Olson & Bear, LLP

(57) ABSTRACT

A laser utilizes a cavity design which allows the stable generation of high peak power pulses from mode-locked multimode fiber lasers, greatly extending the peak power limits of conventional mode-locked single-mode fiber lasers. Mode-locking may be induced by insertion of a saturable absorber into the cavity and by inserting one or more mode-filters to ensure the oscillation of the fundamental mode in the multimode fiber. The probability of damage of the absorber may be minimized by the insertion of an additional semiconductor optical power limiter into the cavity.

6 Claims, 21 Drawing Sheets

(56) References Cited

U.S. PATENT DOCUMENTS

| | | | |
|---|---|---|---|
| 3,355,674 A | 11/1967 | Hardy | |
| 3,395,366 A | 7/1968 | Snitzer | |
| 3,409,843 A * | 11/1968 | Bowness | 372/19 |
| 3,548,312 A * | 12/1970 | Strom et al. | 331/90 |
| 3,584,312 A | 6/1971 | Statz | |
| 3,599,106 A | 8/1971 | Snitzer | |
| 3,687,514 A | 8/1972 | Miller | |
| 3,729,690 A * | 4/1973 | Snitzer | 372/40 |
| 3,761,716 A | 9/1973 | Kapron | |
| 3,777,149 A | 12/1973 | Marcatili | |
| 3,779,628 A | 12/1973 | Kapron et al. | |
| 3,801,931 A * | 4/1974 | Heflinger et al. | 372/19 |
| 3,808,549 A | 4/1974 | Maurer | |
| 3,826,992 A | 7/1974 | Friedl | |
| 3,859,073 A | 1/1975 | Schultz | |
| 3,928,818 A * | 12/1975 | White | 372/33 |
| 3,973,828 A | 8/1976 | Onoda | |
| 3,978,429 A * | 8/1976 | Ippen et al. | 372/18 |
| 4,050,782 A | 9/1977 | Uchida | |
| 4,120,587 A | 10/1978 | Vali | |
| 4,204,745 A | 5/1980 | Sakai | |
| 4,260,221 A | 4/1981 | Marcuse | |
| 4,273,535 A * | 6/1981 | Yamamoto et al. | 433/216 |
| 4,447,125 A | 5/1984 | Lazay et al. | |
| 4,465,334 A | 8/1984 | Siemsen et al. | |
| 4,504,111 A | 3/1985 | Hunzinger | |
| 4,515,431 A | 5/1985 | Shaw et al. | |
| 4,546,476 A | 10/1985 | Shaw et al. | |
| 4,553,238 A | 11/1985 | Shaw et al. | |
| 4,637,025 A | 1/1987 | Snitzer et al. | |
| 4,680,767 A | 7/1987 | Hakimi et al. | |
| 4,712,075 A | 12/1987 | Snitzer | |
| 4,723,828 A | 2/1988 | Garel-Jones | |
| 4,780,877 A | 10/1988 | Snitzer | |
| 4,782,491 A | 11/1988 | Snitzer | |
| 4,787,927 A * | 11/1988 | Mears et al. | 65/390 |
| 4,812,639 A * | 3/1989 | Byren et al. | 250/201.1 |
| 4,815,079 A * | 3/1989 | Snitzer et al. | 372/6 |
| 4,817,205 A | 3/1989 | Asawa | |
| 4,829,529 A | 5/1989 | Kafka | |
| 4,835,778 A | 5/1989 | Kafka et al. | |
| 4,864,577 A * | 9/1989 | Aoshima et al. | 372/18 |
| 4,896,942 A | 1/1990 | Onstott et al. | |
| 4,913,520 A | 4/1990 | Kafka | |
| 4,923,279 A | 5/1990 | Ainslie | |
| 4,941,726 A * | 7/1990 | Russell et al. | 359/334 |
| 4,943,782 A * | 7/1990 | Stephens et al. | 359/338 |
| 4,944,591 A * | 7/1990 | McMichael | 356/460 |
| 4,955,014 A | 9/1990 | Kuppers | |
| 4,991,923 A | 2/1991 | Kino | |
| 5,005,175 A * | 4/1991 | Desurvire et al. | 372/6 |
| 5,007,059 A | 4/1991 | Keller et al. | |
| 5,008,887 A * | 4/1991 | Kafka et al. | 372/6 |
| 5,032,001 A | 7/1991 | Shang | |
| 5,036,220 A | 7/1991 | Byer et al. | |
| 5,050,183 A * | 9/1991 | Duling, III | 372/94 |
| 5,058,976 A | 10/1991 | DiGiovanni et al. | |
| 5,067,134 A | 11/1991 | Oomen | |
| 5,074,633 A | 12/1991 | Cohen et al. | |
| 5,077,483 A * | 12/1991 | Cloonan et al. | 398/45 |
| 5,077,815 A | 12/1991 | Yoshizawa | |
| 5,084,880 A * | 1/1992 | Esterowitz et al. | 372/6 |
| 5,121,460 A | 6/1992 | Tumminelli et al. | |
| 5,136,598 A * | 8/1992 | Weller et al. | 372/26 |
| 5,155,621 A | 10/1992 | Takeda et al. | |
| 5,161,050 A | 11/1992 | Grasso et al. | |
| 5,163,059 A * | 11/1992 | Negus et al. | 372/18 |
| 5,170,458 A * | 12/1992 | Aoyagi et al. | 385/127 |
| 5,175,785 A | 12/1992 | Dabby | |
| 5,181,212 A * | 1/1993 | Moberg | 372/22 |
| 5,187,759 A * | 2/1993 | DiGiovanni et al. | 385/27 |
| 5,189,676 A * | 2/1993 | Wysocki et al. | 372/6 |
| 5,222,089 A * | 6/1993 | Huber | 372/26 |
| 5,226,049 A | 7/1993 | Grubb | |
| 5,253,322 A | 10/1993 | Onishi | |
| 5,263,036 A | 11/1993 | De Bernardi et al. | |
| 5,272,560 A * | 12/1993 | Baney et al. | 359/249 |
| 5,303,314 A * | 4/1994 | Duling et al. | 385/11 |
| 5,311,603 A * | 5/1994 | Fidric | 385/11 |
| 5,319,652 A | 6/1994 | Moeller | |
| 5,321,718 A * | 6/1994 | Waarts et al. | 372/108 |
| 5,333,089 A | 7/1994 | Heidemann | |
| 5,349,602 A | 9/1994 | Mehuys et al. | |
| 5,353,363 A | 10/1994 | Keck | |
| 5,361,161 A * | 11/1994 | Baney et al. | 359/337 |
| 5,363,234 A | 11/1994 | Newhouse | |
| 5,363,386 A | 11/1994 | Smith | |
| 5,381,431 A | 1/1995 | Zayhowski | |
| 5,388,120 A * | 2/1995 | Ackley et al. | 372/99 |
| 5,400,350 A * | 3/1995 | Galvanauskas | 372/20 |
| 5,414,725 A * | 5/1995 | Fermann et al. | 372/18 |
| 5,416,862 A | 5/1995 | Haas | |
| 5,422,897 A * | 6/1995 | Wyatt et al. | 372/6 |
| 5,436,925 A * | 7/1995 | Lin et al. | 372/92 |
| 5,440,573 A * | 8/1995 | Fermann | 372/18 |
| 5,448,579 A * | 9/1995 | Chang et al. | 372/6 |
| 5,450,427 A * | 9/1995 | Fermann et al. | 372/10 |
| 5,452,394 A | 9/1995 | Huang | |
| 5,479,422 A * | 12/1995 | Fermann et al. | 372/18 |
| 5,488,619 A | 1/1996 | Injeyan | |
| 5,494,941 A | 2/1996 | Lutter | |
| 5,499,134 A * | 3/1996 | Galvanauskas et al. | 359/333 |
| 5,508,845 A | 4/1996 | Frisken | |
| 5,511,083 A | 4/1996 | D'Amato | |
| 5,513,194 A * | 4/1996 | Tamura et al. | 372/6 |
| 5,513,196 A | 4/1996 | Bischel et al. | |
| 5,517,525 A * | 5/1996 | Endo et al. | 372/21 |
| 5,539,571 A * | 7/1996 | Welch et al. | 359/344 |
| 5,541,947 A * | 7/1996 | Mourou et al. | 372/25 |
| 5,546,415 A | 8/1996 | Delfyett | |
| 5,553,163 A | 9/1996 | Nivelle | |
| 5,559,816 A | 9/1996 | Basting et al. | |
| 5,572,618 A | 11/1996 | DiGiovanni | |
| 5,574,739 A | 11/1996 | Carruthers et al. | |
| 5,585,913 A * | 12/1996 | Hariharan et al. | 356/4.09 |
| 5,617,434 A * | 4/1997 | Tamura et al. | 372/6 |
| 5,627,848 A * | 5/1997 | Fermann et al. | 372/18 |
| 5,627,854 A | 5/1997 | Knox et al. | |
| 5,633,885 A * | 5/1997 | Galvanauskas et al. | 372/25 |
| 5,659,558 A | 8/1997 | Tohmon | |
| 5,659,644 A | 8/1997 | DiGiovanni | |
| 5,663,731 A * | 9/1997 | Theodoras et al. | 342/70 |
| 5,677,769 A * | 10/1997 | Bendett | 356/440 |
| 5,689,519 A * | 11/1997 | Fermann et al. | 372/18 |
| 5,696,782 A * | 12/1997 | Harter et al. | 372/25 |
| 5,701,319 A * | 12/1997 | Fermann | 372/18 |
| 5,774,484 A | 6/1998 | Wyatt et al. | |
| 5,818,630 A * | 10/1998 | Fermann et al. | 359/341.31 |
| 5,828,802 A | 10/1998 | Stolen | |
| 5,838,702 A | 11/1998 | Byer et al. | |
| 5,841,797 A | 11/1998 | Ventrudo | |
| 5,844,927 A | 12/1998 | Kringlebotn | |
| 5,847,863 A * | 12/1998 | Galvanauskas et al. | 359/341.3 |
| 5,854,865 A * | 12/1998 | Goldberg | 385/31 |
| 5,861,970 A * | 1/1999 | Tatham et al. | 398/150 |
| 5,862,287 A * | 1/1999 | Stock et al. | 385/123 |
| 5,867,304 A * | 2/1999 | Galvanauskas et al. | 359/333 |
| 5,867,305 A | 2/1999 | Waarts et al. | |
| 5,880,877 A * | 3/1999 | Fermann et al. | 359/341.31 |
| 5,887,009 A * | 3/1999 | Mandella et al. | 372/6 |
| 5,905,745 A | 5/1999 | Grubb | |
| 5,920,668 A * | 7/1999 | Uehara et al. | 385/27 |
| 5,923,684 A | 7/1999 | DiGiovanni | |
| 5,923,686 A * | 7/1999 | Fermann et al. | 372/18 |
| 5,923,694 A * | 7/1999 | Culver | 372/69 |
| 5,953,353 A | 9/1999 | Headley | |
| 5,966,491 A | 10/1999 | DiGiovanni | |
| 5,974,060 A | 10/1999 | Byren | |
| 5,993,899 A * | 11/1999 | Robin et al. | 427/163.2 |
| 5,999,673 A | 12/1999 | Valentin et al. | |
| 6,014,249 A * | 1/2000 | Fermann et al. | 359/341.1 |
| 6,020,591 A * | 2/2000 | Harter et al. | 250/458.1 |
| 6,031,849 A | 2/2000 | Ball | |
| 6,034,975 A * | 3/2000 | Harter et al. | 372/18 |

(56) References Cited

U.S. PATENT DOCUMENTS

| | | | |
|---|---|---|---|
| 6,044,188 A | 3/2000 | Kropp | |
| 6,064,786 A | 5/2000 | Cunningham | |
| 6,072,811 A * | 6/2000 | Fermann et al. | 372/11 |
| 6,081,369 A * | 6/2000 | Waarts et al. | 359/341.33 |
| 6,097,741 A | 8/2000 | Lin | |
| 6,104,733 A | 8/2000 | Espindola | |
| 6,130,903 A * | 10/2000 | Moloney et al. | 372/50.22 |
| 6,141,143 A | 10/2000 | Marshall | |
| 6,144,484 A | 11/2000 | Marshall | |
| 6,154,310 A * | 11/2000 | Galvanauskas et al. | 359/328 |
| 6,157,763 A | 12/2000 | Grubb | |
| 6,181,463 B1 * | 1/2001 | Galvanauskas et al. | 359/330 |
| 6,185,346 B1 | 2/2001 | Asawa | |
| 6,188,705 B1 | 2/2001 | Krainak | |
| 6,198,568 B1 * | 3/2001 | Galvanauskas et al. | 359/332 |
| 6,208,458 B1 * | 3/2001 | Galvanauskas et al. | 359/345 |
| 6,212,216 B1 | 4/2001 | Pillai | |
| 6,236,498 B1 | 5/2001 | Freeman | |
| 6,236,793 B1 | 5/2001 | Lawrence et al. | |
| 6,249,630 B1 * | 6/2001 | Stock et al. | 385/123 |
| 6,252,892 B1 * | 6/2001 | Jiang et al. | 372/11 |
| 6,275,512 B1 * | 8/2001 | Fermann | 372/6 |
| 6,295,161 B1 * | 9/2001 | Bazzocchi | 359/341.33 |
| 6,301,271 B1 * | 10/2001 | Sanders et al. | 372/3 |
| 6,303,041 B1 | 10/2001 | Laming | |
| 6,304,352 B1 | 10/2001 | Cunningham | |
| 6,320,885 B1 | 11/2001 | Kawai | |
| 6,324,326 B1 | 11/2001 | Dejneka | |
| 6,327,403 B1 | 12/2001 | Danziger | |
| 6,334,011 B1 * | 12/2001 | Galvanauskas et al. | 385/22 |
| 6,356,680 B1 | 3/2002 | Kirk | |
| 6,373,867 B1 | 4/2002 | Lin | |
| 6,377,726 B1 | 4/2002 | Danziger | |
| 6,415,076 B1 | 7/2002 | DeCusatis | |
| 6,427,491 B1 * | 8/2002 | Burke et al. | 65/403 |
| 6,434,311 B1 | 8/2002 | Danziger | |
| 6,477,295 B1 * | 11/2002 | Lang et al. | 385/31 |
| 6,487,338 B2 | 11/2002 | Asawa | |
| 6,496,301 B1 * | 12/2002 | Koplow et al. | 359/337 |
| 6,501,884 B1 | 12/2002 | Golowich | |
| 6,510,265 B1 | 1/2003 | Giaretta | |
| 6,549,547 B2 * | 4/2003 | Galvanauskas et al. | 372/25 |
| 6,567,583 B2 | 5/2003 | Mettler | |
| 6,574,406 B2 | 6/2003 | Ainslie | |
| 6,751,388 B2 | 6/2004 | Siegman | |
| 6,771,856 B2 | 8/2004 | Ralph | |
| 6,885,682 B2 * | 4/2005 | Fuse et al. | 372/6 |
| 6,885,683 B1 | 4/2005 | Fermann | |
| 6,904,219 B1 * | 6/2005 | Fermann | 385/130 |
| 6,954,575 B2 * | 10/2005 | Fermann et al. | 385/128 |
| 6,956,887 B2 * | 10/2005 | Jiang et al. | 372/99 |
| 6,985,654 B2 | 1/2006 | De Barros | |
| 6,987,783 B2 | 1/2006 | Fajardo | |
| 7,043,126 B2 | 5/2006 | Guan | |
| 7,043,128 B2 | 5/2006 | DiGiovanni | |
| 7,171,074 B2 | 1/2007 | DiGiovanni | |
| 7,194,156 B2 | 3/2007 | Deliwala | |
| 7,212,745 B2 | 5/2007 | Numata | |
| 7,215,846 B1 | 5/2007 | Deliwala | |
| 7,228,032 B2 | 6/2007 | Blauvelt | |
| 7,231,114 B2 | 6/2007 | Jenkins | |
| 7,242,870 B2 | 7/2007 | Guan | |
| 7,248,762 B2 | 7/2007 | Hallemeier | |
| 2001/0024458 A1 * | 9/2001 | Fermann | 372/6 |
| 2002/0018287 A1 * | 2/2002 | Zellmer et al. | 359/341.1 |
| 2003/0202547 A1 | 10/2003 | Fermann et al. | |
| 2004/0036957 A1 | 2/2004 | Galvanauskas et al. | |
| 2005/0008044 A1 | 1/2005 | Fermann | |
| 2005/0069269 A1 | 3/2005 | Libori | |
| 2005/0157998 A1 * | 7/2005 | Dong et al. | 385/126 |
| 2005/0232313 A1 | 10/2005 | Fermann | |
| 2007/0077004 A1 | 4/2007 | DiGiovanni et al. | |
| 2007/0081764 A1 | 4/2007 | Deliwala | |

FOREIGN PATENT DOCUMENTS

| | | | |
|---|---|---|---|
| DE | 19956739 B4 | 2/2010 | |
| EP | 0 208 189 A2 | 1/1987 | |
| EP | 0 103 382 B1 | 9/1989 | |
| EP | 0352974 | 1/1990 | |
| EP | 0320990 B1 | 9/1992 | |
| EP | 0564098 | 10/1993 | |
| EP | 0 442 553 | 3/1995 | |
| EP | 0 657 974 A2 | 6/1995 | |
| EP | 0704944 A1 | 4/1996 | |
| EP | 0 569 174 B1 | 7/1996 | |
| EP | 0801827 B1 | 10/1998 | |
| EP | 01662624 A1 | 5/2006 | |
| FR | 2 441 858 | 6/1980 | |
| JP | 54121749 A | 9/1979 | |
| JP | S54-121749 A | 9/1979 | |
| JP | 61-065208 | 4/1986 | |
| JP | 62-54986 | 3/1987 | |
| JP | 63-034521 | 2/1988 | |
| JP | 02039110 A * | 2/1990 | G02B 6/36 |
| JP | 03053205 A * | 3/1991 | G02B 6/26 |
| JP | H03-238883 | 10/1991 | |
| JP | 3253823 A | 11/1991 | |
| JP | H03-253823 A | 11/1991 | |
| JP | 56-165385 | 12/1991 | 372/6 |
| JP | 04-273187 | 9/1992 | |
| JP | 4253003 | 9/1992 | |
| JP | H04-298724 | 10/1992 | |
| JP | 04-322228 | 12/1992 | |
| JP | 04-507299 | 12/1992 | |
| JP | 6059150 A | 3/1994 | |
| JP | H06-059150 A | 3/1994 | |
| JP | 07-245439 | 9/1995 | |
| JP | 08-018137 | 1/1996 | |
| JP | H08-501159 | 2/1996 | |
| JP | H8-228038 A | 3/1996 | |
| JP | H08-228038 A | 9/1996 | |
| JP | 08-304857 | 11/1996 | |
| JP | H08-340141 A | 12/1996 | |
| JP | H8-340141 A | 12/1996 | |
| JP | H09-167869 A | 6/1997 | |
| JP | H09-508239 A | 8/1997 | |
| JP | H10-186424 A | 7/1998 | |
| JP | 2002-072975 | 3/2002 | |
| JP | 2005-074104 | 3/2005 | |
| WO | WO8705118 A1 | 8/1987 | |
| WO | WO8910332 A1 | 11/1989 | |
| WO | WO 92/16037 | 9/1992 | |
| WO | WO9315536 | 8/1993 | |
| WO | WO 94/04365 | 3/1994 | |
| WO | WO 95/10868 | 4/1995 | |
| WO | WO 9520831 A1 | 8/1995 | |
| WO | WO97-21124 A1 | 6/1997 | |
| WO | WO 9721124 A1 | 6/1997 | |
| WO | WO9726571 A2 | 7/1997 | |
| WO | WO9842050 A1 | 9/1998 | |
| WO | 0169313 * | 3/2001 | |
| WO | WO9626458 | 8/2006 | |

OTHER PUBLICATIONS

Martin E. Fermann, "Single-mode excitation of multi-mode fibers with ultraviolent pulses". Optic Letters/vol. 23, No. 1/Jan. 1, 1998, pp. 52-54.*

"High Efficiency Side-Pumping of Light into Optical Fibers Using Imbedded V-Grooves," by Ripin and Goldberg, Electronics Letters, vol. 31, pp. 2204-2205 (1995).*

"Ultrawide Tunable Er Soliton Fiber Laser Amplified in Yb-Doped Fiber," by Fermann et al., Optics Letters, vol. 24, pp. 1428-1430 (Oct. 15, 1999).*

"Single-Mode Operation of a Coiled Multimode Fiber Amplifier," by Koplow et al., Optics Letter, vol. 25, pp. 442-444 (Apr. 1, 2000).*

"Single-Mode Excitation of Multimode Fibers with Ultrashort Pulses," by Fermann, Optics Letters, vol. 23, pp. 52-54 (Jan. 1, 1998).*

English Abstract of Ando.*
English Abstract of Hirayama.*

(56) References Cited

OTHER PUBLICATIONS

Tuesday Afternoon, CLEO '98, CTu03 3:00pm, "Frequency doubling of Er-doped multimode fiber compressor-amplifiers," Fermann, et al.
OFC '98 Technical Digest, Tuesday Afternoon, TuG8 3:45pm, "High power single mode fiber amplifiers using multimode fibers," Fermann, et al., pp. 39-40.
Optics Letters, vol. 23, No. 1, Jan. 1, 1998, "Single-mode excitation of multimode fibers with ultrashort pulses," Martin E. Fermann, pp. 52-54.
Berdagué, et al., *Mode division multiplexing in optical fibers*, Applied Optics, vol. 21, No. 11, Jun. 1, 1982.
Desthieux, et al., *111 kW (0.5 mJ) pulse amplification at 1.5 μm using a gated cascade of three erbium-doped fiber amplifiers*, Appl. Phys. Lett., 63 (5), Aug. 2, 1993.
Walton, et al., *Broad-bandwidth pulse amplification to the 10-μJ level in an ytterbium-doped germanosilicate fiber*.
Poole, et al., *Optical Fiber-Based Dispersion Compensation Using Higher Order Modes Near Cutoff*, Journal of Lightwave Technology, vol. 12, Nos. 10, Oct. 1994.
L. M. Yang, et al., *Upconversion chirped amplification of ultrashort pulses using a multimode Tm:ZBLAN fiber*, SPIE vol. 2377, pp. 148-156.
*Opinion Rendered for SPI Lasers plc Regarding IMA's U.S. Patent Nos. 5,818,630, 6,275,512 and 6,954,575 and IMRA's Pending Published Patent Applications '547. '044 and '458*. Fubright & Jaworski L.L.P. Mar. 2, 2006.
Lin-Mei Yang, Generation and Amplication of Ultrashort Pulses in Eribium Neodymium, and Thulium Fibers, Dissertation Abstracts International, VI. 57, No. 6, Section B, p. 3823 (Dec. 1996)(the Yang dissertation).
B. Desthieux et al., 111 kW (0.5mJ) pulse amplicfication at 1.5 μm using a Gated Cascade of Three Erbium-Doped Fiber Amplifiers, Appl. Phys. Lett., vol. 63, No. 5, 586-88 (Aug. 2, 2993)(The Desthieux publication).
Notice of Allowability dated May 26, 1998 (the '630 patent).
Apr. 25, 2003 Declaration filed in the 547 published application.
Feb. 16, 2001 Declaration filed in the '044 published application.
May 27, 2003 Preliminary Amendment filed in the '547 published application.
Jun. 10, 2003 Preliminary Amendment filed in the '547 published application.
Nov. 19, 2003 Office Action issued in the '547 published application.
Jan. 26, 2004 Response filed in the '547 published application.
Apr. 27, 2004 Notice of Allowability issued in the '547 published application.
May 20,2004 Preliminary Amendment filed in the '547 published application.
Nov. 3, 2004 Office Action Issued in the '547 published application.
Jan. 21, 2005 Response filed in the '547 published application.
Rule 132 Declaration, filed Jan. 21, 2005, in the '547 published application.
May 17, 2005 Office Action issued in the '547 published application.
Jun. 30. 2005 Interview Summary in the '547 published application.
Aug. 22, 2005 Amendment filed in the '547 published application.
Dec. 20, 2005 Office Action issued in the '547 published application.
M. Fermann, Single-mode excitation of muitimode fibers with ultrashort pulses, Optics Lett, vol. 23, No. 1.52-54 (Jan. 1, 1998).
Jan. 12, 2006 Responses filed in the '547 published application.
Rule 132 Declaration. filed Jan. 12, 2006. in the '547 published application.
Jan. 30, 2006 Information Disclosure Statement filed in the '547 published application.
M. Fermann et al., Fiber-lasers for ultrafast op[tics, App. Phys. B, vol. 65, 259-275 (1997).
Pandit, et al., *Characteristic Instability of Fibre Loop Soliton Lasers*, Electronics Letters, vol. 28, No. 5, Feb. 27, 1992.
Kelly, et al., *Source of Instability in Fibre Soliton Lasers*, Femtosecond Optics Group, Physics Dept., Imperial College, London.

Hofer, et al., *Regenerative Nd: glass amplifier seeded with a Nd:fiber laser*, Optics Letters, vol. 17, No. 11, pp. 807-809, Jun. 1, 1992.
Davey, et al., *High-speed, mode-locked, tunable, integrated erbium fibre laser*, Electronics Letters, vol. 28, No. 5, pp. 482-484, 1992.
Zimgible, *1-2 ps pulses from passively mode-locked laser diode pumped er-doped fibre ring laser*, Electronics Letters, vol. 27, No. 19, pp. 1734-1735, Sep. 12, 1991.
Gapontsev, et al., *25 kW peak power, wide-tuneable-repetition-rate and pulse duration eye-safe MOPFA laser*, Lasers and Electro-Optics, 1996, Jun. 2-7, 1996, CLEO '96.
Griebner, et al., *Efficient laser operation with nearly diffraction-limited output from a diode-pumped heavily Nd-doped multimode fiber*, Optics Letters, vol. 21, No. 4, Feb. 15, 1996.
B.J. Ainslie et al.; "The absorption and fluorescence spectra of rare-earth ions in silica-based monomode fiber," J. Lightwave Technol. 6, 287-293 1988.
Alvarez-Chavez et al.; "Mode selection in high power cladding pumped fibre lasers with tapered selection", Conf. on Lasers & Electro-Optics Tech. Digest 1999, paper CWE7.
S. Aramaki et al.; "Revised Phase Diagram for the system Al2O3-SiO2", J of the American Ceramic Society vol. 45 Is May 5, 1962 p. 229-242.
Y. Beaudoin et al.; "Ultrahigh-contrast Ti:sapphire/Nd:glass terawatt laser system", Optics Letters, vol. 17, Iss. 12, pp. 865-867 (1992).
A.L.G. Carter et al.; "Flash-condensation technique for the fabrication of high-phosphorus-content rare-earth-doped fibres", Electronics Letters vol. 28, Is 21,:pp. 2009-2011 Oct. 8, 1992.
M.L. Dennis et al.; 2-W upconversion laser in TM:ZBLAN fiber, Conf. on Lasers & Electro-Optics CLEO Techical Digest vol. 8, p. 41, 1994.
M.L. Dennis et al.; "Upconversion-pumped thulium-fiber laser at 810 nm", Optical Fiber Communications Conference OFC '94 Technical Digest WK10, 1994.
J.A. Dobrowolski et al.; "Colored filter glasses: an intercomparison of glasses made by different manufacturer", Applied Optics, vol. 16, Iss. 6, pp. 1491-1512 (1977).
E. M. Erbe et al.; "Properties of $Sm_2O_3$-$Al_2O_3$-$SiO_2$ glasses for In vivo applications", in Journal American Ceramic Society 73 (9), p. 2708-2713, 1990.
M.C. Farries et al. "A Samarium Doped Visible Glass Laser Operating at 651 nm", Proc. CLEO, Anaheim, California, Paper PD5, pp. 1-2, 1988.
M.C. Farries et al. "The Properties of the Samarium Fibre Laser", Fiber Laser Sources and Amplifiers, SPIE 1171, p. 271-278 1989.
M.C. Farries et al. "Samarium $^{3+}$-Doped Glass Laser Operating at 651 nm", Electronics Letters vol. 24 No. 11. May 26, 1988 p. 709-711.
M.C. Farries et al. "Spectroscopic and Lasing Characteristics of Samarium doped Glass Fibre", IEE Proceedings vol. 137, Pt. J. No. 5, Oct. 1990 p. 318-322.
M.C. Farries et al. "Very high-rejection optical fibre filters", Electronics Letters vol. 22, Is 21 pp. 1126-1128 Oct. 9 1986.
A. A. Fotiadi, "Dynamics of All-Fiber Self-Q-switched Ytterbium/Samarium Laser", CLEO 2007 paper CMC4.
Galvanauskaks, "Mode-Scalable Fiber Based Chirped Pulse Amplification Systems", Selected Topics in Quantum Electronics, IEEE Journal on, vol. 7 Issue: 4, Jul./Aug. 2001 pp. 504-517.
D. Gloge, "Weakly Guiding Fibers", Applied Optics vol. 10, No. 10, pp. 2252-2258, Oct. 1971.
J.P. Kohli et al.; "Formation and properties of rare earth aluminosilicate glasses", Kohli J.T., Shelby, J.E. Physics and Chemistry of Glasses 32, Is 3 (June), pp. 67-71, 1991.
J.P. Kohli et al.; "Magneto-optical properties of rare earth alumino-silicate glasses", Kohli J.T., Shelby, J.E. Physics and Chemistry of Glasses 32, Is 3 (June), pp. 109-114, 1991.
S-K Liaw et al.; "Passive gain-equalized wide-band erbium-doped fiber amplifier using samarium-doped fiber", Photonics Technology Letters, IEEE, vol. 8, Is. 7 pp. 879-881 Jul. 1996.
HR Müller et al.; "Fibers for high-power lasers and amplifiers", Comptes Rendus Physique, vol. 7, Issue 2, Mar. 2006, pp. 154-162.
R.A. Myers et al.; "Effect of Hydrogen Loading on Temperature electric-Field Poling of $SiO_2$-Based Thin-Films on Si", Electronics Letters vol. 31 Iss.18 pp. 1604-1606 Published: Aug. 31, 1995.

(56) References Cited

OTHER PUBLICATIONS

R.A. Myers et al.; "Stable second-order nonlinearity in $SiO_2$-based waveguides on Si using temperature/electric-field poling", Proceedings of SPIE 2289, pp. 158-166 (1994).
T.B. Norris "Femtosecond pulse amplification at 250 kHz with a Ti:sapphire regenerative amplifier and application to contionuum generation," Optics Letters vol. 17, No. 14, p. 1009-1011 Jul. 1992.
R. Paschotta et al.; "Lifetime quenching in Yb-doped fibres", Optics Communications vol. 136, Apr. 1, 1997 p. 375-378.
H. Po et al.; "Double-clad high brightness Nd fiber laser pumped by GaA/As phased array", Proceedings of Optical Fiber Communication '89, Postdeadline paper PD7, 1989.
Reed et al.; "30-FS Pulses Tunable Across the Visible With a 100-Khz Ti-Sapphire Regenerative Amplifier", Optics Letters vol. 20 Is. 6 pp. 605-607 Published: Mar. 15, 1995.
J-K Rhee et al.; "Chirped-pulse amplification of 85-fs pulses at 250 kHz with third-order dispersion compensation by use of holographic transmission gratings", Optics Letters vol. 19 No. 19 Oct. 1, 1994 p. 1550-1552.
C. Rouyer et al.; "Generation of 50-TW femtosecond pulses in a Ti:sapphire/Nd:glass chain", Optics Letters 18 Iss 3, 214-216 (1993).
U.C. Ryu et al.; "In-line gain control of the erbium doped fiber amplifier using samarium doped inner-cladding in the 1.5 μm region", OSA/ Optical Fiber Communication 2000 paper WA4-1.
A, Saissy et al., "Properties of $Se^{3+}$ ions in Fluorozirconate fiber", Applied Optics vol. 36 No. 24, p. 5931 Aug. 20, 1997.
J. Sakai et al.; "Bending loss of propagation modes in arbitrary-index profile optical fibers", Applied Optics 17, 1499-1506 1978.
S7010N Material Safety Data Sheet for Schott AG, Passive Glasses Laser Cavity Materials, dated Mar. 15, 2001.
S7010N Property Sheet, Schott AG, Passive Glasses Laser Cavity Materials.
P. Schultz, "Optical Absorption of the Transition elements in Vitreous Silica", J of the American Ceramic Society vol. 57, Is Jul. 7, 1974 p. 309-313.
B. Shiner et al.; "Fibre sources target automotive industry", Opto & Laser Europe, Jan. 7, 2003 article #16625 optics.org.
O. Svelto, "Principles of Lasers", 4th Edition (Translated by D. C. Hanna), p. 480-483 Springer Science and Business Media, Inc. 1998.
L. Tordella et al.; "High repetition rate passively Q-switched $Nd^{3+}:Cr^{4+}$ all-fibre laser", Electronics Letters vol. 39_(2003) pp. 1307-1308.
R.P. Tumminelli et al.; "Integrated-Optic ND-Glass Laser Fabricated by Flame Hydrolysis Deposition Using Chelates", Optics Letters vol. 16 Iss.14 pp. 1098-1100 Published: Jul. 15, 1991.
R.P. Tumminelli et al.; "Fabrication of High-Concentration Rare-Earth Doped Optical Fibers Using Chelates", J. of Lightwave Tech. vol. 8 Is 11 p. 1680-1683 Nov. 1990.
K. Wakasugi et al.; "Preparation of Glasses Containing Rare Earth Oxide by $CO_2$ Laser", J. of the Soc. of Materials Science, Japan, vol. 55, No. 7, pp. 675-678 Jul. 2006 English Abstract.
M.H. Watanabei et al.; "Fabrication of Yb2O3-5iO2 core fiber by a new process", Proceedings ECOC 1985, pp. 15-18 (IOOC-ECOC '85, Venice).
L.M. Yang et al.; "Chirped pulse amplification of ultrashort pulses using neodymium and erbium doped fiber amplifiers," Springer Series in Chemical Physics, Ultrafast Phenomena, IX, printed 1994. pp. 187-189.
H. Zellmer et al.; "Double-Clad Fiber Laser with 30W Output Power," OSA TOPS vol. 16, Optical Amplifiers and Their Applications, 1997, pp. 137-140.paper: FAW18.
H. Zellmer et al.; High-power cw neodymium-doped fiber laser operating at 9.2 W with high beam quality, Optics Letters, vol. 20, No. 6, Mar. 15, 1995, pp. 578-580.
J.E. Townsend, "The development of optical fibres doped with rare-earth ions," PhD Thesis, University of Southampton, Apr. 1990, pp. 249-252.
R.P. Tumminelli et al., File History of U.S. Appl. No. 07/648,726, issued as US Pat. No. 5121460.
Non-final Office Action in Ex Parte Reexamination 90/008,971 dated Mar. 30, 2009.
Amendment in Ex Parte Reexamination 90/008,971 under 37 C.F.R. 1.111 dated Jun. 1, 2009, with Appendix, Declaration of Dr. Wayne H. Knox, and declaration of Dr. Peter. C. Schultz.
A. Galvanauskas et al., "Generation of femtosecond optical pulses with nanojoule energy from a diode laser and fiber based system," App. Physics Letters, vol. 63, No. 13, pp. 1742-1744, Sep. 27, 1993.
A. Galvanauskas: "Compact ultrahigh-power laser systems", SPIE vol. 2377, S-117 to S-126, Apr. 1995.
H.A. Haus et al., "Self-Starting of passively mode-locked lasers," Optics Letters, vol. 16, No. 17, Sep. 1, 1991, pp. 1331-1333.
H. Lin et al., "Colliding-pulse mode-locked lasers using Er-doped fiber and a semiconductor saturable absorber," CLEO 1995 paper JTuE1.
D. B. Mortimore, et al, Low-Loss Joints between Dissimilar Fibres by Tapering Fusion splices, Electronics Letters, vol. 22, No. 6, pp. 316-319, Mar. 13, 1986.
English translation of Office Action mailed Dec. 15, 2008 for Japanese Application No. H11-334914.
English translation of Office Action dated Feb. 3, 2009 for German Application No. 199 56 739.5-54.
Office Action dated Feb. 6, 2009 for German Application No. DE199 61 376.8-54.
Office Action dated Mar. 9, 2009 for German Application No. 198 61 429.2-54.
International Search Report and Written opinion for International Appl. No. PCT/US2008/074668 dated Jan. 27, 2009.
Alcock et al., Improved systolic array for linear discriminant function classifier, L. P. Alcock; A. C. Trooper; A. I. Ferguson; D. C. Hanna, Electronics Letters, vol. 22 Is. 2 p. 84-85 (Jan. 1986).
Arbore et al. Frequency doubling of femtosecond erbium-fiber soliton lasers in periodically poled lithium niobate, Optics Letters, vol. 22, No. 1, Jan. 1, 1997, pp. 13-15. (3 pages).
Cho et al., 100 uJ and 5.5 W Yb-fiber femtosecond chirped pulse amplifier system..G.C. Cho et al, A. Galvanauskas, M.E. Fermann, M.L. Stock, D. Harter. Source: CLEO 2000 Technical Digest Series, paper CMW2 p. 118, May 2000.
Dhahri et al., Laser Welding of AZ91 abd WE43 Magnesium Alloys for Automotive and Aerospace Industries, M. Dhahri, J. Masse, J. F. Mathieu, G. Barreau, M. Autric, Advanced Engineering Materials, Feb. 2001, 3 No. 7, p. 504.
Digonnet et al., Nd:YAG single crystal fiber lasers, M. J. F. Digonnet; H. J. Shaw, Second European Conference on Integrated Optics (Oct. 1983).
Fermann et al., Ultrafast pulse sources based on mult-mode optical fibers, Applied Physics B, 70 (Suppl) p. S13-S23, May 24, 2000.
Galvanauskas et al., Generation of diffraction-limited femtosecond beams using spatially-multimode nanosecond pump sources in parametric chirped pulse amplification systems. A. , CLEO May, 2000 CThB4.
Galvanauskas et al., Generation of high-energy femtosecond pulses in multimode-core Yb-fiber chirped-pulse amplification systems, A. Galvanauskas et al, Optics Letters vol. 26, No. 12 p. 935, Jun. 15, 2001.
Galvanauskas et al. Fiber-laser-based femtosecond parametric generator in bulk periodically poled LiNbO3, A. Galvanauskas , Optics Letters, vol. 22, No. 2, Jan. 15, 1997, pp. 105-107. (3 pages).
Gapontsev et al., 3W saturation power polarisation maintaining 1060 nm ytterbium fiber amplifier, V. P. Gapontsev; N. S. Platonov; M. Vyatkin; M. Meleshkevitch; D. Spinov; I. Zaitsev, SPIE, vol. 3615 (Jan. 1999).
Haas et al. A mode-filtering Scheme for Improvement of the Bandwidth-Distance Product in Multimode fiber systems, Z. Haas, J. of Lightwave Technology vol. 11, No. 7, Jul. 1993 pp. 1125-1131.
H.A. Haus et al, The master equation of mode-locking, CtuA1 tutorial CLEO 99 May 25, 1999, p. 57.
Imasaka et al., Optical Chromatography. A new tool for separation of particles; Analusis Magazine 1998, 26, No. 5 p. M53.
Johnston et al. $M^2$ concept characterizes beam Quality, T. F. Johnston, Jr., Laser Focus World, May 1990 p. 173.

(56) References Cited

OTHER PUBLICATIONS

Kliner et al., Polarization-maintaining amplifier employing double-clad bow-tie fiber, Kliner, DAV; Koplow, JP; Goldberg, L; Carter, ALG; Digweed, JA Optics Letters vol. 26 Is 4 p. 184 39128, Feb. 15, 2001.

Koplow et al.,Polarization-maintaining, double-clad fiber amplifier employing externally applied stress-induced birefringence, Koplow, JP; Goldberg, L; Moeller, RP; Kliner, DAV, Optics Letters vol. 25 Is 6 p. 387 39156, Mar. 15, 2000.

Marsico et al, Laser Welding of lightweight Structural Steel Panels, T.A Marsico et al, 444/ICALEO (1993) Conference.

Menyuk et al., Stability of solitons in birefringent optical fibers. II. Arbitrary amplitudes, Optical Society of America, vol. 5, No. 2, Feb. 1988, pp. 392-402.

Morkel et al. Theoretical modeling of erbium-doped fiber amplifiers with excited-state absorption, P. Morkel, Optics Letters, vol. 14, Is.19, pp. 1062-1064 Oct. 1989.

Beam Quality of the Fiber Output in http://www.rp-photonics.com/fiber_coupled_diode_lasers.html dated Nov. 10, 2008.

Nelson et al., Efficient frequency doubling of a femsecond fiber laser, Optics Letters, vol. 21, Is.21, pp. 1759-1761 (Nov. 1, 1996).

Nilsson et al., Modeling and optimization of low-repetition-rate high-energy pulse amplification in cw-pumped erbium-doped fiber amplifiers, J. Nilsson; B. Jaskorzynska, Optics Letters, vol. 18 Is. 24 p. 2099-2101 (Dec. 15, 1993).

Ober et al., Widely tunable femtosecond neodymium fiber laser, M.H. Ober et al., Optics Letters vol. 20, No. 22 Nov. 15, 1995, p. 2303.

Ortigosa-Blanch et al., Highly birefringent photonic crystal fibers, A. Ortigosa-Blanch; J. C. Knight; W. J. Wadsworth; J. Arriaga; B. J. Mangan; T. A. Birks; P. St. J. Russell, Optics Letters, vol. 25 Is. 18 p. 1325-1327 (Sep. 15, 2000).

Poole et al., Optical Fiber-Based dispersion compensation Using Higher Order Modes Near cutoff, Poole, J. of Lightwave Tech. vol. 12 #10, Oct. 1994.

Refi et al., Optical Fibers for Optical Networking, J.J. Refi, Bell Labs Technical Journal Jan.-Mar. 1999 p. 246-261 (Lucent Technologies).

Richardson et al., Fiber laser systems shine brightly, Richardson, D; Minelly, J; Hanna, D, Laser Focus World vol. 33 Is 9 p. 87 Sep. 1997.

Ross et al., Optical amplification of 1.06-μ $InAs_{1-x}P_x$ Injection-laser emission, B. Ross; E. Snitzer, IEEE QE, vol. QE-6 Is. 6 p. 361-366 (Jun. 1970).

Senior et al., Optical Fiber Communications: Principles and Practices, Prentice/Hall International pp. 41-42, 73-76, 138-144 (1985).

Shaklan et al. Measurement of Intermodal coupling in weakly multimode fibre optics, S. Shaklan, Elect. Letters Nov. 1990—vol. 26, # 24, 1990 p. 2022-2023.

Shiue et al., Design of double-coated optical fibers to minimize long-term hydrostatic-pressure-induced microbending losses, Sham-Tsong Shiue, Optics Letters, vol. 26 IS. 3 p. 128-130 (Feb. 2001).

Siegman et al., Defining, measuring, and optimizing laser beam quality, A. E. Siegman, SPIE, vol. 1868, Jan. 1993.

Sousa et al. Multimode Er-doped fiber for single-transverse-mode amplification, J.M Sousa, O. G. Okhotnikov, Applied Physics Letters vol. 74, No. 11, p. 1528-1530 Mar. 1999.

Spellmeyer et al., Communications performance of a multimode EDFA, Spellmeyer, NW, IEEE Photonics Technology Letters vol. 12 Is 10 p. 1337 Oct. 2000.

Spielmann et al., Ultrabroadband femtosecond lasers, C. Spielman, IEEE J. Quantum Elec. vol. 30, Is.1100 (Apr. 1994).

Stone et al., Neodymium-doped silica lasers in end-pumped fiber geometry, J. Stone; C. A. Burrus, Applied Physics Letters, vol. 23 Is. 7 p. 388-389 Oct. 1973.

Strohhofer, et al., Relationship between gain and $Yb^{3+}$-$Yb^{3+}$ doped waveguide amplifiers, Jour. of App Phys, vol. 90, No. 9, pp. 4314-4320, Nov. 1, 2001.

Tajima et al., Er3+-Doped single-polarisation optical fibres, K. Jajima, Electronic Letters, vol. 26, Is.18, pp. 1498-1499 (Aug. 30, 1990).

Yamada et al., First-order quasi-phase matched LiNbO3 waveguide periodically poled by applying an external field for efficient blue second-harmonic generation, Appl. Phys. Lett, vol. 62, p. 436, Feb. 1993.

Fermann, et al., File history of U.S. Appl. No. 08/882,349, filed Jun. 25, 1997, issued as US Patent 5,818,630 on Oct. 6, 1998.

Fermann, et al., File History of U.S. Appl. No. 09/809,248, filed Mar. 16, 2001, issued as US Patent 6,954,575 on Oct. 11, 2005.

Fermann, et al., File History of U.S. Appl. No. 10/850,509, filed May 20, 2004, now abandoned.

Defendant IPG Photonics Corporation's Motion to Stay the Litigation Pending Reexamination, Dec. 21, 2007.

Exhibit 1 to Defendant IPG Photonics Corporation's Motion to Stay the Litigation Pending Reexamination—Defendant IPG Photonics Corporation's First Set of Interrogatories (Nos. 1-13), Dec. 21, 2007.

Exhibit 2 to Defendant IPG Photonics Corporation's Motion to Stay the Litigation Pending Reexamination—Plaintiff IMRA America, Inc.'s Responses to Defendant IPG Photonics Corporation's First Set of Interrogatories (Nos. 1-13), Dec. 21, 2007.

Exhibit 3 to Defendant IPG Photonics Corporation's Motion to Stay the Litigation Pending Reexamination—Plaintiff's First Supplemental Responses to Defendant's Interrogatory Nos. 2, 5, and 6, Dec. 21, 2007.

Exhibit 5 to Defendant IPG Photonics Corporation's Motion to Stay the Litigation Pending Reexamination—Request for Ex Parte Reexamination Transmittal Form, Request for Ex Parte Reexamination of U.S. Patent No. 5,818,630 Detailed Submission, Dec. 21, 2007.

Defendant IPG Photonics Corporation's Response to Decision Sua Sponte Vacating Ex Parte Reexamination Filing Date and Replacement Request for Ex Parte Reexamination of U.S. Patent No. 5,818,630 Mar. 12, 2008.

Defendant IPG Photonics Corporation's Response to Notice of Failure to Comply with Ex Parte Reexamination Request Filing Requirements and Corrected Request for Ex Parte Reexamination of U.S. Patent No. 5,818,630, Jan. 22, 2008.

Defendant IPG Photonics Corporation's Request for Ex Parte Reexamination of U.S. Patent No. 5,818,630, Dec. 21, 2007.

Plaintiff IMRA America, Inc.'s Opposition to Defendant's Motion to Stay the Litigation Pending Reexamination, Jan. 4, 2008.

Exhibit A to Plaintiff IMRA America, Inc.'s Opposition to Defendant's Motion to Stay the Litigation Pending Reexamination—Nov. 21, 2006 LoPresti Letter to Harter (redacted), Jan. 4, 2008.

Exhibit B to Plaintiff IMRA America, Inc.'s Opposition to Defendant's Motion to Stay the Litigation Pending Reexamination—Defendant IPG Photonics Corporation's Responses to Plaintiff IMRA America, Inc.'s First Set of Interrogatories (Nos. 1-12), Jan. 4, 2008.

Exhibit E to Plaintiff IMRA America, Inc.'s Opposition to Defendant's Motion to Stay the Litigation Pending Reexamination—Defendant IPG Photonics Corporation's Supplemental Interrogatory Response to Interrogatory No. 2, Jan. 4, 2008.

Exhibit E to Plaintiff's Brief in Support of its Motion to Compel Production of Documents and an In-Person Inspection of Defendant's Electronically Stored Documents—Defendant's Responses to Plaintiff's Second Set of Requests for Production of Documents and Things (Nos. 99-182), Feb. 15, 2008.

Complaint for Patent Infringement and Exhibit A (U.S. Patent 5,818,630 & Civil Cover Sheet), Nov. 16, 2006.

Stipulated Protective Order and Exhibit A (Confidentiality Agreement), Jun. 20, 2007.

Signed Stipulated Protective Order and Exhibit A (Confidentiality Agreement), Jul. 2, 2007.

IMRA's First Amended Complaint for Patent Infringement and U.S. Patent 5,818,630, Dec. 22, 2006.

Defendant IPG Photonics Corporation's Answer, Affirmative Defenses, Counterclaims and Jury Demand, Jan. 9, 2007.

Plaintiff IMRA America, Inc.'s Answer to Counterclaims of Defendant IPG Photonics Corporation, Feb. 1, 2007.

Plaintiff's First Set of Interrogatories to Defendant (Nos. 1-12), Feb. 28, 2007.

Plaintiff's First Set of Requests for Production of Documents and Things to Defendant (Nos. 1-98), Feb. 28, 2007.

Defendant IPG Photonics Corporation's First Set of Interrogatories (Nos. 1-13), Mar. 19, 2007.

(56) References Cited

OTHER PUBLICATIONS

Defendant IPG Photonics Corporation's First Set of Requests for Production of Documents and Things (Nos. 1-84), Mar. 19, 2007.
Defendant IPG Photonics Corporation's Responses to Plaintiff IMRA America, Inc.'s First Set of Interrogatories (Nos. 1-12), Mar. 30, 2007.
Defendant's Responses to Plaintiff's First Set of Requests for Production of Documents and Things (Nos. 1-98), Mar. 30, 2007.
Plaintiff IMRA America, Inc.'s Responses to Defendant IPG Photonics Corporation's First Set of Interrogatories (Nos. 1-13), Apr. 18, 2007.
Plaintiff IMRA America, Inc.'s Responses to Defendant IPG Photonics Corporation's First Set of Requests for Production of Documents and Things (Nos. 1-84), Apr. 18, 2007.
IPG's Subpoena to Lih-Mei Yang, Sep. 27, 2007.
Defendant's Responses to Plaintiff's Second Set of Requests for Production of Documents and Things (Nos. 99-182), Oct. 22, 2007.
Defendant IPG Photonics Corporation's Supplemental Interrogatory Response to Interrogatory No. 2, Nov. 16, 2007.
Plaintiff's First Supplemental Responses to Defendant's Interrogatory Nos. 2, 5 and 6, Nov. 21, 2007.
Plaintiff's Second Supplemental Response to Defendant's Interrogatory No. 5, Dec. 13, 2007.
IPG's Subpoena to Almantas Galvanauskas, Dec. 14, 2007.
Defendants IPG Photonics Corporation's Second Set of Requests for Production of Documents and Things (Nos. 85-88), Dec. 19, 2007.
Expert Report of Martin J Adelman with Exhibits A-C, Dec. 21, 2007.
IPG's Notice of Deposition and Subpoena to Richard Turner, Dec. 27, 2007.
IPG's Subpoena to Sughrue Mion, PLLC, Dec. 27, 2007.
Defendant IPG Photonics Corporation's Supplemental Interrogatory Responses to Interrogatory Nos. 2, 4, 5, 7 and 9, Dec. 27, 2007.
Plaintiff's 30(b)(6) Notice of Deposition of IPG Photonics Corporation Regarding Liability with Exhibit A, Dec. 28, 2007.
Defendant IPG Photonics Corporation's Second Set of Interrogatories (Nos. 14-20), Jan. 14, 2008.
Defendant IPG Photonics Corporation's Third Set of Requests for Production of Documents and Things (No. 89), Jan. 14, 2008.
Plaintiff IMRA America, Inc.'s Second Set of Interrogatories to Defendant IPG Photonics Corporation (Nos. 13-18), Jan. 16, 2008.
Plaintiff IMRA America, Inc.'s Third Set of Requests for Production of Documents and Things to Defendant IPG Photonics Corporation (Nos. 183-241), Jan. 16, 2008.
Plaintiff's Response to Defendant's Second Set of Requests for Production of Documents and Things (Nos. 85-88), Jan. 18, 2008.
IPG's Subpoena to MIT, Jan. 18, 2008.
Rebuttal Expert Report of Hon. Lawrence J. Goffney, Jr. with Appendices A & B, Jan. 27, 2008.
Defendant IPG Photonics Corporation's Responses to Plaintiff IMRA America, Inc.'s Second Set of Interrogatories (Nos. 13-18), Feb. 15, 2008.
Defendant IPG Photonics Corporation's Responses to Plaintiff's Third Set of Requests for Production of Documents and Things (Nos. 183-240), Feb. 15, 2008.
Lih-Meh Yang Deposition Transcript (condensed) (some deposition exhibits listed separately below), Feb. 14, 2008.
Peter Kaiser and Donald Keck, excerpt from Optical Fiber Communications II, Academic Press, 1988 (YANG000004-YANG000006, exhibit 6), 1988.
Zenteno, et al., Frequency-modulated cavity-dumped Nd-doped fiber laser, Optics Letters, vol. 16, No. 5, Mar. 1, 1991, pp. 315-317. (YANG000017-YANG000019, exhibit 8), Mar. 1, 1991.
Yang. L.-M.,et al., Upconversion Multimode Fiber Amplifier, Ultrafast Pulse, vol. II, No. 2, Spring, 1995, pp. 1-2. (YANG000021-YANG000022, $1^{st}$ part of exhibit 9).
Yang, L.-M.,et al., Upconversion chirped pulse amplification of ultrashort pulses using a multimode Tm:ZBLAN fiber, SPIE, vol. 2377, pp. 148-156. (YANG000024-YANG000032, $2^{nd}$ part of exhibit 9), Feb. 1995.
Yang, L.-M., et al., Upconversion chirped pulse amplification in a multimode TM:ZBLAN fiber and temporally resolved modal analysis, CLEO'95, Monday morning, (YANG000033-YANG000034, $3^{rd}$ part of exhibit 9), 1995.
Yang, L, Generation and Amplification of Ultrashort Pulses in Erbium, Neodymium, and Thulium Fibers, dissertation, University of Michigan, 1996. (YANG000036-YANG000184, exhibit 2).
Stock, et al., Synchronous mode locking using pump-induced phase modulation, Optics Letters, vol. 18, No. 18, Sep. 15, 1993, pp. 1529-1530. (YANG000186-YANG000188, exhibit 13).
Fermann, et al., Environmentally stable Kerr-type mode-locked erbium fiber laser producing 360-fs pulses, Optics Letters, vol. 19, No. 1, Jan. 1, 1994, pp. 43-45. (YANG000190-YANG000192, exhibit 11).
Yang, et al., Chirped-Pulse Amplification of Ultrashort Pulses Using Neodymium- and Erbium-Doped Fiber Amplifiers, Springer Series In Chemical Physics, vol. 60, 1994, pp. 187-189. (YANG000194-YANG000196, exhibit 12).
Declaration of Emily Florio in support of ex parte request for reexamination of U.S Patent No. 5,818,630, Mar. 12, 2008.
Reflective-mode conversion with UV-Induced phase gratings in two-mode fiber, Thomas A. Strasser, OFC Technical Digest, 1997.
158-µJ pulses from a single-transverse-mode, large-mode-area erbium-doped fibers amplifier, D. Taverner; D. J. Richardson; L. Dong; J. E. Caplen, Optics Letters, vol. 22, No. 6, p. 378-380, Mar. 15, 1997.
Chirped-pulse amplification of ultrashort pulses with a multimode TM:ZBLAN fiber upconversion amplifier, L. -M. Yang; T. Sosnowki; M. L. Stock; T. B. Norris; J. Squier; G. Mourou, Optics Letters, vol. 20, No. 9, p. 1044-1046, May 1, 1995.
Pulse Dispersion for single-mode operation of multimode cladded optical fibres, W. A. Gambling; D. N. Payne; H. Matsumura, Electronics Letters, vol. 10, Mar. 1974.
Optical Power Flow in Multimode Fibers, D. Gloge, Bell Technical Journal, vol. 51 No. 3 p. 1767-1783, Oct. 1972.
Single-mode resonator incorporating an internal multimode optical fiber and a phase-conjugate reflector, B. Luther-Davies; A. Liebman; A. Maddever, JOSA B, vol. 7 No. 7 p. 1216-1220, Jul. 1990.
Theory of Dielectric Optical Waveguides, D. Marcuse, Academic Press, pp. 238-239, 1974.
Generation of high-energy 10-fs pulses by a new pulse compression technique, M. Nisoli; S. De Silvestri, O. Svelto, CLEO '96 Technical Digest, pp. 189-190, Jun. 1996.
Office Action and Japanese Application No. 1998-175755,. "Single-Mode Amplifier and Compressors Based on Multi-mode Fibers," IMRA America Application Ref. No. IM-59JP, 1998, and.
Cladding-pumped fiber laser/amplifier system generation 100 uj energy picosecond pulses, J. D. Minelly; A. Galvanauskas; D. Hailer; J. E. Caplen; L. Dong, CLEO '97, p. 475-476, May 23, 1997.
Amplification in a fiber laser, C. J. Koester; E. Snitzer, Applied Optics, vol. 3, No. 10, p. 1182-1186, Oct. 1964.
An overview of fiber-optic gyroscopes, R. A. Bergh; H. C. Lefevre; H. J. Shaw, Journal of Lightwave Technology, vol. LT-2, No. 2, p. 91-107, Apr. 1984.
Low threshold miniature Q-switched Nd:MgO:LINbO3 laser, A. Cordova-Plaza; M. J. F. Digonnet; H. J. Shaw, Optical Society of America, Annual Meeting Digest of Technical Papers, FD6, Oct. 1986.
Simple side coupler for coupling between laser diode and single-mode optical fiber, K. S. Lee; F. S. Barnes, Applied Optics, vol. 26, No. 12, p. 2294-2296, Jun. 15, 1987.
Partially coherent light generated by using single and multimode optical fibers in a high-power Nd: glass laser system, H. Nakano; N. Miyanaga; K. Yagi; K. Tsubakimoto; T. Kanabe; M. Nakatsuka; S. Nakai, Applied Physics Letters, vol. 63, No. 5, p. 580-582, Aug. 2, 1993.
Clad Nd-Yag Fibers for Laser Applications, Digonnet, M.J.F.; Gaeta, C.J.; Omeara, D; Shaw, H.I., Journal of Lightwave Technology, vol. LT-5, pp. 642-646, May 1987.
Passive and Active Fiber Optic Components, M. J. F. Digonnet, Ph.D. Dissertion, Stanford University, Sep. 1983.

(56) References Cited

OTHER PUBLICATIONS

Mode-locking of a neodymium-doped monomode fibre laser, I. P. Alcock; A. J. Ferguson; D. C. Hanna; A. C. Tropper, Electronics Letters, vol. 22, No. 5, p. 266-268, Feb. 27, 1986.
Efficient diode-pumped CW and Q-switched single-mode fibre laser, M. Jauncey; J. T. Lin; L. Reekif; R. J. Mears, Electronics Letters, vol. 22, No. 4, p. 198-199, Feb. 13, 1986.
Power coupling from laser diodes into single-mode fibres with quadrangular pyramid-shaped hemiellipsoidal ends, H. Sakaguchi; N. Seki; S. Yamamoto, Electronics Letters, vol. 17, No. 12, p. 425-426, Jun. 11, 1981.
Evanescent amplification in a single-mode optical fibre, W. V. Sorin; K. P. Jackson; H. J. Shaw, Electronics Letters, vol. 19, No. 20, p. 820-822, Sep. 1983.
High-power single-mode fiber amplifiers using multi-mode fibers, M. E. Fermann; A. Galvanauskas; D. Hailer; J. D. Minelly, OFC '98 Technical Digest, 1998.
Self-contained LED-Pumped single-crystal Nd: YAG fiber laser, J. Stone; C. A. Burrus, Fiber and Integrated Optics, vol. 2, No. 1, p. 19-46, 1979.
Fibre lasers and dispersion in fibres, E. Snitzer, Proc. First European Electro-Optics Markets and Technical Conf., p. 374-378, Sep. 1972.
Mode conversion coefficients in optical fibers, W, A. Gambling; D. N. Payne; H. Matsumura, Applied Optics vol. 14 No. 7 p. 1538-1542 , Jul. 1975.
Alexandrite-laser-pumped Cr 3+: LiSrAlF6, D. J. Harter, et al., Optics Letters, vol. 17, No. 21, p. 1512-1514, Nov. 1992.
High-power extended-cavity laser at 1.3 um with a single-mode fiber output port, G. Eisenstein; U. Koren; R. S. Tucker; G. Raybon; A. G. Dentai; L. W. Stulz; B. I. Miller, Applied Physics Letters, vol. 50, p. 22., Jun. 1987.
Lens coupling of laser diodes to single-mode fibers, M. Sumida; K. Takemoto, Journal of Lightwave Technology, vol. LT-2, No. 3, p. 305-311, Jun. 1984.
Low-threshold synchronously pumped all-fiber ring Raman laser, E. Desurvire; A. Imamoglu; H. J. Shaw, Journal of Lightwave Technology, vol. LT-5, No. 1, p. 89-96, Jan. 1987.
Yb 3+-ring-doped fiber for high-energy pulse amplification, J. Nilsson; R. Paschotta; J. E. Caplen; D. C. Hanna, Optics Letters, vol. 22, No. 14, p. 1092-1094, Jul. 15, 1997.
An Erbium-doped Multimode optical fiber amplifier, G. Nykolak; S. A. Kramer; J. R. Simpson, D. J. , DiGiovanni; C. R. Giles; H. M. Presby, Photonics Technology Letters, vol. 3, No. 12, p. 1079-1081, Dec. 1991.
High energy single-transverse-mode Q-switched fiber laser based on a multimode large-mode-area erbium-doped fiber, H. L. Offerhaus; N. G. Broderick; D. J. Richardson, Optics Letters, vol. 23, No. 21, p. 1683-1685, Nov. 1998.
Continuous-wave oscillation of a monomode neodymium-doped fibre laser at 0.9 um on the 4 F 3/2-4 I 9/2 transition, I. P. Alcock; A. I. Ferguson; D. C. Hanna; A.C. Tropper, Optics Communications, vol. 58, No. 6, p. 405-408, Jul. 1996.
All-single-mode fiber resonator, L. F. Stokes; M. Chodorow; J. J. Shaw, Optics Letters, vol. 7, No. 6, p. 288-290, Jun. 1982.
All-single-mode fiber-optic gyroscope with long-term stability, R. A. Bergh; H. C. Lefevre; H. J. Shaw, Optics Letters, vol. 6, No. 10, p. 502-504, Oct. 1981.
New developments in laser resonators, A. E. Siegman, Photonics West, SPIE Optical Resonators, vol. 1224, p. 2-14, 1990.
Optimization of Filtering in soliton fiber lasers, K. Tamura; E. P. Ippen, IEEE Photonics Technical Letters, vol. 6, No. 12, p. 1433-1435, Dec. 1994.
Generation of high-energy pulses using a large-mode-area erbium-doped fiber amplifier, D. Taverner; A. Galvanauskas; D. Harter; D. J. Richardson; L. Dong, CLEO '96, pp. 496-497, 1996.
Generation of 111kW (0.5mJ) Pulses at 1.5mm Using a Gated Cascade of Three Fibre Amplifiers, B. Desthieux, R.I. Laming & D. N. Payne, pp. 329-332, IPGI p. 012016-012019, 1993.
Cladding-Pumped Passively Mode-locked femtosecond fiber lasers, ME Fermann, D. Harter, J,D. Minelly, G.G. Vienne CLEO '96, pp. 493-494, 1996.
Low-Loss Joints between Dissimilar Fibres by Tapering fusion splices, D. Morimore, J. Wright , Electronics Letters 13, Mar. 1986 vol. 22, No. 6 p. 318.
Measurement of Intermodal coupling in weakly multimode fibre optics, S. Shaklan, Electronics Letters vol. 26, No. 24, pp. 2022-2023, Nov. 22, 1990.
Mode Excitation in a multimode optical-fibre waveguide, Gambling, et al., Electronics Letters, Sep. 6, 1973, vol. 9, No. 16, p. 412-414.
Neodymium-doped silica single-mode fibre lasers, Mears, Reekie, Poole, Payne, Electronics Letters vol. 21, No. 17, p. 738-740, Aug. 15, 1985.
Glass Lasers, E. Snitzer, Applied Optics, vol. 5, No. 10, Oct. 1966 , p. 1487-1489.
Highly selective evanescent modal filter for two-mode optical fibers, W.V. Sorin, B. Y. Kim, and H.J. Shaw, Optics Letters, vol. 11, No. 9, p. 581-583, Sep. 1986.
Generation and amplification of ultrashort pulses in erbium-doped optical fibers, M.L. Stock, Ph. D. Dissertation, University of Michigan, 1994.
Chirped pulse amplification in an erbium-doped fiber oscillator/erbium-doped fiber amplifier system, M. Stock , G. Mourou, Optics Communications, vol. 106, p. 249-252, 1994.
Generation of high-power femtosecond optical pulses by chirped pulse amplification in erbium doped fibers, M.L. Stock, A. Galvanauskas, M.E. Fermann, G. Mourou and D. Harter, Nonlinear Guided-Wave Phenomena, vol. 15, Optics Society of America 1993 Technical Digest Series, Sep. 1993.
Tapered-Beam Expander for Single-Mode Optical-Fiber Gap Devices, Jedrzejewski, K.P., et al., Electronics Letters, vol. 22, No. 2, p. 105-106, Jan. 16, 1986.
Chirped-pulse amplification of ultrashort pulses using Neodymium- and Erbium-doped fiber amplifiers , L. -M. Yang; M. L. Stock; G. Mourou; A. Galvanauskas, M. E. Fermann; D. J. Harter, Proc. of 9th International Conference on Ultrafast Phenomena IX, 1994, p. 187-189.
A mode-filtering scheme for Improvement of the Bandwidth-Distance Product in Multimode fiber systems, Z. Haas, Journal of Lightwave Technology, vol. 11, No. 7, Jul. 1993, p. 1125-1131.
IRE-POLUS marketing literature No. 1, IPGI 12293-12301, 1996.
IRE-POLUS marketing literature No. 2, IPGI 12302-12318, 1996.
IRE-POLUS marketing literature No. 3, IPGI 12319-12335, 1996.
IRE-POLUS marketing literature No. 4, IPGI 12336-12413, 1996.
M2 concept characterizes beam quality, T. F. Johnston, Jr., Laser Focus World, May 1990, p. 173-183.
Single transverse mode operation at 1345 nm wavelength of a diode-laser pumped neodymium:ZBLAN multimode fiber laser; Millar, C.A.; Fleming, S.C.; Brierley, M.C.; Hunt, M.H, IEEE Photonics Technical Letters, vol. 2, No. 6, p. 415-417, Jun. 1990.
V-groove side-pumped 1.5-µm fiber amplifier, L. Goldberg, D.J. Ripin, E. Snitzer, B. Cole, CLEO '96, 1996, p. 208-209.
Saturable absorber modelocked polarisation maintaining erbium-doped fibre laser, E.A. DeSouza, C.E. Soccolich, W. Pleibel, R.H. Stolen, J.R. Simpson, D.J. DiGiovanni, Electronics Letters, vol. 29, No. 5, Mar. 4, 1993, p. 447-449.
Fiber-laser-based femtosecond parametric generator in bulk periodically poled LiNbO3, A. Galvanauskas, M.A. Arbore, M.M Fejer, M.E. Fermann, D. Harter, Optics Letters, vol. 22, No. 2, Jan. 15, 1997, p. 105-107.
All-fiber femtosecond pulse amplification circuit using chirped Bragg gratings, A. Galvanauskas, M. E. Fermann, D. Harter, K. Sugden, I. Bennion, Applied Physics Letters, vol. 66, Np. 9, Feb. 1995, p. 1053-1055.
Source of instability in fibre soliton lasers, S.M.J. Kelly, D.U. Noske, N. Pandit, J.R. Taylor, 1992, IPGI 8244-8247.
Mode division multiplexing in optical fibers, S. Berdagué, P. Facq, Applied Optics, vol. 21, No. 11, Jun. 1, 1982, p. 1950-1955.
Design Optimization for Efficient Erbium-Doped Fiber Amplifiers, E. Desurvire, et al., Journal of Lightwave Technology, vol. 8, No. 11, pp. 1730-1741, 1990.

(56) References Cited

OTHER PUBLICATIONS

Valentin P. Gapontsev et al; "3W Saturation Power Polarisation Maintaining 1060nm Ytterbium Fiber Amplifier", SPIE, vol. 3815, Nov. 2, 2006, pp. 264-268.
Martin E. Fermann, "Amended Appeal Brief Submitted in Response to notification of Non-Compliant Appeal Brief Dated Mar. 24, 2008", Sep. 23, 2008, pp. 1-123, in U.S. Appl. No. 09/785,944.
Martin E. Fermann, Final Office Action, Jun. 7, 2007, pp. 1-20, in U.S. Appl. No. 09/785,944.
"Advanced and Proven Technology", IRE-Polus Group, No. 5455, 1996, pp. 1-5.
"Pulsed Ytterbium Fiber Laser", Model YLPM-3000, IRE-Polus Group, No. 5455, 1996, pp. 1-2.
"Pulsed Single Mode Ytterbium Fiber Laser", YLP-Series, IRE-Polus Group, No. 5455, 1996, pp. 1-2.
"High Power Single-Mode CW Ytterbium Fiber Laser Module", Model PYL-8000M-1047, IRE-Polus Group, No. 5455, 1996, pp. 1-2.
"High Power Single-Mode CW Ytterbium Fiber Laser Module", Model PYL-5000M, IRE-Polus Group, No. 5455, 1996, pp. 1-2.
"Single-Mode Ytterbium Fiber Laser", Model YLD-2000-1030, IRE-Polus Group, No. 5455, 1996, pp. 1-2.
"Single-Mode Ytterbium Fiber Laser Module", Model YLM-1000A-1030 (1047), IRE-Polus Group, No. 5455, 1996, pp. 1-2.
"Single-Mode High Power Ytterbium Fiber Lasers", PYL-Series, IRE-Polus Group, No. 5455, 1996, pp. 1-2.
"Single-Mode Ytterbium Fiber Laser", Model YL-Series, IRE-Polus Group, No. 5455, 1996, pp. 1-3.
"Tunable ErbiumFiber Laser", Model ELT-100, IRE-Polus Group, No. 5455, 1996, pp. 1-2.
"Single-Frequency Erbium Fiber Laser", Model ELD-500BC, IRE-Polus Group, No. 5455, 1996, pp. 1-2.
"Single-Mode CW Erbium Fiber Laser", Model ELD-5000, IRE-Polus Group, No. 5455, 1996, pp. 1-2.
"Single-Mode Eribum Fiber Laser", EL-Series, IRE-Polus Group, No. 5455, 1996, pp. 1-3.
"Eye-Safe" Pulsed Erbium Fiber Laser, (Bench-Top Version) Model ELPD-1000R, IRE-Polus Group, No. 5455, 1996, pp. 1-2.
"Eye-Safe" Pulsed Erbium Fiber Laser Module, Model ELPM-500R, IRE-Polus Group, No. 5455, 1996, pp. 1-2.
"Diode-Pumped Pulsed Erbium Fiber Laser", Model ELPD-100M "Eye-Safe", IRE-Polus Group, No. 5455, 1996, pp. 1-2.
"Pulsed Erbium Fiber Laser", Model ELPD-100LF, IRE-Polus Group, No. 5455, 1996, pp. 1-2.
"Eye-Safe" Pulsed Erbium Fiber Laser, Model ELPD-10000, IRE-Polus Group, No. 5455, 1996, pp. 1-2.
"Pulsed Erbium Fiber Laser", Model ELPD-200HF, IRE-Polus Group, No. 5455, 1996, pp. 1-2.
English translation of IMRA America reply for Japanese Patent Application No. 2007-146684, dated Jul. 19, 2011, in 8 pages.
English translation of amendments for Japanese Patent Application No. 2007-146684, dated Jul. 19, 2011, in 4 pages.
IPG Photonics Corp. Complaint for Trial Case for Appeal Decision Cancellation Demand for JP Patent No. 3990034, dated Jun. 24, 2011 in 3 pages.
IPG Photonics Corp. Correction for Written Complaint for 2011 Gyo(Ke) No. 10201 Trial Case for Appeal Decision, dated Jul. 19, 2011 in 1 page.
IPG Photonics Corp. Explanation of Exhibits (1) for 2011 Gyo(Ke) No. 10201 Trial Case for Appeal Decision, dated Jul. 15, 2011 in 7 pages.
IMRA America Written Reply in 2011 (Gyo-ke) No. 10201 Trial Case for Appeal Decision, dated Jul. 21, 2011, including certificate of additional indication of specific infringement litigation representative work, in 3 pages.
IPG Brief in Request for cancellation of trial decision 2011 (Gyo-ke) No. 10201, dated Aug. 15, 2011, in 40 pages.
IPG Exhibit 26: Technology Trend Research Regarding High Performance Optical Fibers, dated Jul. 2001, in 21 pages.

Oral proceeding report in Request for cancellation of trial decision 2011 (Gyo-ke) No. 10201, dated Sep. 27, 2011, in 3 pages.
Exhibit table from "Request for Cancellation of Trial Decision 2011 (Gyo-ke) No. 10201", dated Nov. 14, 2011, in 2 pages (Table includes Exhibits B-1 to B-3, listed separately below.).
Exhibit B-1: Tab 4: Declaration of Peter C. Schultz, dated May 27, 2009, in 4 pages.
Exhibit B-1: Tab 3: "Applying the teaching of Tumminelli to 'strip away' higher order modes", undated, in 2 pages.
Exhibit B-1: Tab 2: "Analysis of Tumminelli U.S. Pat. No. 5,818,620", undated, in 5 pages.
Exhibit B-2: Declaration of Dr. Wayne Harvey Knox regarding the reexamination of U.S. Pat. No. 5,818,620, dated May 31, 2009, in 22 pages.
Exhibit B-3: D. Marcuse, "Loss Analysis of Single-Mode Fiber Splices," Bell System Technical Journal, vol. 56, No. 5, May-Jun. 1977, pp. 703-718.
IMRA America Brief in Request for cancellation of trial decision 2011 (Gyo-ke) No. 10201, dated Nov. 14, 2011, in 51 pages.
Civil Docket for *IMRA America, Inc.* v. *IPG Photonics Corporation*, U.S. District Court, Eastern District of Michigan, Case #: 2:06-cv-15139-AJT-MKM, retrieved from the Public Access to Court Electronic Records (PACER) website (http://www.pacer.gov) on Dec. 19, 2011, in 45 pages.
Opinion and Order granting Plaintiff's Motion for Summary Judgment of No Invalidity for Derivation; Denying in part and Granting in part Defendant's Motion for Summary Judgment Regarding Damages Issues, Granting Plaintiff's Motion for Summary Judgment of No Inequitable Conduct; denying Defendant's Motion for Summary Judgment of No Infringement, Invalidity, and No Willful Infringement. Signed by District Judge Arthur J. Tarnow, dated Mar. 14, 2011, in 31 pages.
Stipulated Order for Dismissal, signed by District Judge Arthur J. Tarnow entered Nov. 1, 2011, in 2 pages.
Stipulated Order Re Amended Final Judgment and Amended Final Judgment by District Judge Arthur J. Tarnow, dated Nov. 21, 2011, in 4 pages.
Report on the Filing or Determination of an Action Regarding a Patent or Trademark, submitted to the Director of the U.S. Patent and Trademark Office, dated Nov. 14, 2011, in 1 page.
English translation of IMRA America's brief on Appeal of DE 198 61 429.2, Oct. 31, 2012, Munich, Germany, in 23 pages.
English translation of IPG Laser GmbH's reply brief to the submission of the patentee dated Apr. 28, 2011 on Appeal of DE 198 61 429.2, Oct. 31, 2012, Munich, Germany, in 12 pages.
English Translation of Decision on Appeal of DE 198 61 429.2, Dec. 5, 2012, Munich, Germany, in 18 pages.
English Translation of Claims after opposition on Appeal of DE 198 61 429.2, Dec. 19, 2012, Munich, Germany, in 2 pages.
Daniel, J.M.O., et al. "Novel Technique for Mode Selection in a Multimode Fiber Laser," Optics Express Jun. 13, 2011, vol. 19 No. 13, pp. 12434-12439.
Galvanauskas, A., et al. "Broad-Area Diode-Pumped 1 W Femtosecond Fiber System," Nov. 28, 1995, Optoelectronics Research Centre, University of Southampton, United Kingdom, in 9 pages.
Leger, James R. and William C. Goltsos, "Geometrical Transformation of Linear Diode-Laser Arrays for Longitudinal Pumping of Solid-State Lasers," IEEE Journal of Quantum Electronics, Apr. 1992, vol. 28 No. 4, pp. 1088-1100.
Marcuse, D. "Derivation of Coupled Power Equations," The Bell System Technical Journal, Jan. 1972, vol. 51 No. 1, pp. 229-237.
Minelly, J.D., et al. "Diode-Array Pumping of $Er^{3+}/Yb^{3+}$Co-Doped Fiber Lasers and Amplifiers," IEEE Photonics Technology Letters, Mar. 1993, vol. 5 No. 5, pp. 301-303.
Minelly, J.D., et al. "Efficient Cladding Pumping of an $Er^{3+}$Fibre," Optoelectronics Research Centre, Sep. 1995, University of Southampton, United Kingdom, in 4 pages.
Nilsson, J., et al. "High-Power and Tunable Operation of Erbium-Ytterbium Co-Doped Cladding-Pumped Fiber Lasers", IEEE Journal of Quantum Electronics, Aug. 2003, vol. 39 No. 8, pp. 987-994.

(56) References Cited

OTHER PUBLICATIONS

Olshansky, Robert, "Distortion Losses in Cabled Optical Fibers," Aug. 22, 1974, Corning Glass Works Research & Development Laboratories, New York, in 2 pages.
Olshansky, Robert, "Mode Coupling Effects in Graded-Index Optical Fibers," Applied Optics, Apr. 1975, vol. 14 No. 4, pp. 935-945.
Pask, H.M., et al. "Ytterbium-Doped Silica Fiber Lasers: Versatile Sources for the 1-1.2 μm Region," IEEE Journal of Selected Topics in Quantum Electronics, Apr. 1995, vol. 1 No. 1, pp. 2-13.
Po, H., et al. "High Power Neodymium-Doped Single Transverse Mode Fibre Laser," Electronics Letters, Aug. 19, 1993, vol. 29 No. 17, pp. 1500-1501.
Zenteno, Luis, "High-Power Double-Clad Fiber Lasers, Journal of Lightwave Technology," Sep. 1993, vol. 11 No. 9, pp. 1435-1446.
"Lichtwellenleiter," http://de.wikipedia.org/wiki/Lichtwellenleiter, dated Oct. 31, 2012, in 29 pages.
"Optical Fiber Connector," http://en.wikipedia.org/wiki/Optical_fiber_connector, dated Apr. 29, 2011, in 7 pages.
"Corning SMF-28 Optical Fiber Product Information," model No. SMF-28, Corning Marketing Literature PI1036, Apr. 2002, New York, in 4 pages.
English translation of Plaintiff IPG Photonics Corporation's Second Brief to Intellectual Property High Court, Third Department, for Request for Cancellation of Trial Decision 2011 (Gyo-ke) No. 10201, dated Jan. 31, 2012, in 66 pages.
Exhibit Explanation (3) for Plaintiff IPG Photonics Corporation's Second Brief to Intellectual Property High Court, Third Department, for Request for Cancellation of Trial Decision 2011 (Gyo-ke) No. 10201, dated Jan. 31, 2012, in 2 pages (Exhibits A-27 and A-28 listed separately below).
Exhibit A-27, ECOC 2006 32nd European Conference on Optical Communication, Sep. 24-28, 2006, Cannes, France, ECOC 2006 Proceedings—vol. 6 "Robust Fundamental-Mode Operation in Ytterbium-doped Polarization-Maintaining Fibre with an Effective Area of 1400μm$^2$", X. Peng, et al. (annotated), with Japanese translation of annotation, in 5 pages.
Exhibit A-28, Electronics Letters Sep. 6, 1973 vol. 9 No. 18, "Mode Excitation in a Multimode Optical-Fibre Waveguide", W. A. Gambling et al., (annotated), with Japanese translation of annotations, in 6 pages.
Examiner Interview Summary from Reexamination of U.S. Patent No. 5,818,630, in Reexamination Control No. 90/008,971, filed Mar. 12, 2008, dated Jun. 24, 2009, in 2 pages.
Notice of Intent to Issue Ex Parte Reexamination Certificate for U.S. Patent No. 5,818,630, in Reexamination Control No. 90/008,971, filed Mar. 12, 2008, dated Jun. 26, 2009, in 7 pages.
Examiner Interview Summary from Reexamination of U.S. Patent No. 5,818,630, in Reexamination Control No. 90/008,971, filed Mar. 12, 2008, dated Jul. 2, 2009, in 1 page.
Notice of Intent to Issue Ex Parte Reexamination Certificate for U.S. Patent No. 5,818,630, in Reexamination Control No. 90/008,971, filed Mar. 12, 2008, dated Jul. 21, 2009, in 6 pages.
Applicant Interview Summary from Reexamination of U.S. Patent No. 5,818,630, in Reexamination Control No. 90/008,971, filed Mar. 12, 2008, dated Jul. 24, 2009, in 3 pages.
Ex Parte Reexamination Certificate for U.S. Patent No. 5,818,630, dated Oct. 27, 2009, in 9 pages.
Request for Ex Parte Reexamination of U.S. Patent No. 5,818,630, dated Aug. 19, 2009, in 117 pages.
Request for Ex Parte Reexamination Transmittal Form for U.S. Patent No. 5,818,630, dated Aug. 19, 2009, in 2 pages.
Declaration under 37 C.F.R. § 1.132 by Dr. Philip H. Bucksbaum in Support of Request for Ex Parte Reexamination of U.S. Patent No. 5,818,630, dated Aug. 19, 2009, in 56 pages.
Order denying request for Ex Parte Reexamination of U.S. Patent No. 5,818,630, dated Nov. 13, 2009, in Reexamination Control No. 90/010,650, filed Aug. 19, 2009, in 16 pages.
Petition Under 37 C.F.R. §§ 1.181 and 1.515(c) to Reconsider Orders Denying Request for Ex Parte Reexamination of U.S. Patent No. 5,818,630, in Reexamination Control No. 90/010,650, filed Aug. 19, 2009, dated Dec. 14, 2009, in 31 pages.
Decision Denying Petition to Reconsider Order Denying Request for Ex Parte Reexamination of U.S. Patent No. 5,818,630, in Reexamination Control No. 90/010,650, filed Aug. 19, 2009, dated Jul. 30, 2010, in 8 pages.
Rexamination Information Disclosure Statement Filed by Third Party for U.S. Patent No. 5,818,630, dated Aug. 19, 2009, in 1 page.
B. Desthieux et al., "111 kW (0.5 mJ) pulse amplification at 1.5 μm using a gated cascade of three erbium-doped fiber amplifiers," Applied Physics Letters, vol. 63, No. 5, pp. 586-588, Aug. 1993.
M.J.F. Digonnet, "Passive and Active Fiber Optic Components," Stanford University Ph.D. dissertation, in 206 pages, Sep. 1983.
W.A. Gambling et al., "Mode Excitation in a Mulitmode Optical-Fibre Waveguide," Electronic Letters, vol. 9, pp. 412-414, Sep. 1973.
W.A. Gambling et al., "Pulse Dispersion for Single-Mode Operation of Multimode Cladded Optical Fibres," Electronics Letters, vol. 10, issue 9, pp. 148-149, May 1974.
T.F. Johnston Jr., "M2 concept characterizes beam quality," Laser Focus World, pp. 173-183, May 1990.
J.M. Senior, "Optical Fiber Communications: Principles and Practice," Prentice/Hall International, pp. 41-42, 73-76, 138-144, 1985.
L.M. Yang, "Generation and Amplification of Ultrashort Pulses in Erbium, Neodymium, and Thulium Fibers," University of Michigan Ph.D. dissertation, in 149 pages, Oct. 1996.
English translation of office action for German Patent Application No. 19861429, original dated Mar. 29, 2007, translation dated Jun. 28, 2010, in 5 pages.
Notice of opposition filed in the name of IPG Laser GmbH for German Patent DE 19861429 owned by IMRA America, Inc., dated Jul. 15, 2010, in 1 page.
Opposition brief of IPG Laser GmbH filed with Patent Office regarding German Patent DE 19861429, dated Jul. 8, 2010, translation dated Oct. 11, 2010, in 54 pages.
English translation of reply by IMRA America, Inc. to Opposition of IPG Laser GmbH against German patent DE 198614292.2, dated Apr. 28, 2011, in 20 pages.
English translation of response to examination report of Jun. 28, 2010 for German Patent App. DE 19828154.4-51, dated Apr. 15, 2011, in 10 pages.
English translation of office action for Japanese Patent Application No. H11-334914, dated Dec. 15, 2008, in 4 pages.
English translation of filed amendments for Japanese Patent Application No. H11-334914, dated Nov. 9, 2009, in 5 pages.
Appeal brief for Japanese Patent Application No. H11-334914, dated Dec. 18, 2009, in 4 pages.
Section A—Power of attorney between IPG Photonics Corporation and Masatake Shiga et al. related to Request for Invalidation of Japanese Patent No. 3,990,034 B2, dated Mar. 4, 2010, in 2 pages.
Section B—Demand for Trial for invalidation of Japanese Patent No. 3,990,034 B2, requested by IPG Photonics Corporation, dated May 21, 2010, in 160 pages.
Section C—Declaration of Mariellen F. Calter in *IMRA America, Inc. v. IPG Photonics Corporation*, Case No. 2:06-15139, dated May 18, 2010, in 7 pages.
Section D—Highlighted M.J.F. Digonnet, "Passive and Active Fiber Optic Components," Stanford University Ph.D. dissertation, Sep. 1983, and Japanese translation of highlighted portions, in 216 pages.
Section E—Highlighted U.S. Patent No. 5,187,759 to DiGiovanni et al. issued Feb. 16, 1993, and Japanese translation of highlighted portions, in 10 pages.
Section F—Highlighted WO 1995020831 A1 to Wyatt et al., published Aug. 3, 1995, and highlighted its Japanese counterpart, JP H09-508239 A, Aug. 1997, in 60 pages.
Section G—Highlighted B. Desthieux et al., "111 kW (0.5 mJ) pulse amplification at 1.5 μm using a gated cascade of three erbium-doped fiber amplifiers," Applied Physics Letters, vol. 63, No. 5, pp. 586-588, Aug. 1993, and Japanese translation of highlighted portions, in 11 pages.
Section H—Highlighted T.F. Johnston Jr., "M$^2$ concept characterizes beam quality," Laser Focus World, pp. 173-183, May 1990, and Japanese translation of highlighted portions, in 15 pages.

(56) References Cited

OTHER PUBLICATIONS

Section I—Document relating to Section C (listed separately at cite No. 31), in 9 pages.
English translation of the reply in the trial for patent invalidation No. 2010-800095 for Japanese Patent No. 3,990,034 B2, dated Sep. 27, 2010, in 26 pages.
English translation of Amendments for Japanese Patent Application No. H11-334914, dated Nov. 29, 2010, in 3 pages.
English translation of Appeal Brief filed by Appellant in Invalidation No. 2010-800095 regarding Japanese Patent No. 3,990,034 B2, dated Dec. 10, 2010, in 59 pages (Exhibits A6-A17 listed separately below).
Exhibit A6—Highlighted S.B. Poole et al., "Fabrication of Low-Loss Optical Fibres Containing Rare-Earth Ions," Electronics Letters, vol. 21, No. 17, pp. 737-738, Aug. 15, 1985, and Japanese translation of highlighted portions, in 4 pages.
Exhibit A7—Highlighted W.A. Gambling et al., "Pulse Dispersion for Single-Mode Operation of Multimode Cladded Optical Fibres," Electronics Letters, vol. 10, No. 9, pp. 148-149, May 2, 1974, and Japanese translation of highlighted portions, in 3 pages.
Exhibit A8—Highlighted J.M. Senior, "Optical Fiber Communications: Principle and Practice," pp. 41-42, 73-76, 138-144, dated 1984, and Japanese translation of highlighted portions, in 17 pages.
Exhibit A9—Highlighted U.S. Patent No. 4,546,476 to Shaw et al., issued Oct. 8, 1985, and highlighted Japanese translation, in 21 pages.
Exhibit A10—Highlighted U.S. Patent No. 5,818,630 to Fermann et al., issued Oct. 6, 1988, and Japanese translation of highlighted portions, in 21 pages.
Exhibit A11—Japanese Judgment Case No. 2004 (Wa) 12180 (Tokyo District Court), dated Nov. 2, 2005, in 19 pages.
Exhibit A12—Japanese Judgment Case No. 2006 (Ne) 10018 (Intellectual Property High Court), dated May 29, 2006, in 25 pages.
Exhibit A13—Japanese Judgment Case No. 2005 (Gyo-Ke) 10672 (Intellectual Property High Court), dated Apr. 17, 2006, in 35 pages.
Exhibit A14—Highlighted W.A. Gambling et al., "Mode Conversion Coefficients in Optical Fibers," Applied Optics, vol. 14, No. 7, pp. 1538-1542, Jul. 1975, and Japanese translation of highlighted portions, in 7 pages.
Exhibit A15—Highlighted U.S. Patent No. 5,121,460 to Tumminelli et al., issued Jun. 9, 1992, and Japanese translation of highlighted portions, in 11 pages.
Exhibit A16—Japanese Patent Laid-Open No. 2007-221173, dated Aug. 30, 2007, in 20 pages.
Exhibit A17—Highlighted U.S. Patent No. 7,190,511 to Galvanauskas et al., issued Mar. 13, 2007, in 14 pages.
Summary of Oral Hearing Statement in Invalidation No. 2010-800095 regarding Japanese Patent No. 3,990,034 B2, dated Dec. 10, 2010, in 15 pages.
English translation of office action for Japanese Patent Application No. 2007-146684, dated Jan. 6, 2011, in 5 pages.
Solicitation in Invalidation No. 2010-800095 regarding Japanese Patent No. 3,990,034 B2, dated Jan. 28, 2011, in 7 pages.
English translation of Japanese Appeal Board Decision for Japanese Patent No. 3,990,034 B2, dated Feb. 18, 2011, in 53 pages.
H. Lin et al., "Colliding-pulse mode-locked lasers using Er-doped fiber and a semiconductor saturable absorber," Proc. Tech. Dig.: Conf. Lasers Electro-Optics (CLEO 95), JTuEI, pp. 72-73, May 1995, in 1 page.
Snyder, Allen et al., "Optical Waveguide Theory," Chapman and Hall, London, pp. 310-317, 1983.
Order Reopening Case and Lifting Stay in *IMRA America, Inc.* v. *IPG Photonics Corporation*, Case No. 2:06-15139, E.D. Michigan, dated Oct. 13, 2009, in 1 page.
Defendant IPG Photonics Corporation's First Amended Answer, Affirmative Defenses, Counterclaims and Jury Demand, dated Oct. 16, 2009, in 41 pages.
Plaintiff IMRA America, Inc.'s Reply to First Amended Counterclaims of Defendant IPG Photonics Corporation, dated Nov. 6, 2009, in 7 pages.
Plaintiff IMRA America, Inc.'s List of Claim Terms to be Construed, dated Nov. 13, 2009, in 4 pages.
Joint Claim Construction Statement, dated Dec. 7, 2009, in 3 pages.
Exhibit A to Joint Claim Construction Statement, dated Dec. 7, 2009, in 7 pages.
Plaintiff IMRA America, Inc.'s Brief on Claim Construction, dated Dec. 8, 2009, in 25 pages.
Index of Exhibits—Plaintiff IMRA America, Inc.'s Brief on Claim Construction, dated Dec. 8, 2009, in 1 page (Exhibits A-D listed separately below).
Exhibit A—U.S. Patent No. 5,818,630, dated Dec. 8, 2009, in 21 pages.
Exhibit B—Joint Claim Construction Statement, dated Dec. 8, 2009, in 14 pages.
Exhibit C—Knox Declaration, dated Dec. 8, 2009, in 44 pages.
Exhibit D—Excerpt from Expert Report of Philip H. Bucksbaum, Ph.D., dated Dec. 8, 2009, in 6 pages.
Defendant IPG Photonics Corporation's Opening Claim Construction Brief, dated Dec. 8, 2009, in 25 pages.
Index of Exhibits—Defendant IPG Photonics Corporation's Opening Claim Construction Brief, dated Dec. 8, 2009, in 1 page (Exhibits 1-7 listed separately below).
Exhibit 1—U.S. Patent No. 5,818,630, dated Dec. 8, 2009, in 21 pages.
Exhibit 2—Expert Declaration of Philip H. Bucksbaum, Ph.D. in support of IPG Photonics Corporation's Opening Claim Construction Brief, dated Dec. 8, 2009, in 59 pages.
Exhibit 3—Excerpts of the Expert Report of Wayne H. Knox, Ph.D. on Infringement, dated Dec. 8, 2009, in 25 pages.
Exhibit 4—The original Patent Application from the File History of U.S. Patent No. 5,818,630, dated Dec. 8, 2009, in 58 pages.
Exhibit 5—The Amendment in Ex Parte Reexamination Under 37 C.F.R. §1.111, dated Dec. 8, 2009, in 8 pages.
Exhibit 6—U.S. Patent No. 7,190,511, dated Dec. 8, 2009, in 15 pages.
Exhibit 7—Excerpts of the Rebuttal Expert Report of Wayne H. Knox, Ph.D. on Invalidity, dated Dec. 8, 2009, in 3 pages.
Plaintiff IMRA America Inc.'s Rebuttal to Defendant IPG Photonics Corporation's Opening Claim Construction, dated Dec. 23, 2009, in 24 pages.
Index of Exhibits—Plaintiff IMRA America Inc.'s Rebuttal to Defendant IPG Photonics Corporation's Opening Claim Construction, dated Dec. 23, 2009, in 1 page (Exhibits E-F listed separately below).
Exhibit E—Ex Parte Reexamination Certificate, dated Dec. 23, 2009, in 10 pages.
Exhibit F—Second Declaration of Dr. Wayne H. Knox, dated Dec. 23, 2009, in 41 pages.
Defendant IPG Photonics Corporation's Responsive Claim Construction Brief, dated Dec. 23, 2009, in 26 pages.
Index of Exhibits—Defendant IPG Photonics Corporation's Responsive Claim Construction Brief, dated Dec. 23, 2009, in 1 page (Exhibits 8-10 listed separately below).
Exhibit 8—U.S. Patent No. 5,818,630 Reexamination Certificate, dated Dec. 23, 2009, in 10 pages.
Exhibit 9—Amendment during Reexamination, dated Dec. 23, 2009, in 38 pages.
Exhibit 10—Excerpts from Rebuttal Expert Report of Wayne H. Knox, Ph.D. on Invalidity, dated Dec. 23, 2009, in 4 pages.
IPG Photonics Corporation Technology Tutorial by Dr. Philip Bucksbaum, Apr. 2010, in 37 pages.
IMRA America, Inc. Technology Tutorial by Dr. Wayne H. Knox, Apr. 2010, in 43 pages.
Transcript of Technical Tutorial Presentation before District Judge Anna Diggs Taylor, dated Apr. 13, 2010, in 62 pages.
IMRA Markman Presentation, dated Jun. 2, 2010, in 79 pages.
Presentation of IPG Photonics Corporation at Claim Construction Hearing, dated Jun. 2, 2010, in 108 pages.
Transcript of Markman hearing before District Judge Arthur J. Tarnow, dated Jun. 2, 2010, in 120 pages.
Declaration of Kurt L. Glitzenstein, filed Jun. 3, 2010, in 3 pages.
Index of Exhibits—Declaration of Kurt L. Glitzenstein, filed Jun. 3, 2010, in 1 page. (Exhibits 11-15 listed separately below).

(56) References Cited

OTHER PUBLICATIONS

Exhibit 11—Excerpts from the Deposition of Martin Fermann taken on Mar. 9, 2010, filed Jun. 3, 2010, in 15 pages.
Exhibit 12—Excerpts from the Deposition of Richard C. Turner taken on May 4, 2010, filed Jun. 3, 2010, in 18 pages.
Exhibit 13—U.S. Patent No. 5,422,897, issued Jun. 6, 1995, filed Jun. 3, 2010, in 9 pages.
Exhibit 14—Excerpts from the Final Expert Report of Wayne H. Knox on Infringement served on Feb. 10, 2010, filed Jun. 3, 2010, in 6 pages.
Exhibit 15—Notice of Allowability for U.S. Patent No. 5,818,630 mailed May 26, 1998, filed Jun. 3, 2010, in 7 pages.
IPG Photonics Corporation's Supplemental Legal Memorandum Regarding New Argument Made at Hearing by IMRA America, Inc., dated Jun. 18, 2010, in 3 pages.
Plaintiff IMRA America, Inc.'s Response to Supplemental Legal Memorandum Regarding New Argument Made at Hearing, dated Jun. 23, 2010, in 5 pages.
Opinion and Order of District Judge Arthur J. Tarnow, dated Dec. 27, 2010, in 19 pages.
Third Proceeding Report in Request for Cancellation of Trial Decision, Case No. 2011 (Gyo-ke) 10201 between IPG Photonics and IMRA America Inc., dated Apr. 17, 2012, in 3 pages.
Exhibit Explanation (2) of IMRA America, Inc. in Request for Cancellation of Trial Decision, Case No. 2011 (Gyo-ke) 10201 between IPG Photonics and IMRA America Inc., dated Apr. 9, 2012, in 1 page.
Translation of Exhibit B-4 to Exhibit Explanation (2), Technical Presentation Material (defendant) in Request for Cancellation of Trial Decision, Case No. 2011 (Gyo-ke) 10201 between IPG Photonics and IMRA America Inc., dated Apr. 17, 2012, in 109 pages.
Exhibit Explanation (4) of IPG Photonics Corporation in Request for Cancellation of Trial Decision, Case No. 2011 (Gyo-ke) 10201 between IPG Photonics and IMRA America Inc., dated Apr. 9, 2012, in 2 pages.
Exhibit A29 to Exhibit Explanation (4), Yoda, H. et al. "Beam Quality Factor of Higher Order Modes in a Step-Index Fiber," Mar. 2006, Journal of Lightwave Technology, vol. 24 No. 3, pp. 1350-1355, and Japanese translation of selected passages, in 7 pages.
Translation of Exhibit A30 to Exhibit Explanation (4), Presentation by IPG Photonics Inc. Technical Hearing—IP High Court) in Request for Cancellation of Trial Decision, Case No. 2011 H23-(Gyo-ke)-10201 between IPG Photonics and IMRA America Inc., dated Apr. 17, 2012, in 57 pages.
Translation of Fourth Proceeding Report in Request for Cancellation of Trial Decision, Case No. 2011 (Gyo-ke) 10201 between IPG Photonics and Imra America Inc., dated Jun. 28, 2012, in 1 page.
Exhibit Explanation (3) of IMRA America, Inc. in Request for Cancellation of Trial Decision, Case No. 2011 (Gyo-ke) 10201 between IPG Photonics and IMRA America Inc., dated May 7, 2012, in 2 pages.
Exhibit B4 to Exhibit Explanation (3), Japanese translations of selected passages from M.J.F. Digonnet, "Passive and Active Fiber Optic Components," Stanford University Ph.D. dissertation, Sep. 1983 (previously submitted in its entirety), in 15 pages.
Translation of Exhibit B5 to Exhibit Explanation (3), Supplemental Materials in Technical Presentation Material (defendant) in Request for Cancellation of Trial Decision, Case No. 2011 (Gyo-ke) 10201 between IPG Photonics and IMRA America Inc., dated May 7, 2012, in 10 pages.
Exhibit B6 to Exhibit Explanation (3), YLP Series: Pulsed, High Energy Ytterbium Fiber Lasers IPG Photonics product catalogue, submitted May 7, 2012, in 2 pages.
Translation of Examiner's Refusal Decision of Patent Application No. 2007-146684 to applicant IMRA America, dated Aug. 9, 2012, in 4 pages.
Translation of the Court decision and Exhibits, Intellectual High Court of Japan, Judgment on Request for cancellation of trial decision 2011 (Gyo-Ke) No. 10201, dated Sep. 27, 2012, in 54 pages.

Translation of Petitioner IMRA America's Statement of reasons for the petitioner for the acceptance of final appeal, Heisei (24) (2012) (Gyo-no) No. 10061, dated Dec. 27, 2012, in 13 pages.
English Translation of originally filed claims in corresponding German Application No. 19861484.5, dated Feb. 11, 2010, in 4 pages.
English Translation of Office Action in corresponding German Application No. 19861484.5, dated Feb. 1, 2013, in 7 pages.
English Translation of Response to Office Action in corresponding German Application No. DE 19861484.5, dated Aug. 18, 2013, in 6 pages.
English Translation of New Claims filed with Response to Office Action in corresponding German Application No. DE 19861484.5, dated Aug. 18, 2013, in 4 pages.
B. Desthieux et al., "111 kW (0.5 mJ) pulse amplification at 1.5 µm using a gated cascade of three erbium-doped fiber amplifiers", Appl. Phys. Lett., vol. 63, No. 5, Aug. 2, 1993 pp. 586-588.
Martin E. Fermann, "Single-mode excitation of multimode fibers with ultrashort pulses", Optics Letters, vol. 23, No. 1, Jan. 1, 1998, pp. 52-54.
G. Nykolak et al., "An Erbium-Doped Multimode Optical Fiber Amplifier", IEEE Transactions Photonics Technology Letters, vol. 3, No. 12, Dec. 1991, pp. 1079-1081.
D. Taverner et al., "158-µ pulses from a single-transverse-mode, large-mode-area erbium-doped fiber amplifier", Optics Letters, vol. 22, No. 6, Mar. 15, 1997, pp. 378-380.
Appeal of the Decision of the Patent Division 1.54 in the opposition matter DE 198 61 429 B4, filed by Appellant IPG Laser GmbH, dated Jan. 8, 2013, in 61 pages.
E.G. Neumann, "Single-Mode Fibers—Fundamentals", Springer Verlag 1988, pp. 210-220, 281-319 (Exhibit E16).
A. Oehler et al., "New Field-Matching Techniques for Low-Loss Splices between Conventional and Dispersion-Flattened Single-Mode Fibres," 14th European Conference on Optical Communication, Electronics Division of the Institution of Electrical Engineers, Sep. 11-15, 1988, in 6 pages (Exhibit E17).
Stieb, W., et al., "Fusion Splices with Low Loss between SM-Fibers of Different Types", Preceedings of 37th International Wire and Cable Symposium, Reno, Nevada, Nov. 15-17, 1988, in 9 pages (Exhibit E18).
Digonnet, M. J. F., "Passive and Active Fiber Optic Components," Ph.D. Dissertation, Stanford University, Sep. 1983, in 206 pages (Exhibit E19).
Snitzer, "Proposed Fiber Cavities for Optical Masers," Journal of Applied Physics, vol. 32, No. 1, Jan. 1961, pp. 36-39.
Koester, et al., "Amplification in a Fiber Laser," Applied Optics, vol. 3, No. 10, Oct. 1964, pp. 1182-1186.
Manni, "Two-Photon Excitation Expands the Capabilities of Laser-Scanning Microscopy," Biophotonics International, Jan./Feb. 1996, pp. 44-48, 50 and 52.
Krasinski, et al., "Multipass Amplifiers Using Optical Circulators," IEEE Journal of Quantum Electronics, vol. 26, No. 5, May 1990, pp. 950-958.
Tamura, et al., "Unidirectional ring resonators for self-starting passively mode-locked lasers," Optics Letters, vol. 18, No. 3, Feb. 1, 1993, pp. 220-222.
Ober, et al., "42-fs pulse generation from a mode-locked fiber laser started with a moving mirror," Optics Letters, vol. 18, No. 5, Mar. 1, 1993, pp. 367-369.
Hofer, et al., "Mode locking with cross-phase and self-phase modulation," Optics Letters, vol. 16, No. 7, Apr. 1, 1991, pp. 502-504.
Hofer, et al., "Characterization of Ultrashort Pulse Formation in Passively Mode-Locked Fiber Lasers," IEEE Journal of Quantum Electronics, vol. 28, No. 3, Mar. 1992, pp. 720-728.
Ippen, et al., "Additive pulse mode locking," Optical Society of America, vol. 6, No. 9, Sep. 1989, pp. 1736-1745.
Taverner, et al., "Polarisation Maintaining Figure-8 Laser," believed to have been presented at the Optical Society America Topical Meeting on Nonlinear Guided Wave Phenomena, Cambridge, England, Sep. 20-22, 1993, paper WC3, pp. 367-370 and pp. 1-4.
Duling, III, et al., "A Single-Polarization Er-Doped Fiber Amplifier," believed to have been presented at a conference on Lasers and Electo-Optics, vol. 12 of 992 OSA Tech. Digest Series, paper CPDP 28. (1992), pp. 694-696.

(56) References Cited

OTHER PUBLICATIONS

Krausz, et al., "Passive mode locking in standing-wave laser resonators," Optics Letters, vol. 18, No. 11, Jun. 1, 1993, pp. 888-890.
Tamura, et al., "77-fs pulse generation from a stretched-pulse mode-locked all fiber ring laser," Optics Letters, vol. 18, No. 13, Jul. 1, 1993, pp. 1080-1082.
Kelly, "Characteristic sideband instability of the periodically amplified average soliton," Electronic Letters, vol. 28, No. 8, Apr. 9, 1992, pp. 806-807.
Menyuk, "Stability of solitons in birefringent optical fibers. II. Arbitrary amplitudes," Optical Society of America, vol. 5, No. 2, Feb. 1988, pp. 392-402.
Fermann, et al., "Additive-pulse-compression mode locking of a neodymium fiber laser," Optical Letters, vol. 16, No. 4, Feb. 15, 1991, pp. 244-246.
Fermann, et al., "Passive mode locking in erbium fiber lasers with negative group delay," Appl. Phys. Letter, vol. 62, Mar. 1, 1993, pp. 910-912.
Duling, III, "All-fiber ring soliton laser mode locked with a nonlinear mirror," Optics Letters, vol. 16, No. 8, Apr. 15, 1991, pp. 539-541.
Walling, et al., "Tunable Alexandrite Lasers: Development and Performance," IEEE Journal of Quantum Electronics, vol. QE-21, No. 10, Oct. 1985, pp. 1568-1581.
Harter, et al., "Low-magnification unstable resonators used with ruby and alexandrite lasers," Optics Letters, vol. 11, No. 11, Nov. 1986, pp. 706-708.
Harter, et al., "Short pulse amplification in tunable solid state materials," SPIE, vol. 1229, 1990, pp. 19-28.
Poole, et al., "Fabrication of Low-Loss Optical Fibres Containing Rare-Earth Ions," Electronics Letters, vol. 21, No. 17, Aug. 15, 1985, pp. 737-738.
Ferrmann, et al., "Passive mode locking using nonlinear polarization evolution in a polarization-maintaining erbium-doped fiber," OPTICS Letters, vol. 18, No. 11, Jun. 1, 1993, pp. 894-896.
Morioka, et al., "Ultrafast Reflective Optical Kerr Demultiplexer Using Polarisation Rotation Mirror," Electronics Letters, vol. 28, No. 6, Mar. 12, 1992, pp. 521-522.
Duling, III, et al., "Single-Polarisation Fibre Amplifier," Electronics Letters, vol. 28, No. 12, Jun. 4, 1992, pp. 1126-1128.
Matsas, et al., "Self-Starting Passively Mode-Locked Fabry-Perot Fiber Soliton Laser Using Nonlinear Polarization Evolution," IEEE Photonics Technology Letters, vol. 5, No. 5, May 5, 1993, pp. 492-494.
Ober, et al., "Self-starting diode-pumped femtosecond Nd fiber laser", Optics Letters, vol. 18, No. 18, Sep. 15, 1993, pp. 1532-1534.
Fermann, et al., "Environmentally stable Kerr-type mode-locked erbium fiber laser producing 360-fs pulses," Optics Letters, vol. 19, No. 1, Jan. 1, 1994, pp. 43-45.
Fermann, "Ultrashort-Pulse Sources Based on Single-Mode Rare-Earth-Doped Fibers," Applied Physics B, vol. 58, 1994, pp. 197-209.
Desurvire, et al., "High-gain erbium-doped traveling-wave fiber amplifier," Optics Letters, vol. 12, No. 11, Nov. 1987, pp. 888-890.
Loh, et al., "All-solid-state subpicosecond passively mode locked erbium-doped fiber laser," Applied Physics Letters, vol. 63, No. 1, Jul. 5, 1993, pp. 4-6.
Barnett et al., "High-power erbium-doped fiber laser mode locked by a semiconductor saturable absorber," Optics Letters, vol. 20, No. 5, Mar. 1995, pp. 471-473.
Loh, et al. "Diode-Pumped Selfstarting Passively Modelocked Neodymium-Doped Fibre Laser," Electronics Letters, vol. 29, No. 9, Apr. 29, 1993, pp. 808-810.
Duling, III, "Compact sources of ultrashort pulses," date unknown, pp. 179-207.
Reddy, et al., "A Turnkey 1.5 µm Picosecond Er/Yb Fiber Laser," Conference On Optical Fiber Communication, OFC, paper PD17, 1993.
In relation to U.S. Appl. No. 09/317,221, filed May 24, 1999 are the following Office Actions and Responses (5 documents): Office Action dated Jan. 31, 2002 (5 pages); Response to Jan. 31, 2002 Office Action (8 pages); Office Action dated Sep. 27, 2002 (4 pages); Response to Sep. 27, 2002 Office Action (6 pages); Office Action dated Apr. 22, 2003 (5 pages).
In relation to U.S. Appl. No. 10/645,662, filed Aug. 22, 2003 are the following Office Actions and Responses (2 documents): Office Action dated Apr. 8, 2004 (5 pages); Response to Apr. 8, 2004 Office Action (9 pages).
Bend losses of higher-order modes in dispersion-flattened multiple-clad optical fibres, H. Schwierz, E.G. Neumann, Fachbereich Elektrotechnik, Sep. 21, 1987.
Stimulated Raman scattering in a multimode optical fiber with bend-induced loss, A. Sharma, M. Dokhanian, Z.Q. Wu, R. Posey, A. Williams, P. Venkateswarlu, Optics Communications 111 (1994) 127-131.
G. Nykolak, et al., *An Erbium-Doped Multimode Optical Fiber Amplifier*, IEEE Transactions Photonics Technology Letters, vol. 3, No. 12, Dec. 1991.
M. Muendel, *Optimal inner cladding shapes for double-clad fiber lasers*, CLEO '96, Lasers and Electro-Optics, 1996, Jun. 2-7, 1996.
B. Desthieux, et al., *111 kW (0.5 mJ) pulse amplification at 1.5 µm using a gated cascade of three erbium-doped fiber amplifiers*, Appl. Phys. Lett. 63 (5), pp. 586-588, Aug. 2, 1993.
D. Taverner, et al., *158-µJ pulses from a single-transverse-mode, large-mode-area erbium-doped fiber amplifier*, Optics Letters, vol. 22, No. 6, pp. 378-380, Mar. 15, 1997.
Tuesday Afternoon, CLEO '98, CTu03 3:00 pm, Frequency dou7bling of Er-doped multimode fiber compressor-amplifers, Fermann, et al. Name: Fermann; Date: 1998.
OFC '98 Technical Digest, Tuesday Afternoon , TuG8 3:45 pm, "High power single mode fiber amplifiers using multimode fibers", Fermann, et al., pp. 39-40. Name: Fermann; Date: 1998.
Optics Letters, vol. 23, No. 1, Jan. 1, 1998, Single-mode excitation of multimode fibers with ultrashort pulses, Martin E. Fermann, pp. 52-54. Name: Fermann; Date: 1998.

\* cited by examiner

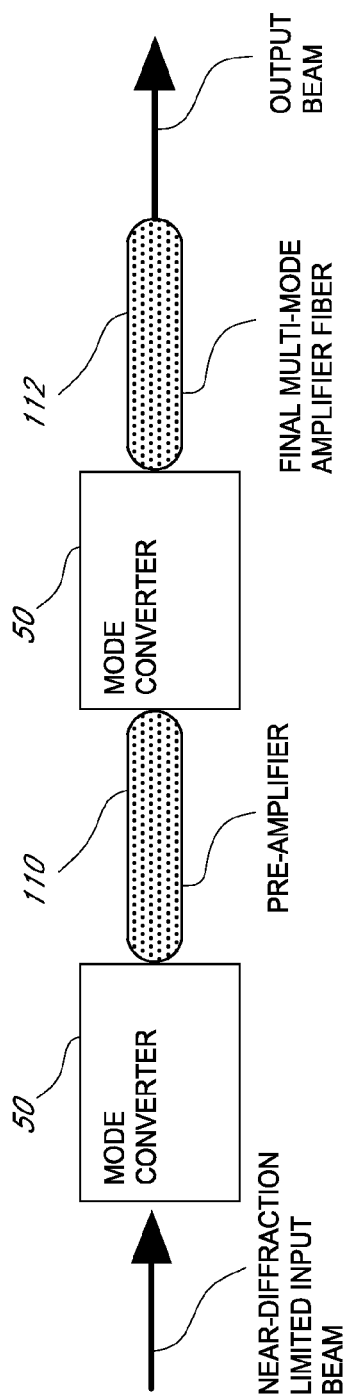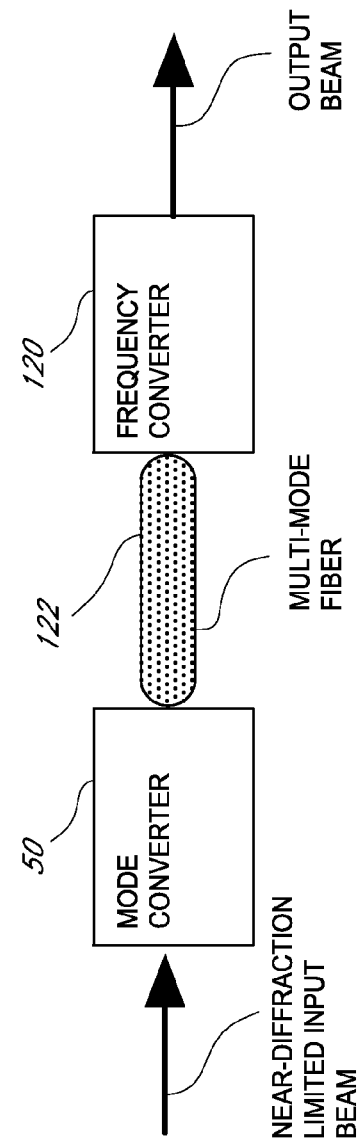

MULTI-MODE FIBER AMPLIFIER

RELATED APPLICATIONS

This application is a continuation application of U.S. application Ser. No. 09/785,944 filed Feb. 16, 2001, which is a continuation application of U.S. application Ser. No. 09/199,728 filed Nov. 25, 1998, now U.S. Pat. No. 6,275,512 issued Aug. 14, 2001.

FIELD OF THE INVENTION

The present invention relates to the amplification of single mode light pulses in multi-mode fiber amplifiers, and more particularly to the use of multi-mode amplifying fibers to increase peak pulse power in a mode-locked laser pulse source used for generating ultra-short optical pulses.

BACKGROUND OF THE INVENTION

Background Relating to Optical Amplifiers

Single-mode rare-earth-doped optical fiber amplifiers have been widely used for over a decade to provide diffraction-limited optical amplification of optical pulses. Because single mode fiber amplifiers generate very low noise levels, do not induce modal dispersion, and are compatible with single mode fiber optic transmission lines, they have been used almost exclusively in telecommunication applications.

The amplification of high peak-power pulses in a diffraction-limited optical beam in single-mode optical fiber amplifiers is generally limited by the small fiber core size that needs to be employed to ensure single-mode operation of the fiber. In general the onset of nonlinearities such as self-phase modulation lead to severe pulse distortions once the integral of the power level present inside the fiber with the propagation length exceeds a certain limiting value. For a constant peak power P inside the fiber, the tolerable amount of self-phase modulation $\Phi_{nl}$ is given by $$\Phi_{nl} = \frac{2\pi n_2 PL}{\lambda A} \le 5,$$

where A is the area of the fundamental mode in the fiber, ë is the operation wavelength, L is the fiber length and $n_2 = 3.2 \times 10^{-29}$ m$^2$/W is the nonlinear refractive index in silica optical fibers.

As an alternative to single-mode amplifiers, amplification in multi-mode optical fibers has been considered. However, in general, amplification experiments in multi-mode optical fibers have led to non-diffraction-limited outputs as well as unacceptable pulse broadening due to modal dispersion, since the launch conditions into the multi-mode optical fiber and mode-coupling in the multi-mode fiber have not been controlled.

Amplified spontaneous emission in a multi-mode fiber has been reduced by selectively exciting active ions close to the center of the fiber core or by confining the active ions to the center of the fiber core. U.S. Pat. No. 5,187,759, hereby incorporated herein by reference. Since the overlap of the low-order modes in a multi-mode optical fiber is highest with the active ions close to the center of the fiber core, any amplified spontaneous emission will then also be predominantly generated in low-order modes of the multi-mode fiber. As a result, the total amount of amplified spontaneous emission can be reduced in the multi-mode fiber, since no amplified spontaneous emission is generated in high-order modes.

As an alternative for obtaining high-power pulses, chirped pulse amplification with chirped fiber Bragg gratings has been employed. One of the limitations of this technique is the relative complexity of the set-up.

More recently, the amplification of pulses to peak powers higher than 10 KW has been achieved in multi-mode fiber amplifiers. See U.S. Pat. No. 5,818,630, entitled Single-Mode Amplifiers and Compressors Based on Multi-Mode Fibers, assigned to the assignee of the present invention, and hereby incorporated herein by reference. As described therein, the peak power limit inherent in single-mode optical fiber amplifiers is avoided by employing the increased area occupied by the fundamental mode within multi-mode fibers. This increased area permits an increase in the energy storage potential of the optical fiber amplifier, allowing higher pulse energies before the onset of undesirable nonlinearities and gain saturation. To accomplish this, that application describes the advantages of concentration of the gain medium in the center of the multi-mode fiber so that the fundamental mode is preferentially amplified. This gain-confinement is utilized to stabilize the fundamental mode in a fiber with a large cross section by gain guiding.

FIELD OF THE INVENTION

The present invention relates to the use of multi-mode fibers for amplification of laser light in a single-mode amplifier system.

DESCRIPTION OF THE RELATED ART

Rare-earth-doped optical fibers have long been considered for use as sources of coherent light, as evidenced by U.S. Pat. No. 3,808,549 to Maurer (1974), since their light-guiding properties allow the construction of uniquely simple lasers. However, early work on fiber lasers did not attract considerable attention, because no methods of generating diffraction-limited coherent light were known. Man current applications of lasers benefit greatly from the presence of diffract on limited light.

Only when it became possible to manufacture single-mode (SM) rare-earth-doped fibers, as reported by Poole et al. in "Fabrication of Low-Loss Optical Fibres Containing Rare-Ear Ions", *Optics Letters*, Vol. 22, pp. 737-738 (1985), did the rare-earth-doped optical fiber technology become viable. In this technique, only the fundamental mode of the optical fiber is guided at the lasing wavelength, thus ensuring diffraction-limited output.

Driven by the needs of optical fiber telecommunications for SM optical fiber amplifiers, nearly all further developments for more than a decade in this area were concentrated on perfecting SM fiber amplifiers. In particular, the motivation for developing SM fiber amplifiers stemmed from the fact that SM fiber amplifiers generate the least amount of noise and they are directly compatible with SM fiber optic transmission lines. SM fiber amplifiers also have the highest optical transmission bandwidths, since, due to the absence of any higher-order modes, modal dispersion is completely eliminated. In general, modal dispersion is the most detrimental effect limiting the transmission bandwidth of multi-mode (MM) optical fibers, since the higher-order modes, in general, have different propagation constants.

However, in the amplification of short-optical pulses, the use of SM optical fibers is disadvantageous, cause the limited core area limits the saturation energy of the optical fiber and thus the obtainable pulse energy. The saturation energy of a laser amplifier can be expressed as $$E_{sat} = \frac{h\nu A}{\sigma},$$

where h is Planck's constant, υ is the optical frequency, a is the stimulated emission cross section and A is the core area. The highest pulse energy generated from a SM optical fiber to date is about 160 μJ (disclosed by Taverner et al. in *Optics Letters*, Vol. 22, pp. 378-380 (1997), and was obtained from a SM erbium-doped fiber with a core diameter of 15 μm, which is about the largest core diameter that is compatible with SM propagation at 1.55 μm. This result was obtained with a fiber numerical aperture of NA≈0.07. Any further increase in core diameter requires a further lowering of the NA of the fiber and results in an unacceptably high sensitivity to bend-losses.

As an alternative to SM amplifiers amplification in multimode (MM) optical fibers has been considered. See, for example, "Chirped-pulse amplification of ultrashort pulses with a multi-mode Tm:ZBLAN fiber upconversion amplifier" by Yang et al., *Optics Letters*, Vol. 20, pp. 1044-1046 (1995). However, in general, amplification experiments in MM optical fibers have led to non-diffraction-limited outputs as well as unacceptable pulse broadening due to modal dispersion, since the launch conditions into the MM optical fiber and mode-coupling in the MM fiber were not controlled.

It was recently suggested by Griebner et al. in "Efficient laser operation with nearly diffraction-limited output from a diode-pumped heavily Nd-doped multi-mode fiber", *Optics Letters*, Vol. 21, pp. 266-268 (1996), that a near diffraction-limited output be can be obtained from a MM fiber laser when keeping the fiber length shorter than 15 mm and selectively providing a maximum amount of feedback for the fundamental mode of the optical fiber. In this technique, however, severe mode-coupling was a problem, as the employed MM fibers supported some 10,000 modes. Also, only an air-gap between the endface of the MM fiber and a laser mirror was suggested for mode-selection. Hence, only very poor modal discrimination was obtained, resulting in poor beam quality.

In U.S. Pat. No. 5,187,759 to DiGiovanni et al., it was suggested that amplified spontaneous emission (ASE) in a MM fiber can be reduced by selectively exciting any active ions lose to the center of the fiber core or by confining the active ions to the center of the fiber core. Since the overlap of the low-order modes in a MM optical fiber is highest with the active ions close to the center of the fiber core, any ASE will then also be predominantly generated in low-order modes of the MM fiber. As a result, the total amount of ASE can be greatly reduced in MM fiber, since no ASE is generated in high-order modes. However, DiGiovanni described dopant confinement only with respect to ASE reduction. DiGiovanni did not suggest that, in the presence of mode-scattering, dopant confinement can enhance the beam quality of the fundamental mode of the M fiber under SM excitation. Also, the system of DiGiovanni did not take into account the fact that gain-guiding induced by dopant confinement can in fact effectively guide a fundamental mode in a MM fiber. This further reduces ASE in MM fibers as well as allowing for SM operation.

In fact, the system of DiGiovanni et al. is not very practical, since it considers a MM signal source, which leads to a non-diffraction-limited output beam. Further, only a single cladding was considered for the doped fiber, which is disadvantageous when trying to couple high-power semi-conductor lasers into the optical fibers. To couple high-power semiconductor lasers into MM fibers, a double-clad structure, as suggested in the above-mentioned patent to Maurer, can be of an advantage.

To the inventors' knowledge, gain-guiding has not previously been employed in optical fibers. On the other hand, gain-guiding is well known in conventional semiconductor and solid-state lasers. See, for example, "Alexandrite-laser-pumped $Cr^{3+}$:Li rAlF$_6$" by Harter et al., *Optics Letters*, Vol. 17, pp. 1512-1514 (1992). Indeed, in SM fibers, gain-guiding is irrelevant due to the strong confinement of the fundamental mode by the wave-guide structure. However, in MM optical fibers, the confinement of the fundamental mode by the waveguide structure becomes comparatively weaker, allowing for gain-guiding to set in. As the core size in a MM fiber becomes larger, light propagation in the fiber structure tends to approximate free-space propagation. Thus, gain-guiding can be expected eventually to be significant, provided mode-coupling can be mad sufficiently small. In addition to providing high pulse energies, MM optical fiber amplifiers can also be used to amplify very high peak power pulses due to their increased fiber cross section compared to SM fiber amplifiers. MM undoped fibers and MM amplifier fibers can also be used for pulse compression as recently disclosed by Fermann et al. in U.S. application Ser. No. 08/789,995 (filed Jan. 28, 1997). However, this work was limited to the use of MM fibers as soliton Raman compressors in conjunction with a nonlinear spectral filtering action to clean-up the spectral profile, which may limit the overall efficiency of the system.

Compared to pulse compression in SM fibers, such as that disclosed in U.S. Pat. No. 4,913,520 to Kafka et al., higher-pulse energies can be obtained in MM fibers due to the increased mode-size of the fiber. In particular, V-values higher than 2.5 and relatively high index differences between core and cladding (i.e. a $\Delta n > 0.3\%$) can be effectively employed. In "Generation of high-energy 10-fs pulses by a new pulse compression technique", Conference on Lasers and Electro-Optics, CLEO 91, paper DTuR5, Optical Society of America Technical Digest Series, #9, pp. 189-190 (1996), M. Nisoli et al. suggested the use of hollow-core fibers for pulse-compression, as hollow-core fibers allow an increase in the mode size of the fundamental mode. However, hollow-core fibers have an intrinsic transmission loss, they need to be filled with gas, and they need to be kept straight in order to minimize the transmission losses, which makes them highly impractical.

As an alternative to obtaining high-power pulses, chirped pulse amplification with chirped fiber Bragg gratings may be employed, as disclosed in U.S. Pat. No. 5,499,134 to Galvanauskas et al. (1996). One of the limitations of this technique is that, in the compression grating, a SM fiber with a limited core area is employed. Higher pulse energies could be obtained by employing chirped fiber Bragg gratings in MM fibers with reduced mode-coupling for pulse compression. Indeed, unchirped fiber Bragg gratings were recently demonstrated in double-mode fibers by Strasser et al. in "Reflective-mode conversion with UV-induced phase gratings in two-mode fiber", *Optical Society of America Conference on Optical Fiber Communication*, OFC97, pp. 348-349, (1997). However, these gratings were blazed to allow their use as mode-converters, i.e., to couple the fundamental mode to a higher-order mode. The use of Bragg gratings in pulse-compression calls for an unblazed grating to minimize the excitation of any higher-order modes in reflection.

It has long been known that a SM signal can be coupled into a MM fiber structure and preserved for propagation lengths of 100 s of meters. See, for example, "Pulse Dispersion for Single-Mode Operation of Multi-mode Cladded Optical Fibres", Gambling et al., *Electron. Lett.*, Vol. 10, pp. 148-149, (1974) and "Mode conversion coefficients in optical fibers", Gambling et al., *Applied Optics*, Vol. 14, pp. 1538-1542, (1975). However, Gambling et al. found low levels of mode-coupling only in liquid-core fibers. On the other hand, mode-coupling in MM solid-core fibers was found to be severe, allowing for the propagation of a fundamental mode only in mm lengths of fiber. Indeed, as with the work by Griebner et al., Gambling et al. used MM solid-core optical fibers that supported around 10,000 or more modes.

In related work, Gloge disclosed in "Optical Power Flow in Multi-mode Fibers", The Bell System Technical Journal, Vol. 51, pp. 1767-1783, (1972), the use of MM fibers that supported only 700 modes, where mode-coupling was sufficiently reduced to allow SM propagation over fiber lengths of 10 cm.

However, it was not shown by Gloge that mode-coupling can be reduced by operating MM fibers at long wavelengths (1.55 µm) and by reducing the total number of modes to less than 700. Also, in this work, the use of MM fibers as amplifiers and the use of the nonlinear properties of MM fibers was not considered.

The inventors are not aware of any prior art using MM fibers to amplify SM signals where the output remains primarily in the fundamental mode, the primary reason being that amplification in MM fibers is typically not suitable for long-distance signal propagation as employed in the optical telecommunication area. The inventors are also not aware of any prior art related to pulse compression in multi-mode fibers, where the output remains in the fundamental mode.

All of the above-mentioned articles, patents and patent applications are hereby incorporated herein by reference.

SUMMARY OF THE INVENTION

It is an object of the present invention to increase the energy storage potential in an optical fiber amplifier and to produce peak powers and pulse energies which are higher than those achievable in single-mode (SM) fibers before the onset of undesirable nonlinearities and gain saturation.

Another object of the present invention is to achieve amplification of the fundamental mode within a multi-mode (MM) fiber while reducing amplified spontaneous emission (ASE).

A further object of the present invention is to employ gain-guiding within a MM fiber to improve the stability of the fundamental mode.

Yet another object of the present invention is to compress high peak power pulses into the range of a few psec to a fsec while preserving a near diffraction-limited output.

To achieve the above objects, the present invention employs a multi-mode (MM) optical fiber in an optical amplification system. According to the present invention, MM optical fibers, i.e., fibers with a V-value greater than approximately 2.5, provide an output in the fundamental mode. This allows the generation of much higher peak powers and pulse energies compared to SM fibers before the onset of undesirable nonlinearities and gain saturation. The increased fiber cross section equally greatly increases the energy storage potential in an optical fiber amplifier. The amplification system of the present invention is useful in applications requiring ultrafast and high-power pulse sources.

According to one aspect of the present invention, the gain medium is in the center of the MM fiber so that the fundamental mode is preferentially amplified and spontaneous emission is reduced. Further, gain-confinement is used to stabilize the fundamental mode in a fiber with a large cross section by gain guiding.

According to one embodiment of the present invention, the exploitation of self-phase modulation and other nonlinearities in (rare-earth) doped or undoped MM fibers allows the compression of high peak power pulses into the range of a few fsec while a near diffraction-limited output is pre-served.

According to another embodiment of the present invention, by writing chirped fiber Bragg gratings into MM optical fibers with reduced mode-coupling, the power limits for linear pulse compression of high-power optical pulses are greatly increased. Further, by employing double-clad MM fiber amplifiers, pumping with relatively large-area high-power semiconductor lasers is made possible.

According to yet another embodiment of the present invention, the incorporation of efficient mode-filters enables cw lasing in a near diffraction-limited single mode from (rare-earth) doped MM optical fibers.

According to yet another embodiment of the present invention, MM optical fibers allow the construction of fiber optic regenerative amplifiers and high-power Q-switched lasers. Further, MM optical fibers allow the design of cladding-pumped fiber lasers using dopants with relatively weak absorption cross sections.

These and other objects and features of the present invention will be apparent from the following detailed description of the preferred embodiments and the accompanying drawings.

DETAILED DESCRIPTION OF THE PREFERRED EMBODIMENTS

FIG. 1 illustrates an amplifier system according to a first embodiment of the present invention. In the example shown in FIG. 1, a femtosecond single-mode (SM) fiber oscillator 10, such as an erbium fiber oscillator, is coupled into a multi-mode (MM) fiber amplifier 12, such as an erbium/ytterbium fiber amplifier. Other examples of suitable MM fiber amplifiers include those doped with Er, Yb, Nd, Tm, Pr or Ho ions. Oscillators suitable for use in this system are described in the above-mentioned U.S. patent application Ser. No. 08/789, 995 to Fermann et al.

A two-lens telescope 14 (L1 and L2) is used to match the mode from the oscillator 10 to the fundamental mode of the MM amplifier 12. In addition, the output of the pumped MM fiber 12 is imaged into a second SM fiber (mode-filter (MF) fiber 16 in FIG. 1) using lenses L3 and L4. Lenses L3 and L5 and beamsplitter 18 are used to couple the pump light from pump source 20 into the amplifier fiber, as described below.

In one example of the system arranged according to FIG. 1, the oscillator 10 delivers 300 fsec near bandwidth-limited pulses at a repetition rate of 100 MHz at a wavelength of 1.56 µm with a power level of 14 mW.

The amplifier fiber 12 can be, for example, a double-clad MM erbium/ytterbium amplifier with a core diameter of ≈28 µm and a core numerical aperture of NA=0.19. The inner cladding in this example has a diameter of ≈220 µm and a numerical aperture of NA=O0.24. The core is located in the center of the inner cladding. The length of the amplifier is 1.10 m.

To increase the number of propagating modes in the MM amplifier 12 and for testing purposes, shorter wavelengths such as 780 and 633 nm were also used. In this, a femtosecond laser source operating at 780 nm and a cw laser source at 633 nm can be launched into the MM amplifier fiber 12.

The MF fiber 16 can then be replaced with a fiber with a core diameter of 4 μm to ensure SM operation at these two wavelengths.

The approximate number of modes in the MM amplifier is calculated from its V-value.

$$v = \frac{2\pi a}{\lambda} NA, \text{ number of modes} = \frac{1}{2}v^2 \quad (1)$$

where a is the core radius and λ is the signal wavelength. The V-value at 1.55 μm is thus V≈10.8, and the number of modes is hence calculated as ≈58 for the above example. Typically, a fiber is considered MM when the V-value exceeds 2.41, i.e., when modes in addition to the fundamental mode can propagate in the optical fiber.

For equal excitation of N modes of a MM fiber supporting N modes the maximum coupling efficiency into a SM fiber is given approximately by $$\eta \approx (\theta_0/\theta_{max})^2 \approx 1/N \quad (2)$$

where $\theta_0 \approx \lambda/4a$ is the divergence half-angle of the fundamental mode of the MM fiber. $\theta_{max}$ is the maximum divergence half-angle of the outer-most modes of the MM fiber. It is assumed that the output from the MM fiber is linearly polarized which is an appropriate assumption for the excitation of the lowest order modes in the fiber. Under SM excitation of the MM fiber and in the absence of mode-coupling, $\theta_{max}(Z)$–$\theta_0$ independent of fiber length. However, in the presence of mode-coupling $\theta_{max}$ will increase, and, as a result, the possible coupling efficiency from the output of the MM fiber into a SM fiber will decrease as $\eta(z)=(\theta_0/\theta_{max}(z))^2$. Using the above-mentioned work by Gloge, $\eta(z)$ can be written as:

$$\eta(z) = \frac{\theta_0^2}{4Dz + \theta_0^2} \quad (3)$$

where D is the mode-coupling coefficient as defined by Gloge. Thus, a measurement of $\eta(z)$ gives the mode-coupling coefficient D. Equally, from equation (2), a measurement of η gives the approximate number of excited modes of a MM fiber. It is instructive to relate N to the $M^2$-value that is typically used to characterize the quality of near-diffraction-limited optical beams. It may be shown that $N \approx \sqrt{M^2}$. According to the present invention, a low level of mode-coupling is desirable, so that the amplified beam provided at the output of the MM fiber amplifier 12 is substantially in the fundamental mode. Accordingly, an $M^2$-value less than 10 is desirable, with an $M^2$-value less than 4 being preferable, and an $M^2$-value less than 2 being more preferable. Further, the number of modes is preferably in the range of 3 to 3000 and more preferably in the range of 3 to 1000.

Mode-coupling was measured in a 1.1 m length of unpumped amplifier fiber for the above-described erbium/ytterbium fiber (fiber 1), and three commercially available MM-fibers (fiber 2, 3 and 4). The fiber parameters and the mode-coupling coefficient D (in m$^{-1}$) of these fibers are shown in Table 1. Fibers 1, 3 and 4 are made by the MCVD process; fiber 2 is made by a rod-in-tube technique.

TABLE 1

|  | fiber 1 | fiber 2 | fiber 3 | fiber 4 |
| --- | --- | --- | --- | --- |
| NA | 0.19 | 0.36 | 0.13 | 0.13 |
| core diameter (μm) | 28 | 50 | 50 | 50 |
| cladding diameter (μm) | 200 | 125 | 125 | 250 |
| number of modules at 1.55 μm | 58 | 665 | 87 | 87 |
| number of modes at 0.79 μm | 223 |  |  |  |
| number of modes at 0.63 μm | 330 |  |  |  |
| D(m$^{-1}$) at 1.55 μm | <2 × 10$^{-6}$ | 8 × 10$^{-4}$ | 8 × 10$^{-5}$ | 7 × 10$^{-6}$ |
| D(m$^{-1}$) at 0.79 μm | 4 × 10$^{-6}$ |  |  |  |
| D(m$^{-1}$) at 0.63 μm | 2 × 10$^{-5}$ |  |  |  |
| $L_b$(mm) at 1.55 μm | 1.9 | 5.3 | 5.7 | 5.7 |
| $L_b$(mm) at 0.79 μm | 3.3 |  |  |  |
| $L_b$(mm) at 0.63 μm | 4.1 |  |  |  |
| $M^2$(1 m) at 1.55 μm | 1.0 | 200 | 5.4 | 1.25 |
| $M^2$(1 m) at 0.79 μm | 1.2 |  |  |  |
| $M^2$(1 m) at 0.63 μm | 2.6 |  |  |  |

The coupling coefficients allow, in turn, the calculation of the expected $M^2$ value. In this example, the calculated $M^2$-values were produced after propagation through 1 m of MM fiber 12. For fiber 1, a good agreement between the calculated and separately measured $M^2$-values was obtained.

The beat length $L_b$ between the fundamental $LP_{01}$ and the next higher-order $LP_{11}$ mode is also given in Table 1. The beat length $L_b$ is defined as the length it takes for the two modes to accumulate a differential phase-shift of 2π along the propagation direction. Assuming a constant scattering power spectrum, for a fixed wavelength, D can be shown to be proportional to $L_b^4$.

See: D. Marcuse, "The Theory of Dielectric Optical Waveguides", p. 238, Academic Press (1974); Gloge. The longer the beat length, the closer the modes are to being phase-matched and the more power will couple as a function of length. Since, as disclosed by Gloge, mode-coupling is expected to be largest between adjacent modes, it is desirable to use $LP_{01}/LP_{11}$ beat lengths as short as possible to avoid mode-coupling.

In general, high levels of mode-coupling can be expected from fibers with high scattering loss. This suggests the possibility of low mode-coupling coefficients at long wavelengths in fibers with low scattering loss. As can be seen from Table 1, a dramatic reduction of mode-coupling occurs with increased wavelength in fiber 1. An acceptable level of mode-coupling is achieved in fiber 1 down to wavelengths as short as 790 nm. Since the number of modes of an optical fiber depends only on the ratio a/π, a fiber similar to fiber 1 with a core diameter as large as 56 μm can produce acceptable levels of mode-coupling in a 1 m length. Due to the reduction of scattering at longer wavelengths, even larger core diameters are acceptable at longer wavelengths. For example, a MM fiber with a core diameter of 60 μm can amplify pulses with a peak power 16 times larger than possible with SM amplifiers described by Taverner et al. Indeed, acceptable levels of mode coupling were obtained for a specifically designed fiber with a 50 μm core diameter as evident from Table 1 and explained in the following.

Further, it is clear that, to minimize mode-coupling, step-index MM fibers are more useful than graded-index MM fibers, since the propagation constants in graded-index fibers are very similar, which greatly increases their sensitivity to mode coupling. To minimize mode-coupling, the difference in the propagation constants between fiber modes is preferably maximized.

Fiber 2 was manufactured by a rod-in-tube technique with intrinsic high scattering losses leading to much larger mode-coupling coefficients compared to the MCVD-grown fibers 1, 3 and 4. Also, the mode-coupling coefficients measured in fiber 2 are similar to results obtained by Gambling et al. and Griebner et al., who also used step-index solid-core fibers manufactured by rod-in-tube techniques. As a consequence, reduced mode-coupling can be expected from directly grown MM fibers employing, for example, MCVD, OVD, PCVD or VAD fiber fabrication techniques.

As shown in Table 1, the mode-coupling coefficients obtained in fiber 4 at 1.55 μm are about a factor of 11 smaller than in fiber 3. This difference is explained by the fact that the outside diameter of fiber 4 is 250 μm, whereas the outside diameter of fiber 3 is 125 μm. In general, a thicker fiber is stiffer and less sensitive to bend and micro-bend induced mode-coupling, as evident from Table 1.

In experiments conducted by the inventors, the lowest mode-coupling coefficients were obtained by longitudinally stretching the optical fibers. For example, the mode-scattering coefficients of fiber 2 and 3 were measured while keeping the fiber under tension and while keeping the fiber straight. The application of tension in short lengths of fibers can be useful in obtaining the best possible mode-quality.

Mode-coupling was also measured in a configuration where the amplifier fiber (fiber 1) was pumped, as shown in FIG. 1. Specifically, the amplifier was pumped at a wavelength of 980 nm contra-directionally with respect to the signal with a launched power up to 3 W from a broad-stripe semiconductor laser with an active area of 1×500 μm, where demagnification was employed to optimize the power coupling into the inner cladding of the MM amplifier fiber. The amplifier was cleaved at an angle of about 8° to eliminate spurious feedback. A signal power up to 100 mW was then extracted from the amplifier system at 1.56 μm.

The coupling efficiency of the MM amplifier fiber 12 into the MF fiber 16 as a function of bend-radius of the MM amplifier fiber 12 is shown in FIG. 2. For a straight MM amplifier fiber and for a bend-radius of 10 cm, a coupling efficiency up to 94% is obtained into the MF fiber 16, demonstrating that mode-coupling is nearly completely absent in the MM amplifier fiber 12 and that a SM can indeed propagate over lengths of several meters in such fibers. No clear onset of mode-coupling is visible even for a bend-radius of 5 cm, since, even in this case, a coupling efficiency of about 90% from the MM amplifier fiber 12 to the MF fiber 16 is obtained.

Since the measured coupling efficiencies from the MM amplifier 12 to a SM fiber are nearly the same under unpumped and pumped conditions, it is evident that gain-guiding is relatively weak in this particular amplifier fiber. This observation was also verified by a simple computer model (see below). However, clearly any dopant confinement in the center of the MM amplifier core will predominantly lead to amplification of the fundamental mode. Any light scattered into higher-order modes will experience less gain and, due to the reduced intensity overlap of the higher-order modes with the fundamental mode, low levels of scattered light in higher-order modes will also not saturate the gain of the fundamental mode. Thus, while in the above-described experimental example, the mode-scattering coefficients were so low that any effects due to gain-guiding were not readily observable, in general, gain-guiding plays a role in a MM amplifier system according to the present invention. In addition, the above-mentioned computer model predicts the onset of gain-guiding of the fundamental mode in MM fibers with larger core diameter and/or reduced refractive index differences between the core and cladding.

As the mode diameter increases, the size of the SM can be determined by the gain profile under small signal conditions, i.e. in the absence of gain saturation. This allows a length-dependent mode size. Initially, under small signal conditions, the mode is confined by gain-guiding. As the gain saturates, gain guiding becomes less relevant and the mode size can increase, limited eventually by the core of the MM fiber. A length-dependent mode size can also be achieved by employing a core size which tapers along the fiber length. This can, for example, be achieved by tapering the outside fiber diameter along the fiber length.

In the presence of gain-guiding, amplified spontaneous emission (ASE) is reduced, as the MM fiber essentially becomes SM. In the presence of gain-guiding, ASE is also guided predominantly in the fundamental mode, rather than in all possible modes of the MM fiber, leading to an improvement in the noise properties of the MM fiber.

Equally, in the experimental example, dopant-confinement was observed to lead to a significant reduction in the amplified spontaneous emission (ASE) levels in the fiber. This was verified by measuring the coupling efficiency of the ASE from the MM amplifier 12 into the MF fiber 16. In this case, no signal light was coupled into the MM amplifier fiber 12. For an ASE power level of 1 mW, a coupling efficiency as high as 15% was measured. A comparison with equation (2) indicates that ASE is generated mainly in about 13 low-order modes (here a factor of two from polarization degeneracy is accounted for), i.e., ASE is generated in only about 20% of the total mode-volume of the amplifier fiber. The large reduction in ASE which was observed not only reduces the noise level in the amplifier; low levels of ASE also allow a reduction of the signal power that is required to saturate the amplifier. To extract the highest energy from an oscillator-amplifier signal pulse source, an operation of the amplifier in saturation is generally preferred.

The coupling efficiency at 1.55 μm and at 780 nm from the MM amplifier fiber 12 to the MF fiber 16 was not found to vary when applying small mechanical perturbations to the optical fiber. In a practical optical system, the applied mechanical perturbations are small compared to the perturbations inflicted by a 5 cm bend radius, which indicates that long-term stability of the mode-propagation pattern in such fibers can be achieved.

The MM amplifier 12 is polarization preserving for bend-radii as small as 10 cm. To obtain a high-degree of polarization holding, elliptical fiber cores or thermal stresses can be used in such fibers.

The autocorrelation of the amplified pulses from the MM amplifier fiber 12 (bend radius=10 cm) measured under the condition of optimum mode-match and a condition of non-optimum mode-match are respectively shown in FIGS. 3 and 4. Under non-optimum mode-match, the autocorrelation displays several peaks due to the excitation of higher-order modes, which have different propagation constants. However, under optimum mode-matching conditions, any secondary peaks are suppressed to better than 1%, which indicates the high-quality of the pulses emerging from the MM amplifier fiber.

In general, the spectrum of the pulses measured at the output of the MM amplifier fiber 12 is more critically dependent on the coupling conditions than the autocorrelation. The reason for this is that the spectral measurement is sensitive to the phase between the fundamental mode and the higher-order modes, i.e., an energy content of higher-order modes of only 1% in the output of the MM fiber leads to a perturbation of the shape of the spectrum by 10%.

FIG. 5 is a block diagram of a multi-mode fiber amplifier system according to a second embodiment of the present invention. The system includes a near-diffraction limited input beam, a mode-converter 50 and a MM fiber amplifier 52. The near-diffraction limited input beam can be generated from any laser system, which need not be a fiber laser. The near-diffraction limited input beam can contain cw or pulsed radiation. The mode-converter 50 can consist of any type of optical imaging system capable of matching the mode of the MM amplifier 52. For example, a lens system may be employed. Alternatively, a section of tapered fiber may be employed, such that the output mode at the end of the tapered fiber is matched to the mode of the MM amplifier fiber 52. In this case, the mode-converter can be spliced directly to the MM fiber 52 producing a very compact set-up. Any pumping configuration could be employed for the MM amplifier fiber, such as contra- or co-directional pumping with respect to the signal or side-pumping. Equally, the NA of the pump light could be reduced to minimize ASE. In this case, the use of just a single-clad fiber is more advantageous, where the pump light is directed into the fiber core. In general, the MM amplifier 52 can have a single, double or multiple cladding.

In the case of co-directional pumping, the pump light and the signal light are launched via a dichroic beamsplitter (not shown). The coupling optics are then optimized to simultaneously optimize the coupling of the pump beam and the signal beam.

A single or a double pass of the signal through the MM fiber 52 is most convenient. In the case of a double-pass configuration, a Faraday rotator mirror can be employed to eliminate polarization drifts in the system. Of course, in a double-pass configuration, after the first pass through the amplifier the coupling of the signal into higher-order modes must be avoided to ensure a near-diffraction limited output.

Optionally, linear or nonlinear optical elements can be used at the output of the system. Such a system is compatible with any application that has been used in conjunction with conventional laser systems.

Many nonlinear applications indeed require high peak pulse powers for their efficient operation, which are very difficult to achieve in cladding-pumping SM amplifiers due to the 10 s of meters of fiber length that are typically employed in such systems. Even in standard SM optical amplifiers, peak powers greater than 1 kW/amplifier length can rarely be achieved. In contrast, peak powers of ≈15 kW are achievable in a 1.5 m length of double-clad Er/Yb fiber (fiber 1 from Table 1) without appreciable non-linear effects, i.e., peak powers greater than 20 kW/amplifier length can be achieved.

According to the present invention, the use of a MM amplifier is beneficial not only by way of allowing the use of a large core diameter; the use of a MM amplifier also allows a reduction of the ratio cladding/doped core diameter, which minimizes the amplifier length and thus the amplifier non-linearity. However, this leads to the generation of more ASE noise.

FIG. 6 is a block diagram illustrating a multi-mode fiber amplifier system according to a third embodiment of the present invention. In the system of the third embodiment, high-power optical pulses can be propagated (or amplified) in undoped (or amplifier) MM fibers, such that spectral broadening is obtained to allow for pulse compression of the amplifier output. For applications in nonlinear pulse-compression, optical fibers with either positive (non-soliton-supporting) or negative (soliton-supporting) dispersion can be employed. The power levels in the multi-mode fiber 60 are raised to obtain an appreciable amount of self-phase modulation. The interplay of dispersion and self-phase modulation in the optical fiber can then be used to broaden the spectrum of the optical pulses and to obtain pulse compression.

When the MM fiber 60 is soliton supporting, higher-order soliton compression may be used to produce short pulses from the MM fiber 60 directly. In general, in the case of positive dispersion (non-soliton supporting) fiber, additional linear or nonlinear pulse-compression components must be used to compress the spectrally broadened optical pulses. In this case, a conventional linear pulse compressor 62 (such as a prism, grating, grism or SM chirped fiber Bragg grating) may be used at the output of the system. Also, chirped periodically poled doubling crystals may be used to obtain a compressed, frequency-doubled pulse. Equally, chirped fiber Bragg gratings may be written into the MM optical fiber 60 with reduced mode-coupling to reduce the nonlinearities of such structures when applied to linear pulse compressor 62. The Bragg grating should not be blazed to eliminate the excitation of higher-order modes in reflection.

FIG. 7 is a diagrammatic view of a system according to a fourth embodiment of the present invention. As shown in FIG. 7, a mode-filter 70 is inserted in front of one of the cavity mirrors M1 and M2 to ensure a diffraction-limited output of the system. The mode filter 70 can consist of a standard SM fiber in conjunction with appropriate mode-matching optics. Alternatively, a tapered fiber can be used (as discussed above) to provide for mode-matching. For optimum mode-coupling the efficiency of the laser will be nearly as high as for an all-SM laser. However, the use of MM amplifier 76 allows for increased design flexibility. Thus, double-clad erbium/ytterbium fibers with different core-cladding ratios can be employed wherever appropriate.

According to a fifth embodiment, the use of MM fiber allows the design of double-clad fibers with low absorption cross sections. For example, a double-clad Er-doped amplifier fiber may be constructed from MM fibers. Typically Er-doped double-clad fibers are relatively inefficient, since large cladding/core ratios have to be employed in order to absorb pump light from broad area diode lasers while still preserving a SM fiber core. Typically, such a design would involve a $\Phi_{cl}=100$ μm diameter cladding and a $\Phi_{co}=10$ μm diameter core. The effective absorption of such a structure is 100 times ($=\Phi_{cl}/\Phi_{co})^2$ smaller than the absorption in a single-clad Er-doped fiber. Thus, 100 times longer fiber amplifier lengths are required in this case. However, by implementing MM Er-doped fiber, the core size can be greatly increased, producing much smaller cladding/core ratios and shorter amplifier lengths which is very beneficial for the design of high-power lasers. Of course, for the design of high-power Er double-clad lasers, cladding diameters even larger than 100 μm can be implemented. A conceptual drawing of a fiber cross section employing a doped MM fiber core and an undoped fiber cladding is shown in FIG. 8. As shown in FIG. 8, the active dopant is confined in a cross section, defined by the dopant profile, substantially smaller than the fiber core, as defined by the refractive index profile. Of course, in such laser system, dopant confinement increases the amplifier length, thus only relatively weak doping confinement is useful.

According to a sixth embodiment of the present invention, as shown in FIG. 9, a fiber regenerative amplifier may be constructed from a MM fiber amplifier 90. A regenerative amplifier is useful for obtaining mJ energies from MM fiber amplifiers. Due to the limited gain of MM fiber amplifiers, the extraction of mJ energies will typically require several passes through the amplifier, which is facilitated by the regenerative amplifier. As shown in FIG. 9, a fast optical switch (OS) 92 is used to switch the pulses in and out of the regenerative amplifier. A mode-filter 94 can also be included to "clean-up" the fiber mode in the amplification process. The mode-filter 94 can consist of a spatial filter to minimize any nonlinearities in the regenerative amplifier.

The seed pulse is selected from the oscillator 96 by the optical switch 92 at the desired repetition rate. The Faraday rotator 98 and the polarization beam splitter 99 are used to couple the amplified pulse out of the system.

Either cw or pulsed pumping of the amplifier can be employed.

According to a seventh embodiment of the present invention shown in FIG. 10, a MM Q-switched fiber laser source is constructed. The large cross-sections possible with MM fibers allow greatly increasing the energy storage compared to a single-mode fiber. As a result, high-power Q-switched pulses may be directly generated from such a system. Typically, these pulses have a duration in the nsec regime. As shown in FIG. 10, a mode-filter 100 can also be included to ensure an optimum mode-quality. The optical switch 102 is employed for output coupling and it also serves to modulate the loss (Q) of the cavity defined by the two mirrors M1 and M2 and the MM amplifier 104. Alternatively, the output can be extracted by using a partially transmissive mirror M2.

According to an eighth embodiment of the present invention shown in FIG. 11, a preamplifier is included in front of the final MM amplifier fiber 112 to fully saturate the MM amplifier fiber 112 and to reduce the level of ASE in the MM amplifier fiber 112. The preamplifier can be SM and also MM, where it is useful to select the core radius of the preamplifier fiber 110 to be smaller than the core radius of the final MM amplifier fiber 112 to minimize the growth of ASE. One isolator (not shown) can be inserted between the laser source and the preamplifier and another isolator (not shown) can be inserted between the preamplifier 110 and the final MM amplifier fiber 112 further to reduce ASE. Similarly, narrow band optical filters (not shown) can be included anywhere in the system to reduce ASE. Also, optical switches (not shown) can be used in between the laser source, the preamplifier 110 and the final amplifier 112 to reduce the amount of ASE.

More than one preamplifier can be used in the system, where isolators and optical filters and optical switches can be used to minimize the amount of generated ASE in the system. Further, nonlinear processes in the preamplifiers and the final MM amplifier can be used for pulse compression.

According to a ninth embodiment of the present invention shown in FIG. 12, a frequency converter 120 is included downstream of the MM amplifier fiber 122 to frequency convert the output amplified beam. The frequency converter can be a non-linear crystal, such as a periodically-poled or aperiodically poled $LiNbO_3$ crystal which frequency doubles the output beam.

Although several exemplary embodiments have been herein shown and described, those of skill in the art will recognize that many modifications and variations are possible without departing from the spirit and scope of the invention, and it is intended to measure the invention only by the appended claims.

Abstract

To amplify and compress optical pulses in a multi-mode (MM) optical fiber, a single-mode is launched into the MM fiber by matching the modal profile of the fundamental mode of the MM fiber with a diffraction-limited optical mode at the launch end. The fundamental mode is preserved in the MM fiber by minimizing mode-coupling by using relatively short lengths of step-index MM fibers with a few hundred modes and by minimizing fiber perturbations. Doping is confined to the center of the fiber core to preferentially amplify the fundamental mode, to reduce amplified spontaneous emission and to allow gain-guiding of the fundamental mode. Gain-guiding allows for the design of systems with length-dependent and power-dependent diameters of the fundamental mode. To allow pumping with high-power laser diodes, a double-clad amplifier structure is employed. For applications in nonlinear pulse-compression, self phase modulation and dispersion in the optical fibers can be exploited. High-power optical pulses may be linearly compressed using bulk optics dispersive delay lines or by chirped fiber Bragg gratings written directly into the SM or MM optical fiber. High-power cw lasers operating in a single near-diffraction-limited mode may be constructed from MM fibers by incorporating effective mode-filters into the laser cavity. Regenerative fiber amplifiers may be constructed from MM fibers by careful control of the recirculating mode. Higher-power Q-switched fiber lasers may be constructed by exploiting the large energy stored in MM fiber amplifiers.

Additionally, U.S. Pat. No. 5,818,630 describes the writing of chirped fiber Bragg gratings onto multi-mode fibers with reduced mode-coupling to increase the power limits for linear pulse compression of high-power optical pulses. In that system, double-clad multi-mode fiber amplifiers are pumped with relatively large-area high-power semiconductor lasers. Further, the fundamental mode in the multi-mode fibers is excited by employing efficient mode-filters. By further using multi-mode fibers with low mode-coupling, the propagation of the fundamental mode in multi-mode amplifiers over lengths of several meters can be ensured, allowing the amplification of high-power optical pulses in doped multi-mode fiber amplifiers with core diameters of several tens of microns, while still providing a diffraction limited output beam. That system additionally employed cladding pumping by broad area diode array lasers to conveniently excite multi-mode fiber amplifiers.

Background Relating to Mode-Locked Lasers

Both actively mode-locked lasers and passively mode-locked lasers are well known in the laser art. For example, compact mode-locked lasers have been formed as ultra-short pulse sources using single-mode rare-earth-doped fibers. One particularly useful fiber pulse source is based on Kerr-type passive mode-locking. Such pulse sources have been assembled using widely available standard fiber components to provide pulses at the bandwidth limit of rare-earth fiber lasers with GigaHertz repetition rates.

Semiconductor saturable absorbers have recently found applications in the field of passively mode-locked, ultrashort pulse lasers. These devices are attractive since they are compact, inexpensive, and can be tailored to a wide range of laser wavelengths and pulsewidths. Quantum well and bulk semiconductor saturable absorbers have also been used to mode-lock color center lasers A saturable absorber has an intensity-dependent loss l. The single pass loss of a signal of intensity I through a saturable absorber of thickness d may be expressed as $$l = 1 - \exp(-\alpha d)$$

in which $\alpha$ is the intensity dependent absorption coefficient given by:

$$\alpha(I) = \alpha_0/(1 + I/I_{SAT})$$

Here $\alpha_0$ is the small signal absorption coefficient, which depends upon the material in question. $I_{SAT}$ is the saturation intensity, which is inversely proportional to the lifetime ($\tau_A$) of the absorbing species within the saturable absorber. Thus, saturable absorbers exhibit less loss at higher intensity.

Because the loss of a saturable absorber is intensity dependent, the pulse width of the laser pulses is shortened as they pass through the saturable absorber. How rapidly the pulse width of the laser pulses is shortened is proportional to $|dq_0/dI|$, in which $q_0$ is the nonlinear loss:

$$q_0 = l(I) - l(I=0)$$

$l(I=0)$ is a constant $(=1-\exp(-\alpha_0 d))$ and is known as the insertion loss. As defined herein, the nonlinear loss $q_0$ of a saturable absorber decreases (becomes more negative) with increasing intensity I. $|dq_0/dI|$ stays essentially constant until I approaches $I_{SAT}$, becoming essentially zero in the bleaching regime, i.e., when $I \gg I_{SAT}$.

For a saturable absorber to function satisfactorily as a mode-locking element, it should have a lifetime (i.e., the lifetime of the upper state of the absorbing species), insertion loss $l(I=0)$, and nonlinear loss $q_0$ appropriate to the laser. Ideally, the insertion loss should be low to enhance the laser's efficiency, whereas the lifetime and the nonlinear loss $q_0$ should permit self-starting and stable cw mode-locking. The saturable absorber's characteristics, as well as laser cavity parameters such as output coupling fraction, residual loss, and lifetime of the gain medium, all play a role in the evolution of a laser from startup to mode-locking.

As with single-mode fiber amplifiers, the peak-power of pulses from mode-locked single-mode lasers has been limited by the small fiber core size that has been employed to ensure single-mode operation of the fiber. In addition, in mode-locked single-mode fiber lasers, the round-trip nonlinear phase delay also needs to be limited to around 0 to prevent the generation of pulses with a very large temporally extended background, generally referred to as a pedestal. For a standard mode-locked single-mode erbium fiber laser operating at 1.55 μm with a core diameter of 10 μm and a round-trip cavity length of 2 m, corresponding to a pulse repetition rate of 50 MHz, the maximum oscillating peak power is thus about 1 KW.

The long-term operation of mode-locked single-mode fiber lasers is conveniently ensured by employing an environmentally stable cavity as described in U.S. Pat. No. 5,689,519, entitled Environmentally Stable Passively Mode-locked Fiber Laser Pulse Source, assigned to the assignee of the present invention, and hereby incorporated herein by reference. The laser described in this reference minimizes environmentally induced fluctuations in the polarization state at the output of the single-mode fiber. In the described embodiments, this is accomplished by including a pair of Faraday rotators at opposite ends of the laser cavity to compensate for linear phase drifts between the polarization eigenmodes of the fiber.

Recently the reliability of high-power single-mode fiber lasers passively mode-locked by saturable absorbers has been greatly improved by implementing non-linear power limiters by insertion of appropriate semiconductor two-photon absorbers into the cavity, which minimizes the peak power of the damaging Q-switched pulses often observed in the start-up of mode-locking and in the presence of misalignments of the cavity. See U.S. patent application Ser. No. 09/149,369, filed on Sep. 8, 1998, entitled Resonant Fabry-Perot Semiconductor Saturable Absorbers and Two-Photon Absorption Power Limiters, assigned to the assignee of the present invention, and hereby incorporated herein by reference.

To increase the pulse energy available from mode-locked single-mode fiber lasers the oscillation of chirped pulses inside the laser cavity has been employed. M. Hofer et al., Opt. Lett., vol. 17, page 807-809. As a consequence the pulses are temporally extended, giving rise to a significant peak power reduction inside the fiber laser. However, the pulses can be temporally compressed down to approximately the bandwidth limit outside the laser cavity. Due to the resulting high peak power, bulk-optic dispersive delay lines have to be used for pulse compression. For neodymium fiber lasers, pulse widths of the order of 100 fs can be obtained.

The pulse energy from mode-locked single-mode fiber lasers has also been increased by employing chirped fiber gratings. The chirped fiber gratings have a large amount of negative dispersion, broadening the pulses inside the cavity dispersively, which therefore reduces their peak power and also leads to the oscillation of high-energy pulses inside the single-mode fiber lasers.

See U.S. Pat. No. 5,450,427, entitled Technique for the Generation of Optical Pulses in Mode-Locked Lasers by Dispersive Control of the Oscillation Pulse Width, and U.S. Pat. No. 5,627,848, entitled Apparatus for Producing Femtosecond and Picosecond Pulses from Fiber Lasers Cladding Pumped with Broad Area Diode Laser Arrays, both of which are assigned to the assignee of the present invention and hereby incorporated herein by reference. In these systems, the generated pulses are bandwidth-limited, though the typical oscillating pulse widths are of the order of a few ps.

However, though the dispersive broadening of the pulse width oscillating inside a single-mode fiber laser cavity does increase the oscillating pulse energy compared to a 'standard' soliton fiber laser, it does not increase the oscillating peak power. The maximum peak power generated with these systems directly from the fiber laser is still limited to around 1 KW.

Another highly integratable method for increasing the peak power of mode-locked lasers is based on using chirped periodically poled $LiNbO_3$ (chirped PPLN). Chirped PPLN permits simultaneous pulse compression and frequency doubling of an optically chirped pulse. See U.S. patent application Ser. No. 08/845,410, filed on Apr. 25, 1997, entitled Use of Aperiodic Quasi-Phase-Matched Gratings in Ultrashort Pulse Sources, assigned to the assignee of the present application, and hereby incorporated herein by reference. However, for chirped PPLN to produce pulse compression from around 3 ps to 300 fs and frequency doubling with high conversion efficiencies, generally peak powers of the order of several KW are required. Such high peak powers are typically outside the range of mode-locked single-mode erbium fiber lasers.

Broad area diode laser arrays have been used for pumping of mode-locked single-mode fiber lasers, where very compact cavity designs were possible. The pump light was injected through a V-groove from the side of double-clad fiber, a technique typically referred to as side-pumping. However, such oscillator designs have also suffered from peak power limitations due to the single-mode structure of the oscillator fiber.

It has also been suggested that a near diffraction-limited output beam can be obtained from a multi-mode fiber laser when keeping the fiber length shorter than 15 mm and selectively providing a maximum amount of feedback for the fundamental mode of the optical fiber. "Efficient laser operation with nearly diffraction-limited output from a diode-pumped heavily Nd-doped multi-mode fiber", Optics Letters, Vol. 21, pp. 266-268 (1996) hereby incorporated herein by reference. In this technique, however, severe mode-coupling has been a problem, as the employed multi-mode fibers typically support thousands of modes. Also, only an air-gap between the endface of the multi-mode fiber and a laser mirror has been suggested for mode-selection. Hence, only very poor modal discrimination has been obtained, resulting in poor beam quality.

While the operation of optical amplifiers, especially in the presence of large seed signals, is not very sensitive to the presence of spurious reflections, the stability of mode-locked lasers critically depends on the minimization of spurious reflections. Any stray reflections produce sub-cavities inside an oscillator and result in injection signals for the cw operation of a laser cavity and thus prevent the onset of mode-locking. For solid-state Fabry-Perot cavities a suppression of intra-cavity reflections to a level <<1% (in intensity) is generally believed to be required to enable the onset of mode-locking.

The intra-cavity reflections that are of concern in standard mode-locked lasers can be thought of as being conceptually equivalent to mode-coupling in multi-mode fibers. Any mode-coupling in multi-mode fibers clearly also produces a sub-cavity with a cw injection signal proportional to the amount of mode-coupling. However, the suppression of mode-coupling to a level of <<1% at any multi-mode fiber discontinuities is very difficult to achieve. Due to optical aberrations, even well-corrected optics typically allow the excitation of the fundamental mode in multi-mode fibers only with maximum efficiency of about 95%. Therefore to date, it has been considered that mode-locking of a multi-mode fiber is impossible and no stable operation of a mode-locked multi-mode fiber laser has yet been demonstrated.

SUMMARY OF THE INVENTION

This invention overcomes the foregoing difficulties associated with peak power limitations in mode-locked lasers, and provides a mode-locked multi-mode fiber laser.

This laser utilizes cavity designs which allow the stable generation of high peak power pulses from mode-locked multi-mode fiber lasers, greatly extending the peak power limits of conventional mode-locked single-mode fiber lasers. Mode-locking may be induced by insertion of a saturable absorber into the cavity and by inserting one or more mode-filters to ensure the oscillation of the fundamental mode in the multi-mode fiber. The probability of damage of the absorber may be minimized by the insertion of an additional semiconductor optical power limiter into the cavity. The shortest pulses may also be generated by taking advantage of nonlinear polarization evolution inside the fiber. The long-term stability of the cavity configuration is ensured by employing an environmentally stable cavity. Pump light from a broad-area diode laser may be delivered into the multi-mode fiber by employing a cladding-pumping technique.

With this invention, a mode-locked fiber laser may be constructed to obtain, for example, 360 fsec near-bandwidth-limited pulses with an average power of 300 mW at a repetition rate of 66.7 MHz. The peak power of these exemplary pulses is estimated to be about 6 KW.

BRIEF DESCRIPTION OF THE DRAWINGS

The following description of the preferred embodiments of the invention references the appended drawings, in which like elements bear identical reference numbers throughout.

FIG. 11 of this application is FIG. 11 of U.S. Pat. No. 5,818,630 and is a block diagram of a multi-mode fiber amplifier system according to the eighth embodiment of the present invention, wherein a preamplifier is inserted before the multi-mode fiber.

FIG. 12 of this application is FIG. 12 of U.S. Pat. No. 5,818,630 and is a block diagram of a multi-mode fiber amplifier system according to the ninth embodiment of the present invention, wherein a frequency converter is disposed at an output of the multi-mode fiber.

DETAILED DESCRIPTION OF THE PREFERRED EMBODIMENT

Figure 1:
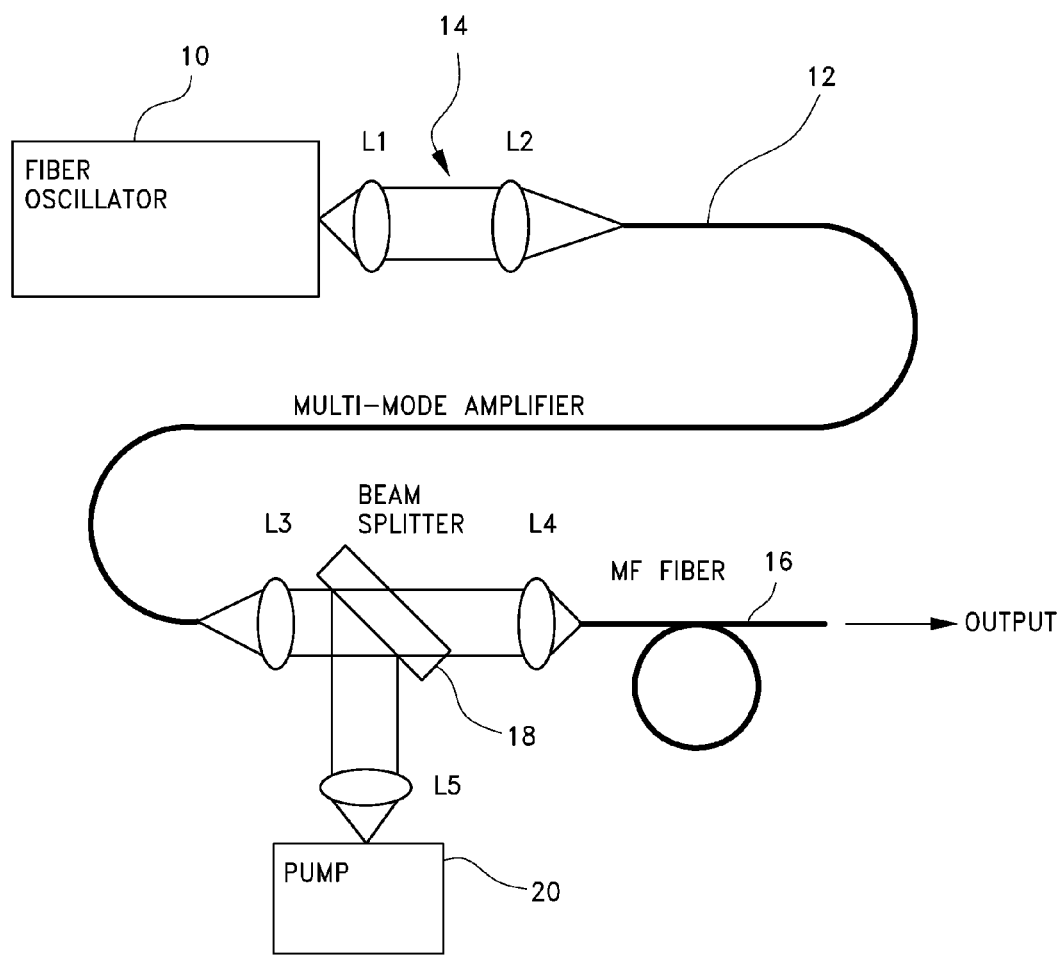
FIG. 1 of this application is FIG. 1 of U.S. Pat. No. 5,818,630 and is a diagrammatic view of a multi-mode fiber amplifier system according to the first embodiment of the present invention.
Figure 2:
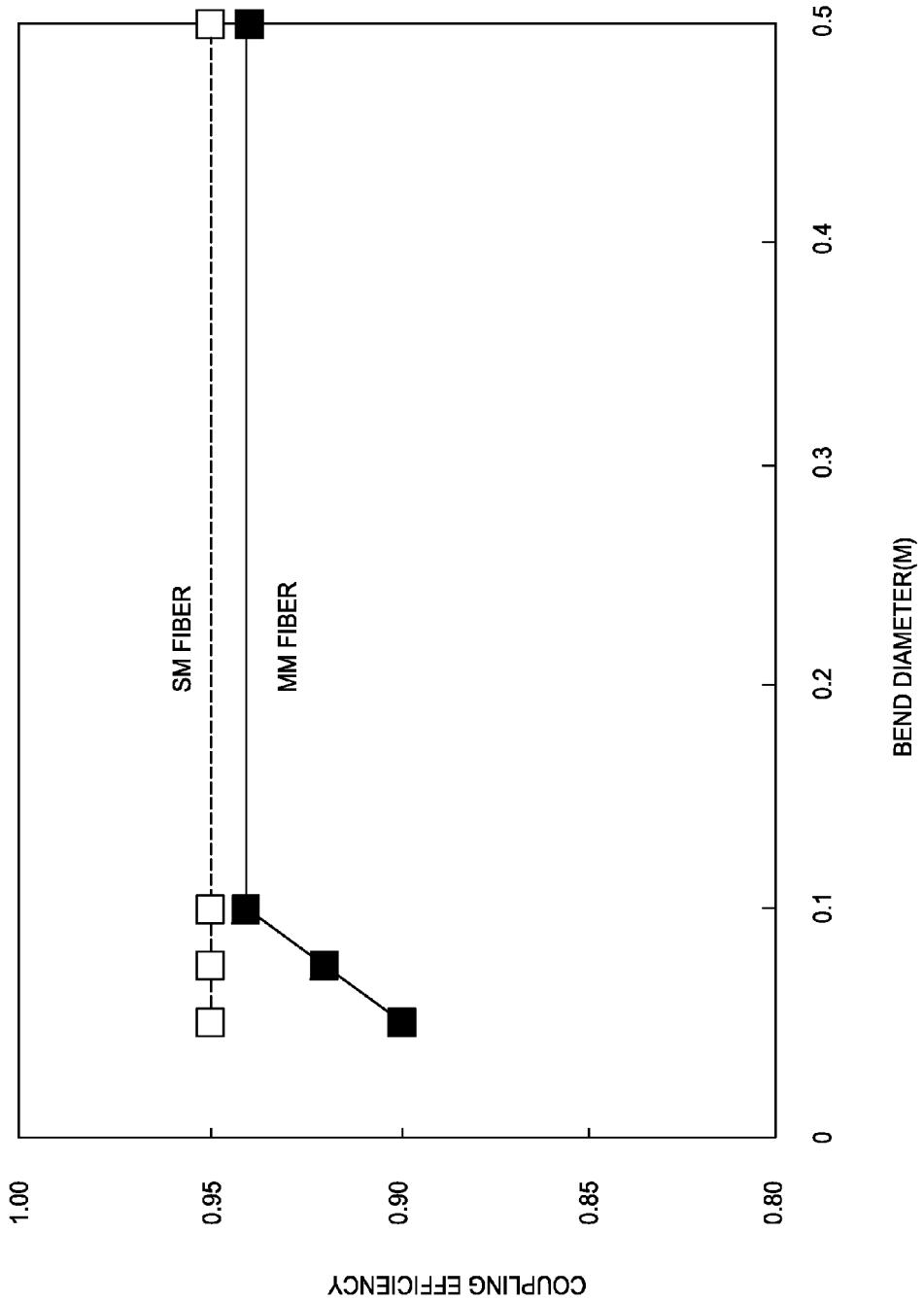
FIG. 2 of this application is FIG. 2 of U.S. Pat. No. 5,818,630 and is a graph showing the coupling efficiency of a multi-mode amplifier fiber into a mode-filter fiber as a function of bend-radius of the multi-mode amplifier fiber.
Figure 3:
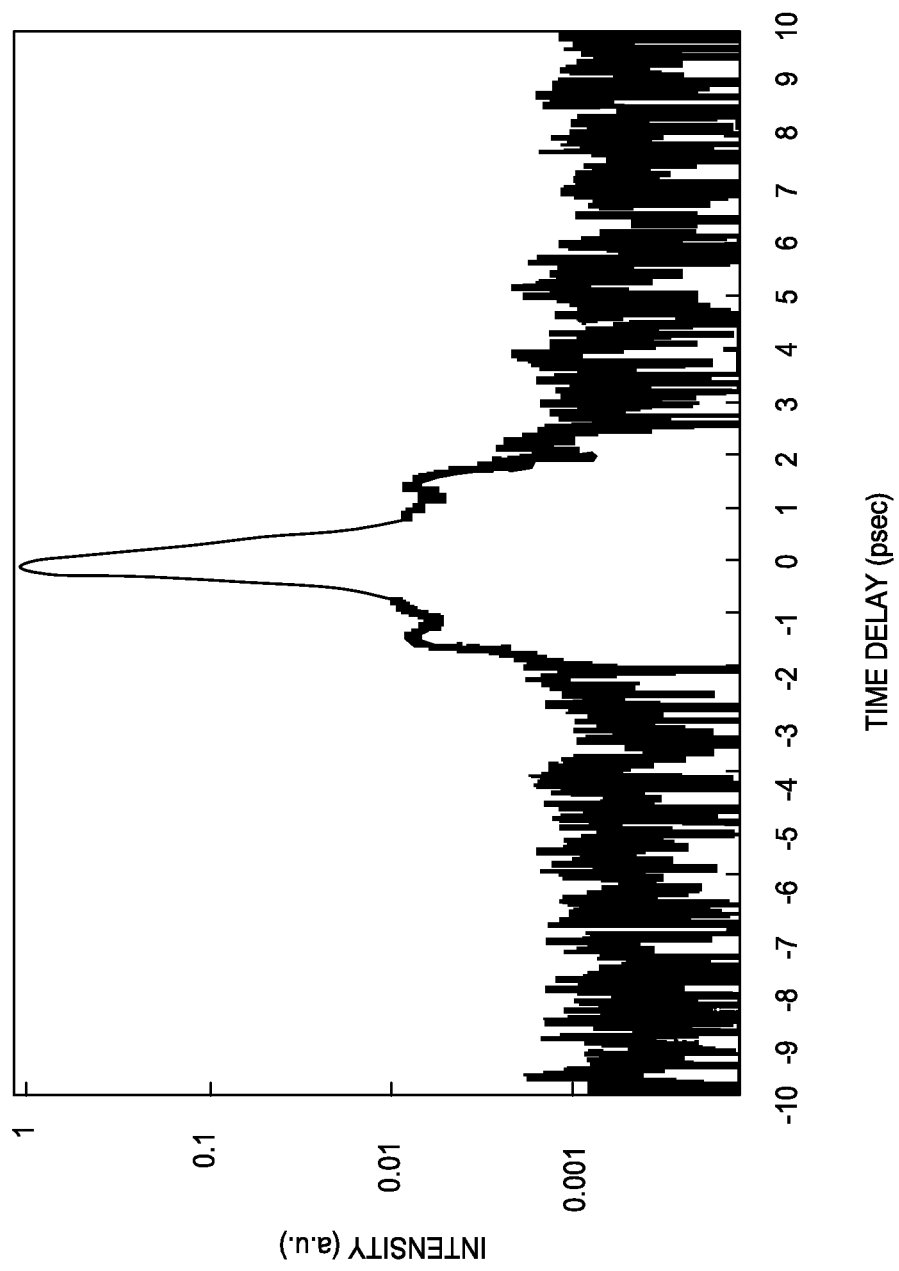
FIG. 3 of this application is FIG. 3 of U.S. Pat. No. 5,818,630 and is a graph showing the autocorrelation of the amplified pulses from a multi-mode amplifier fiber measured under optimum mode-match conditions.
Figure 4:
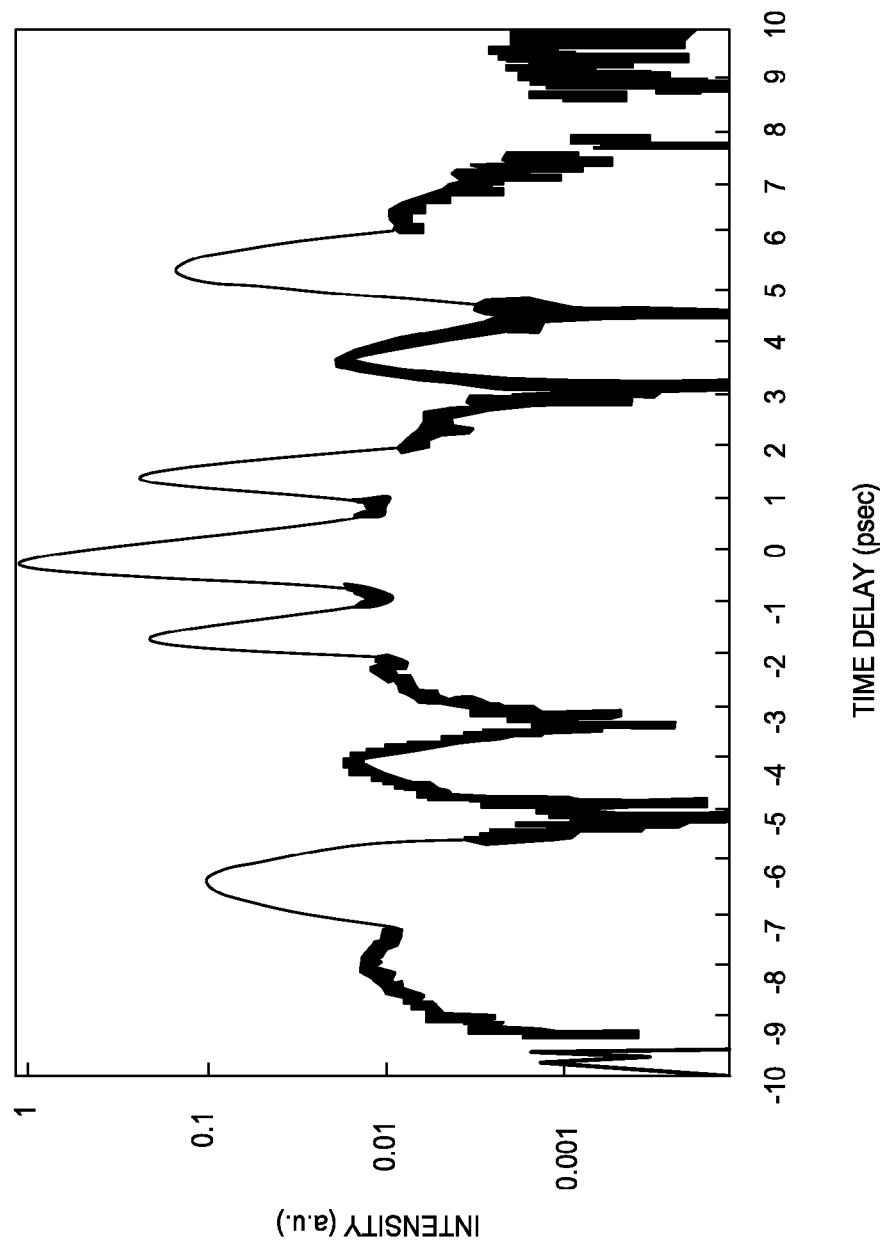
FIG. 4 of this application is FIG. 4 of U.S. Pat. No. 5,818,630 and is a graph showing the autocorrelation of the amplified pulses from a multi-mode amplifier fiber measured under non-optimum mode-match conditions.
Figure 5:
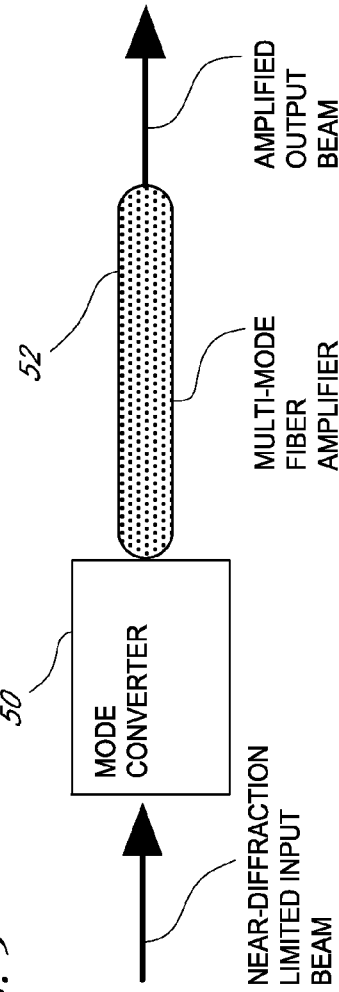
FIG. 5 of this application is FIG. 5 of U.S. Pat. No. 5,818,630 and is a block diagram of a multi-mode fiber amplifier system according to the second embodiment of the present invention.
Figure 6:
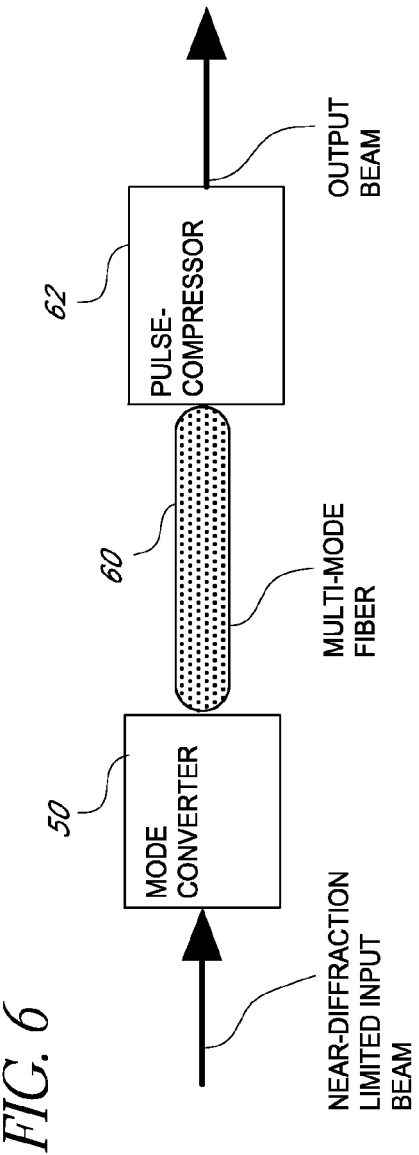
FIG. 6 of this application is FIG. 6 of U.S. Pat. No. 5,818,630 and is a block diagram of a multi-mode fiber amplifier system according to the third embodiment of the present invention, wherein a pulse compressor is disposed at an output of the multi-mode fiber.
Figure 7:
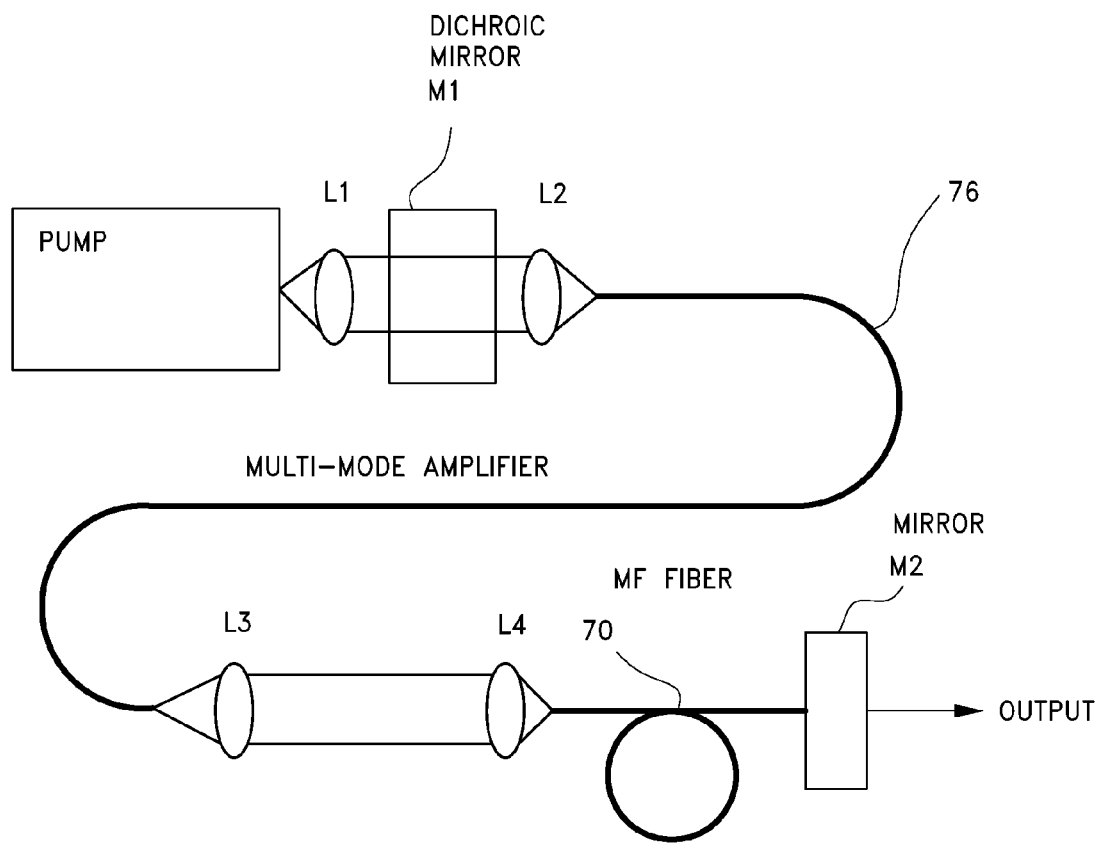
FIG. 7 of this application is FIG. 7 of U.S. Pat. No. 5,818,630 and is a diagrammatic view of a multi-mode fiber amplifier system according to a fourth embodiment of the present invention.
Figure 8:
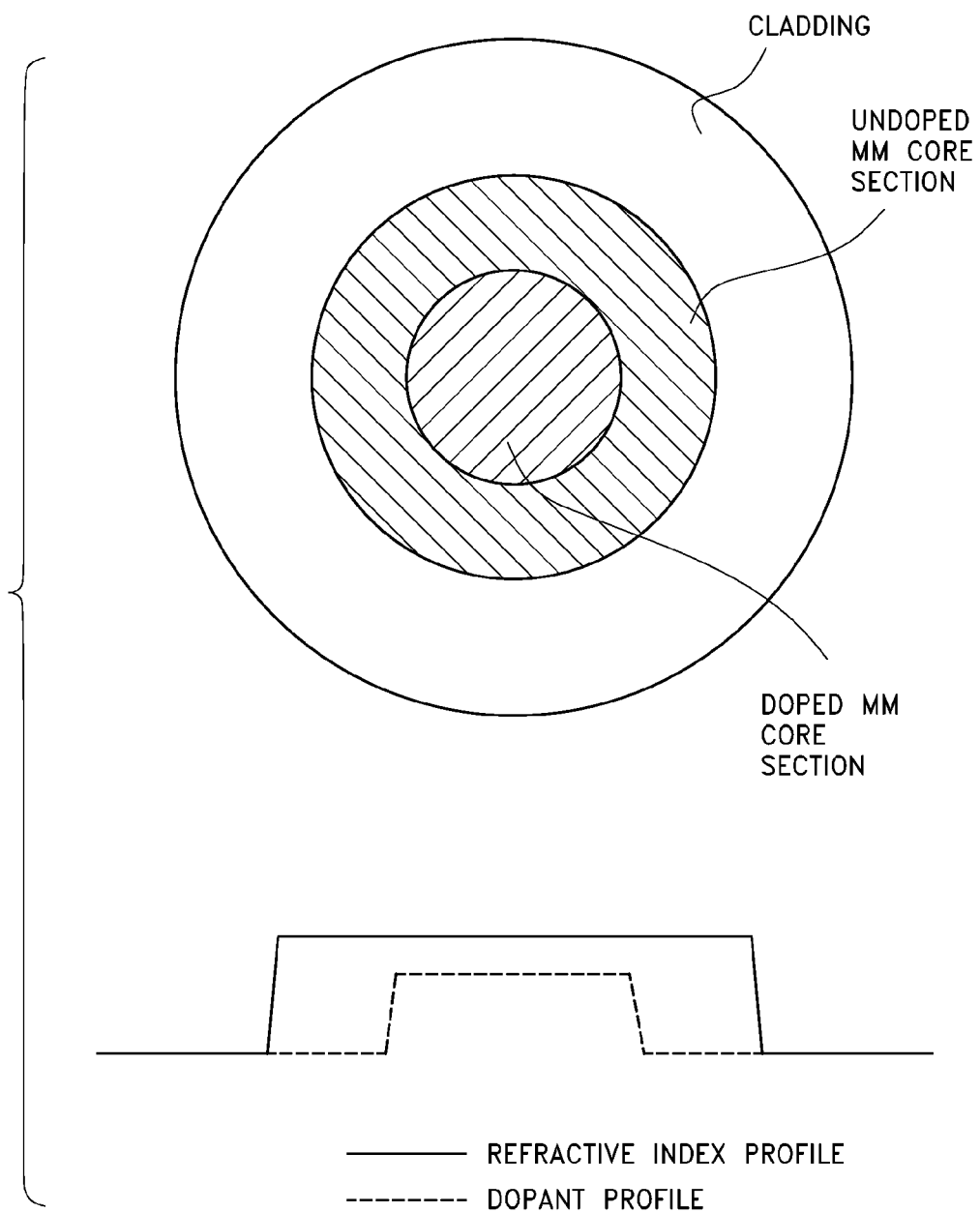
FIG. 8 of this application is FIG. 8 of U.S. Pat. No. 5,818,630 and is a conceptual drawing of a fiber cross section employing a doped multi-mode fiber core and an undoped fiber cladding according to a fifth embodiment of the present invention.
Figure 9:
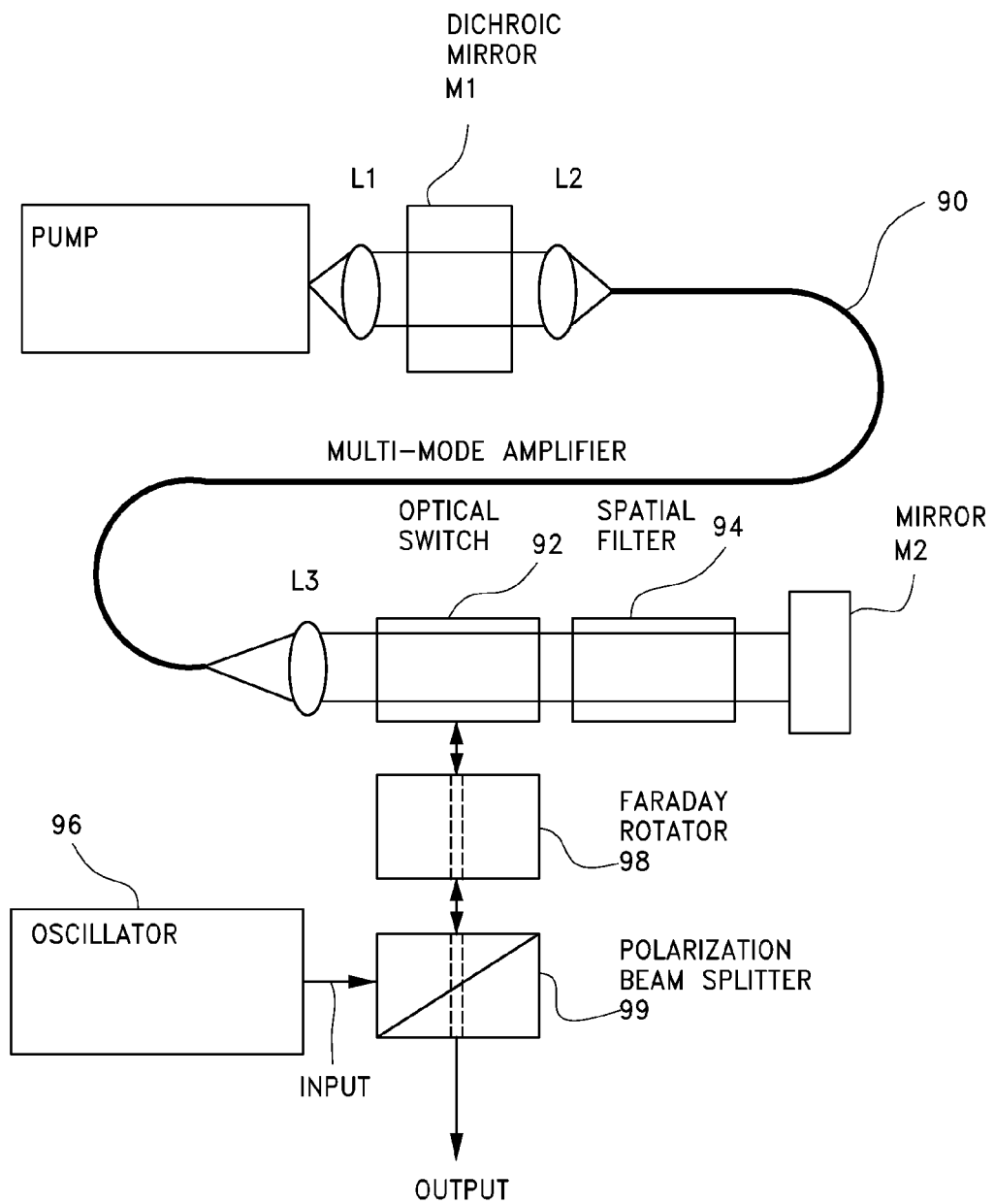
FIG. 9 of this application is FIG. 9 of U.S. Pat. No. 5,818,630 and is a diagrammatic view of a multi-mode fiber amplifier system according to a sixth embodiment of the present invention, wherein a fiber regenerative amplifier is constructed from a multi-mode fiber amplifier.
Figure 10:
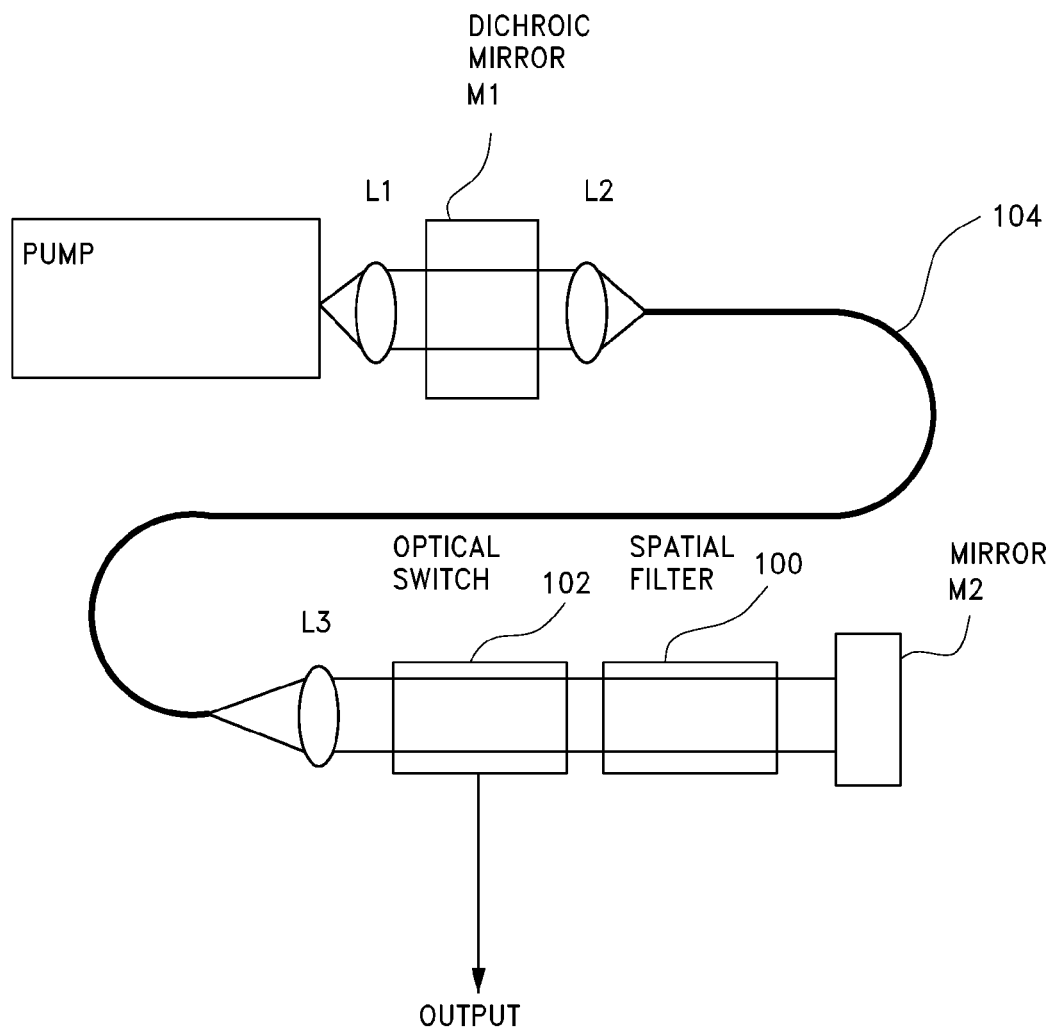
FIG. 10 of this application is FIG. 10 of U.S. Pat. No. 5,818,630 and is a diagrammatic view of a multi-mode fiber amplifier system according to a seventh embodiment of the present invention, wherein a MM Q-switched fiber laser source is constructed.
Figure 13:
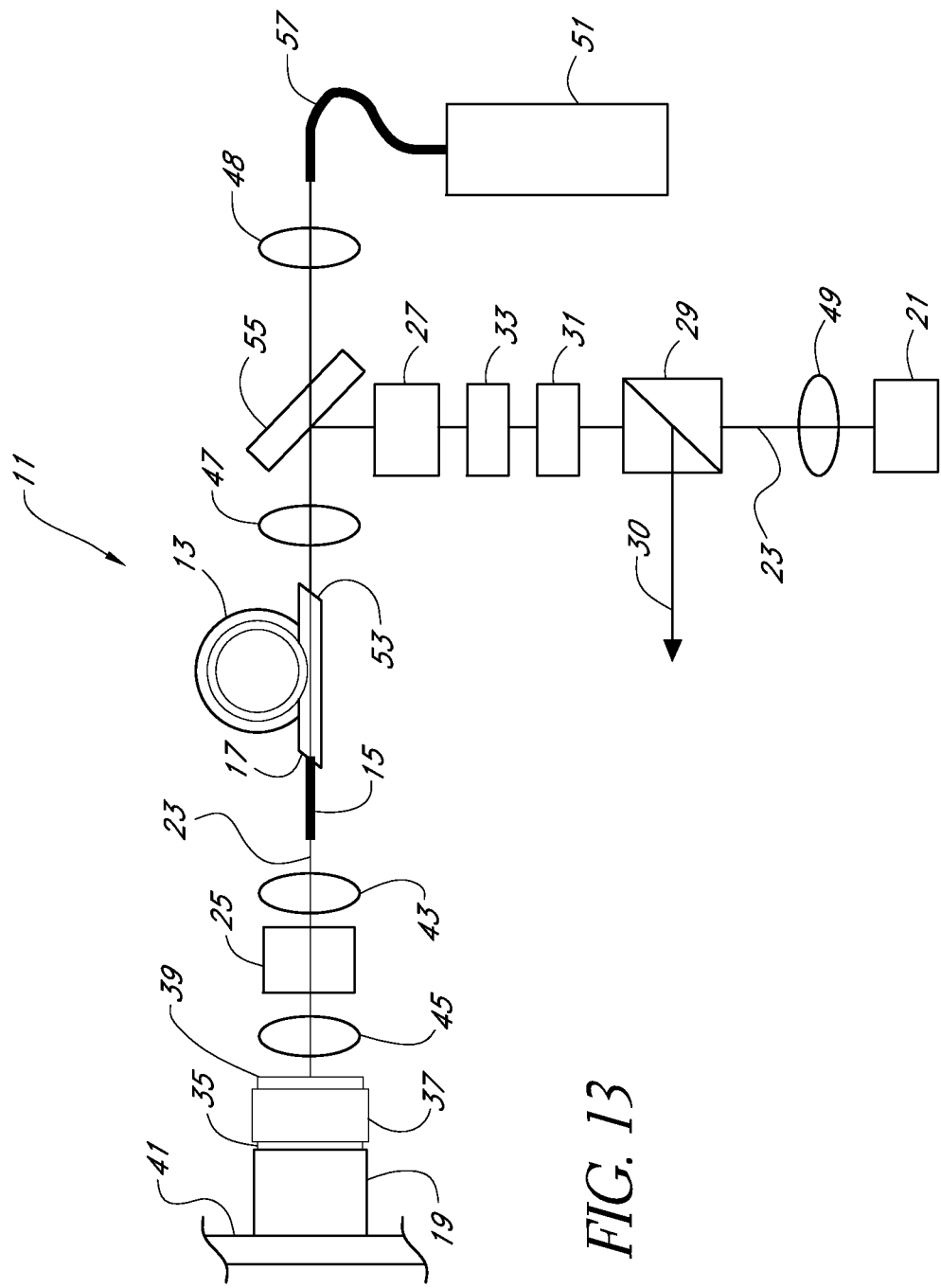
FIG. 13 is a schematic illustration showing the construction of a preferred embodiment of the present invention which utilizes end-pumping for injecting pump light into the multi-mode fiber.

FIG. 13 illustrates the mode-locked laser cavity 11 of this invention which uses a length of multi-mode amplifying fiber 13 within the cavity to produce ultra-short, high-power optical pulses. As used herein, "ultra-short" means a pulse width below 100 ps. The fiber 13, in the example shown, is a 1.0 m length of non-birefringent $Yb^{3+}/Er^{3+}$-doped multi-mode fiber. Typically, a fiber is considered multi-mode when the V-value exceeds 2.41, i.e., when modes in addition to the fundamental mode can propagate in the optical fiber. This fiber is coiled onto a drum with a diameter of 5 cm, though bend diameters as small as 1.5 cm, or even smaller, may be used without inhibiting mode-locking. Due to the $Er^{3+}$ doping, the fiber core in this example has an absorption of approximately 40 dB/m at a wavelength of 1.53 µm. The $Yb^{3+}$ co-doping produces an average absorption of 4.3 dB/m inside the cladding at a wavelength of 980 nm. The fiber 13 has a numerical aperture of 0.20 and a core diameter of 16 µm. The outside diameter of the cladding of the fiber 13 is 200 µm. The fiber 13 is coated with a low-index polymer producing a numerical aperture of 0.40 for the cladding. A 10 cm length of single-mode Corning Leaf fiber 15 is thermally tapered to produce a core diameter of approximately 14 µm to ensure an optimum operation as a mode filter, and this length is fusion spliced onto a first end 17 of the multi-mode fiber 13.

In this exemplary embodiment, the cavity 11 is formed between a first mirror 19 and a second mirror 21. It will be recognized that other cavity configurations for recirculating pulses are well known, and may be used. In this example, the mirrors 19, 21 define an optical axis 23 along which the cavity elements are aligned.

The cavity 11 further includes a pair of Faraday rotators 25, 27 to compensate for linear phase drifts between the polarization eigenmodes of the fiber, thereby assuring that the cavity remains environmentally stable. As referenced herein, the phrase "environmentally stable" refers to a pulse source which is substantially immune to a loss of pulse generation due to environmental influences such as temperature drifts and which is, at most, only slightly sensitive to pressure variations. The use of Faraday Rotators for assuring environmental stability is explained in more detail in U.S. Pat. No. 5,689,519 which has been incorporated by reference herein.

A polarization beam-splitter 29 on the axis 23 of the cavity 11 ensures single-polarization operation of the cavity 11, and provides the output 30 from the cavity. A half-wave plate 31 and a quarter-wave plate 33 are used to introduce linear phase delays within the cavity, providing polarization control to permit optimization of polarization evolution within the cavity 11 for mode-locking.

To induce mode-locking, the cavity 11 is formed as a Fabry-Perot cavity by including a saturable absorber 35 at the end of the cavity proximate the mirror 19. The saturable absorber 35 is preferably grown as a 0.75 µm thick layer of InGaAsP on one surface of a substrate. The band-edge of the InGaAsP saturable absorber 39 is preferably chosen to be 1.56 µm, the carrier life-time is typically 5 ps and the saturation energy density is 100 $MW/cm^2$.

In this example, the substrate supporting the saturable absorber 35 comprises high-quality anti-reflection-coated InP 37, with the anti-reflection-coated surface 39 facing the open end of the cavity 11. The InP substrate is transparent to single-photon absorption of the signal light at 1.56 µm, however two photon absorption occurs. This two-photon absorber 39 is used as a nonlinear power limiter to protect the saturable absorber 35.

The mirror 19 in this exemplary embodiment is formed by depositing a gold-film onto the surface of the InGaAsP saturable absorber 35 opposite the two photon absorber 39. The combined structure of the saturable absorber 35, two photon absorber 37 and mirror 19 provides a reflectivity of 50% at 1.56 µm. The surface of the gold-film mirror 19 opposite the saturable absorber 35 is attached to a sapphire window 41 for heat-sinking the combined absorber/mirror assembly.

The laser beam from the fiber 15 is collimated by a lens 43 and refocused, after rotation by the Faraday rotator 25, by a lens 45 onto the anti-reflection-coated surface 39 of the two-photon absorber 37. The spot size of the laser beam on the saturable absorber 35 may be adjusted by varying the position of the lens 45 or by using lenses with different focal lengths. Other focusing lenses 47 and 49 in the cavity 11 aid in better imaging the laser signal onto the multi-mode fiber 13.

Light from a Pump light source 51, such as a laser source, with a wavelength near 980 nm and output power of 5 W, is directed through a fiber bundle 57 with an outside diameter of 375 µm. This pump light is injected into the end 53 of the multi-mode fiber 13 opposite the single-mode fiber 17. The pump light is coupled into the cavity 11 via a pump signal injector 55, such as a dichroic beam-splitter for 980/1550 nm. Lenses 47 and 48 are optimized for coupling of the pump power from the fiber bundle 57 into the cladding of the multi-mode fiber.

The $M^2$-value of the beam at the output 30 of this exemplary embodiment is typically approximately 1.2. Assuming the deterioration of the $M^2$-value is mainly due to imperfect splicing between the multi-mode fiber 13 and the single-mode mode-filter fiber 15, it can be estimated that the single-mode mode-filter fiber 15 excited the fundamental mode of the multi-mode fiber 13 with an efficiency of approximately 90%.

Mode-locking may be obtained by optimizing the focussing of the laser beam on the saturable absorber 35 and by optimizing the orientation of the intra-cavity waveplates 31, 33 to permit some degree of nonlinear polarization evolution. However, the mode-locked operation of a multi-mode fiber laser system without nonlinear polarization evolution can also be accomplished by minimizing the amount of mode-mixing in the multi-mode fiber 13 and by an optimization of the saturable absorber 35.

Figure 14:
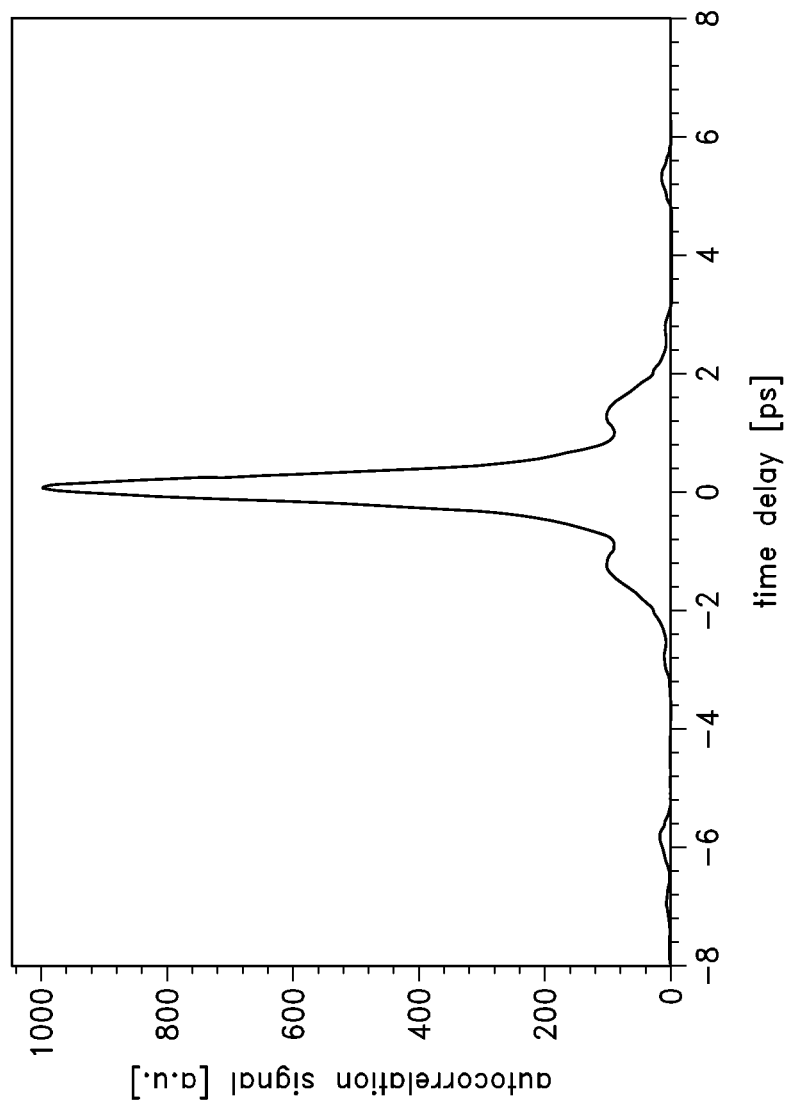
FIG. 14 is a graph showing the typical autocorrelation of pulses generated by the invention of FIG. 13.
Figure 15:
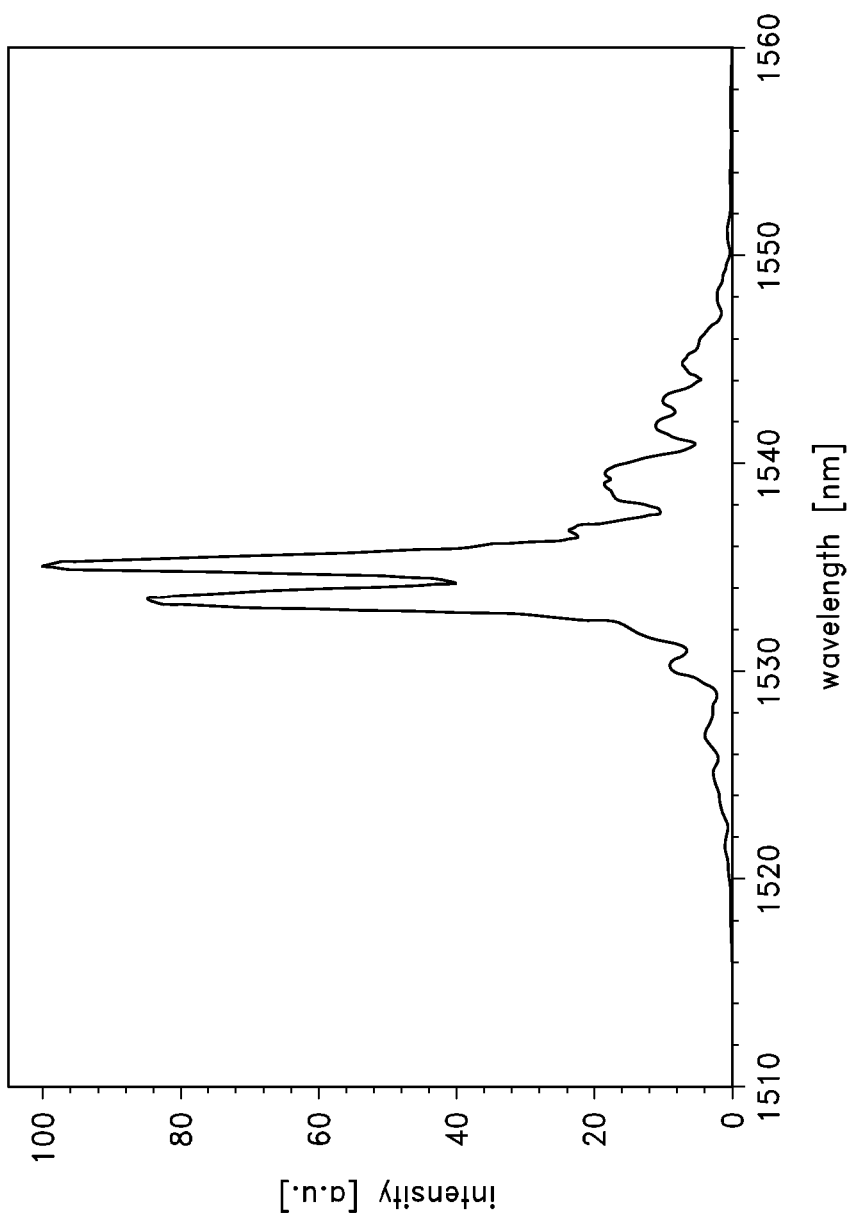
FIG. 15 is a graph showing the typical pulse spectrum generated by the invention of FIG. 13.

The pulses which are generated by the exemplary embodiment of FIG. 13 will have a repetition rate of 66.7 MHz, with an average output power of 300 mW at a wavelength of 1.535

μm, giving a pulse energy of 4.5 nJ. A typical autocorrelation of the pulses is shown in FIG. 14. A typical FWHM pulse width of 360 fsec (assuming a sech$^2$ pulse shape) is generated. The corresponding pulse spectrum is shown in FIG. 15. The autocorrelation width is within a factor of 1.5 of the bandwidth limit as calculated from the pulse spectrum, which indicates the relatively high quality of the pulses.

Due to the multi-mode structure of the oscillator, the pulse spectrum is strongly modulated and therefore the autocorrelation displays a significant amount of energy in a pulse pedestal. It can be estimated that the amount of energy in the pedestal is about 50%, which in turn gives a pulse peak power of 6 KW, about 6 times larger than what is typically obtained with single-mode fibers at a similar pulse repetition rate.

Neglecting the amount of self-phase modulation in one pass through the multi-mode fiber 13 and any self-phase modulation in the mode-filter 15, and assuming a linear increase of pulse power in the multi-mode fiber 13 in the second pass, and assuming an effective fundamental mode area in the multi-mode fiber 13 of 133 μm$^2$, the nonlinear phase delay in the multi-mode oscillator is calculated from the first equation above as $\Phi_{nl}$=1.45 7π, which is close to the expected maximum typical nonlinear delay of passively mode-locked lasers.

The modulation on the obtained pulse spectrum as well as the amount of generated pedestal is dependent on the alignment of the mirror 21. Generally, optimized mode-matching of the optical beam back into the fundamental mode of the multi-mode fiber leads to the best laser stability and a reduction in the amount of pedestal and pulse spectrum modulation. For this reason, optimized pulse quality can be obtained by improving the splice between the single-mode filter fiber 15 and the multi-mode fiber 13. From simple overlap integrals it can be calculated that an optimum tapered section of Corning SMF-28 fiber 15 will lead to an excitation of the fundamental mode in the multi-mode fiber 13 with an efficiency of 99%. Thus any signal in higher-order modes can be reduced to about 1% in an optimized system.

Figure 16:
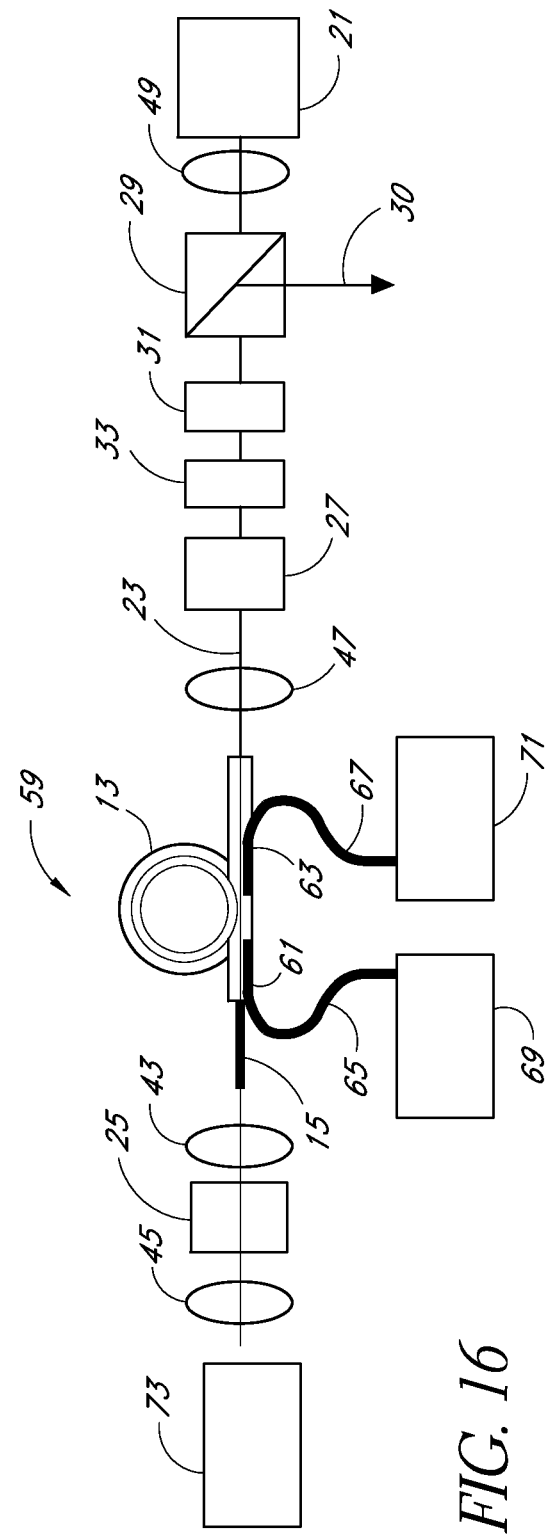
FIG. 16 is a schematic illustration showing the construction of an alternate preferred embodiment utilizing a side-pumping mechanism for injecting pump light into the multi-mode fiber.

An alternate embodiment of the invention is illustrated in FIG. 16. As indicated by the identical elements and reference numbers, most of the cavity arrangement in this figure is identical to that shown in FIG. 13. This embodiment provides a highly integrated cavity 59 by employing a side-pumping mechanism for injecting pump light into the multi-mode fiber 13. A pair of fiber couplers 61, 63, as are well known in the art, inject light from a respective pair of fiber bundles 65 and 67 into the cladding of the multi-mode fiber 13. The fiber bundles are similar to bundle 57 shown in FIG. 13, and convey light from a pair of pump sources 69 and 71, respectively. Alternatively, the fiber bundles 65, 67 and couplers 61, 63 may be replaced with V-groove light injection into the multi-mode fiber cladding in a manner well known in the art. A saturable absorber 73 may comprise the elements 35, 37, 39 and 41 shown in FIG. 13, or may be of any other well known design, so long as it provides a high damage threshold.

Figure 17:
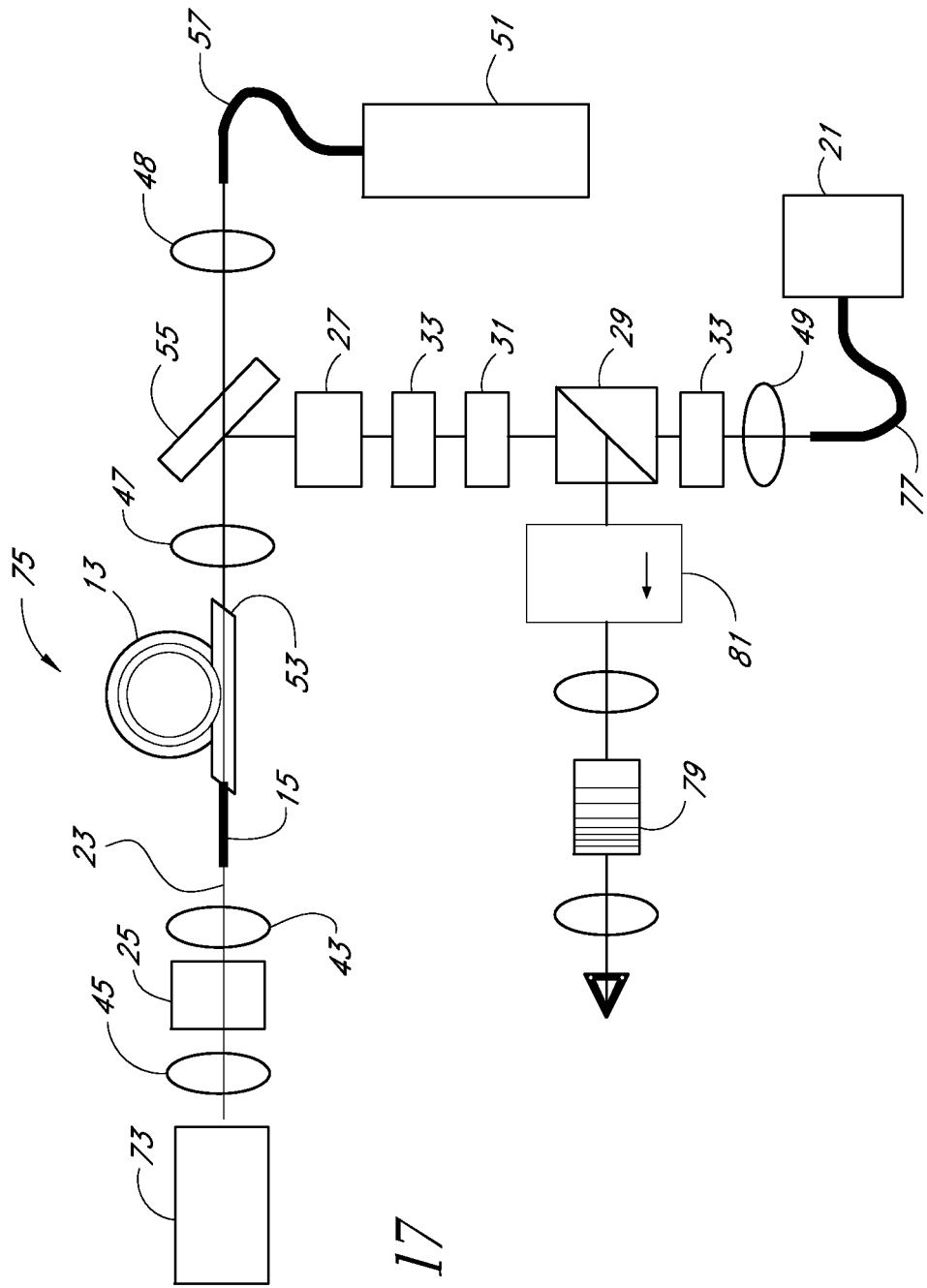
FIG. 17 is a schematic illustration of an alternative embodiment which uses a length of positive dispersion fiber to introduce chirped pulses into the cavity.

In another alternate embodiment of the invention, Illustrated in FIG. 17, the laser cavity 75 includes a positive dispersion element. As With FIG. 16, like reference numbers in FIG. 17 identify elements described in detail with reference to FIG. 13. In this embodiment, a section of single-mode positive dispersion fiber 77 is mounted between the second mirror 21 and the lens 49. In a similar manner, a section of positive dispersion fiber could be spliced onto the end 53 of the multi-mode fiber 13, or the end of the single-mode mode-filter 15 facing the lens 43. Positive dispersion fibers typically have a small core area, and may limit the obtainable pulse energy from a laser. The embodiment shown in FIG. 17 serves to reduce the peak power injected into the positive dispersion fiber 77, and thus maximize the pulse energy output. This is accomplished by extracting, at the polarization beam splitter 29, as much as 90-99% of the light energy.

In the embodiment of FIG. 17, the total dispersion inside the cavity may be adjusted to be zero to generate high-power pulses with a larger bandwidth. Alternatively, by adjusting the total cavity dispersion to be positive, chirped pulses with significantly increased pulse energies may be generated by the laser.

The use of two single-mode mode-filter fibers 15, 77 is also beneficial in simplifying the alignment of the laser. Typically, to minimize modal speckle, broad bandwidth optical signals need to be used for aligning the mode-filter fibers with the multi-mode fiber. The use of two mode-filter fibers 15, 77 allows the use of amplified spontaneous emission signals generated directly in the multi-mode fiber for an iterative alignment of both mode-filters 15, 77.

The chirped pulses generated in the cavity 75 with overall positive dispersion may be compressed down to approximately the bandwidth limit at the frequency doubled wavelength by employing chirped periodically poled LiNbO$_3$ 79 for sum-frequency generation, in a manner well known in the art. The chirped periodically poled LiNbO$_3$ 79 receives the cavity output from the polarization beam splitter 29 through an optical isolator 81. In this case, due to the high power capabilities of multi-mode fiber oscillators, higher frequency-doubling conversion efficiencies occur compared to those experienced with single-mode fiber oscillators. Alternatively, bulk-optics dispersion compensating elements may be used in place of the chirped periodically poled LiNbO$_3$ 79 for compressing the chirped pulses down to the bandwidth limit.

Generally, any nonlinear optical mixing technique such as frequency doubling, Raman generation, four-wave mixing, etc. may be used in place of the chirped periodically poled LiNbO$_3$ 79 to frequency convert the output of the multi-mode oscillator fiber 13 to a different wavelength. Moreover, the conversion efficiency of these nonlinear optical mixing processes is generally proportional to the light intensity or light intensity squared. Thus, the small residual pedestal present in a multi-mode oscillator would be converted with greatly reduced efficiency compared to the central main pulse and hence much higher quality pulses may be obtained.

Figure 18:
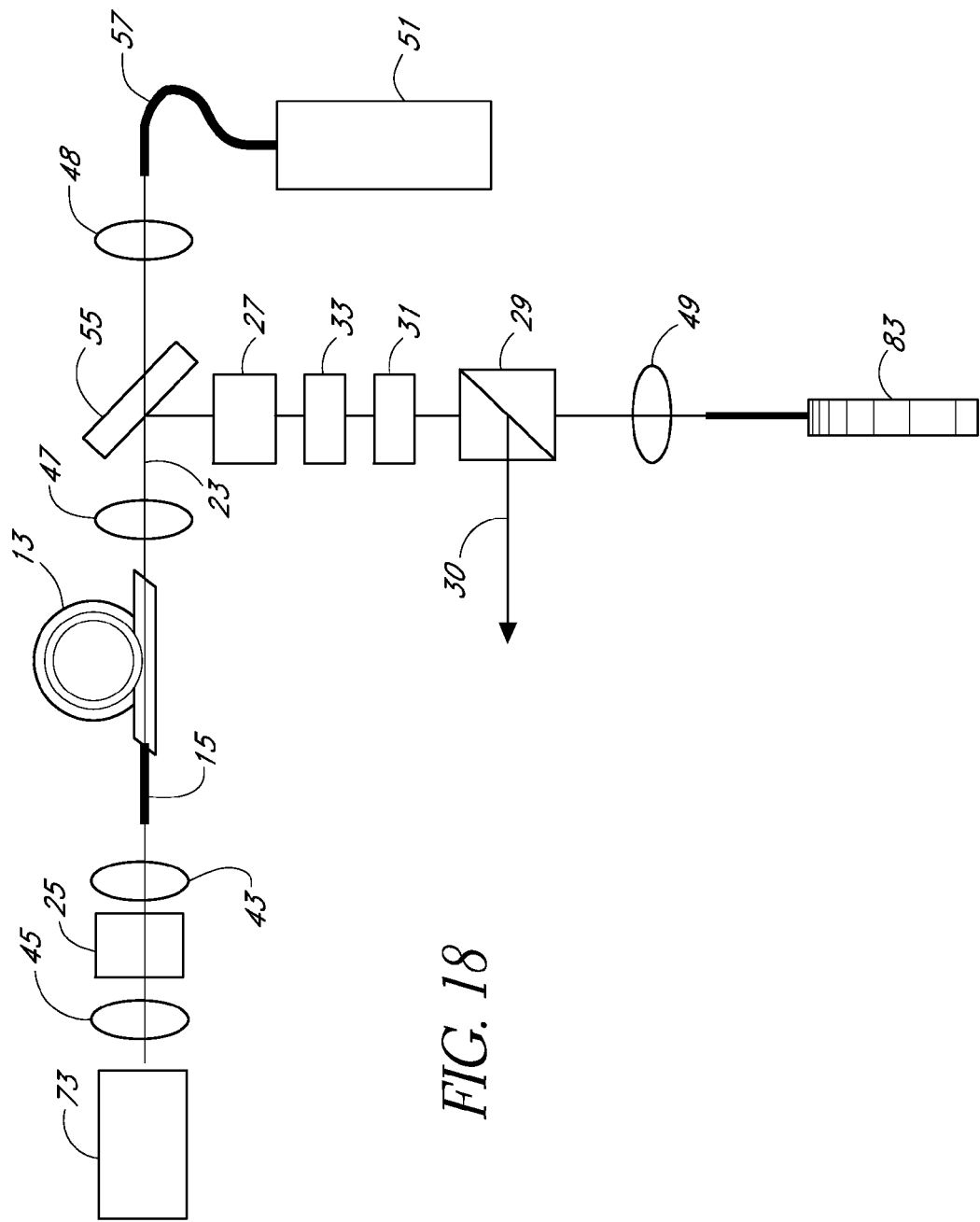
FIG. 18 is a schematic illustration of an alternative embodiment which uses chirped fiber gratings with negative dispersion in the laser cavity to produce high-energy, near bandwidth-limited pulses.

As shown in the alternate embodiment of FIG. 18, very high-energy optical pulses may also be obtained by inserting a chirped fiber grating such as a Bragg grating 83, with negative dispersion, into the cavity 85. Such a system typically produces ps length, high-energy, approximately bandwidth-limited pulses. Due to the multi-mode fiber used, much greater peak powers compared to single-mode fiber oscillators are generated. Here the fiber grating 83 is inserted after the polarization beam splitter 29 to obtain an environmentally-stable cavity even in the presence of nonpolarization maintaining multi-mode fiber 13.

In each of the embodiments of this invention, it is advantageous to minimize saturation of the multi-mode fiber amplifier 13 by amplified spontaneous emission generated in higher-order modes. This may be accomplished by confining the rare-earth doping centrally within a fraction of the core diameter.

Figure 19B:
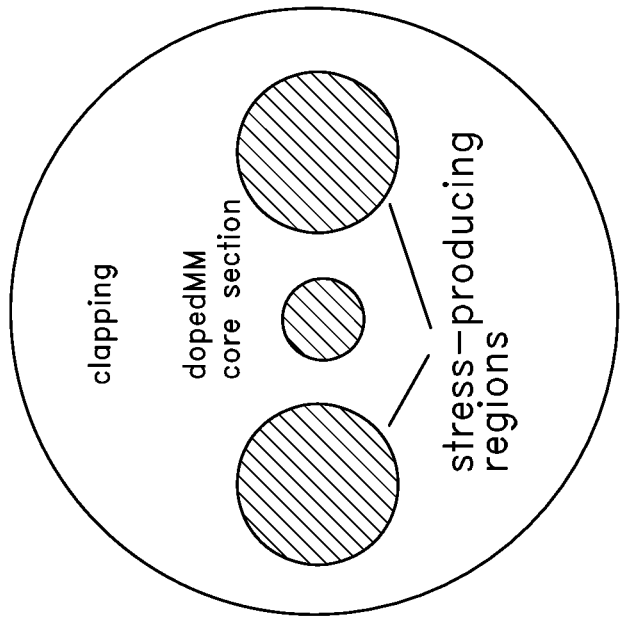
FIGS. 19A and 19B illustrate polarization-maintaining multi-mode fiber cross sections which may be used to construct environmentally stable cavities in the absence of Faraday rotators.
Figure 19A:
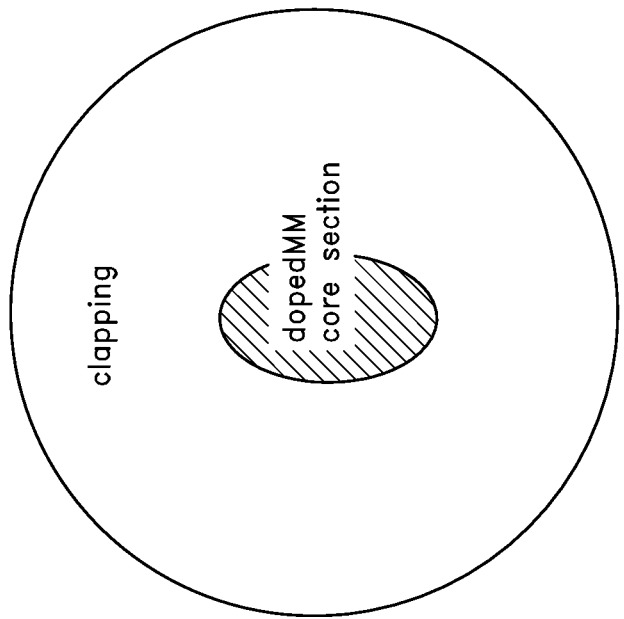
Figure 20:
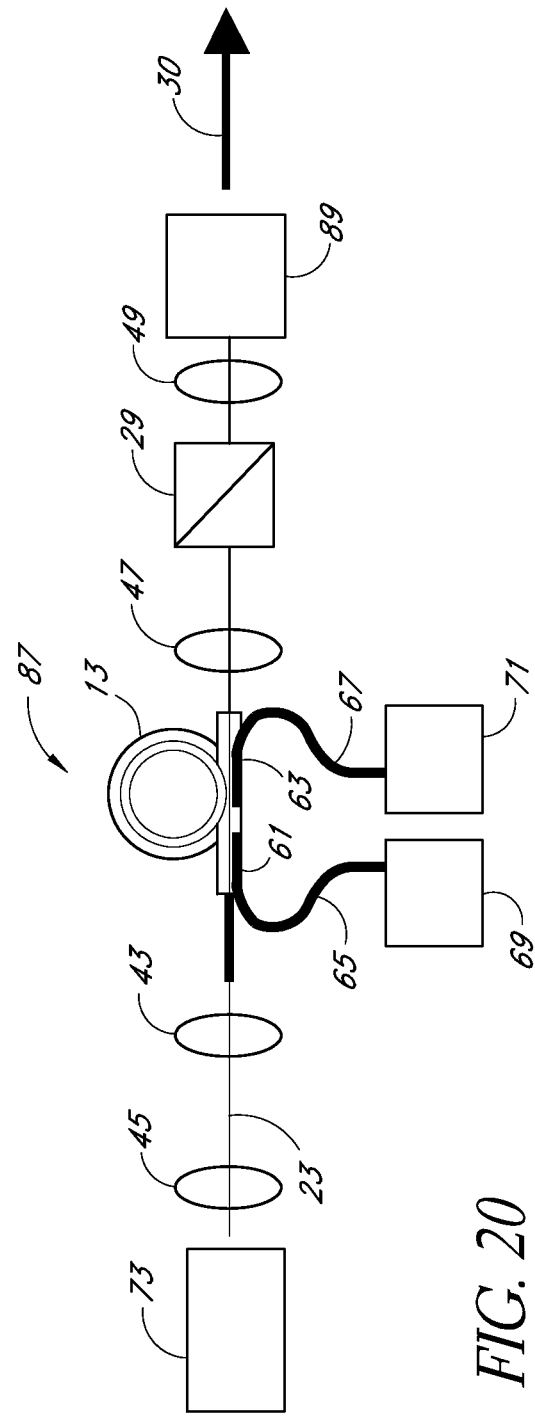
FIG. 20 is a schematic illustration of an alternative embodiment which utilizes one of the fibers illustrated in FIGS. 19A and 19B.

Polarization-maintaining multi-mode optical fiber may be constructed by using an elliptical fiber core or by attaching stress-producing regions to the multi-mode fiber cladding. Examples of such fiber cross-sections are shown in FIGS. 19A and 19B, respectively. Polarization-maintaining multi-mode fiber allows the construction of environmentally stable cavities in the absence of Faraday rotators. An example of such a design is shown in FIG. 20 in this case, the output of the cavity 87 is provided by using a partially-reflecting mirror 89 at one end of the cavity 87, in a manner well known in this art.

Figure 21A:
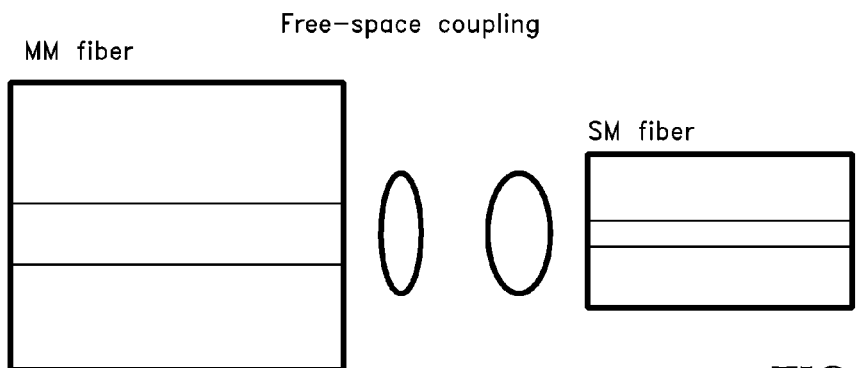
FIGS. 21A, 21B and 21C illustrate the manner in which the fundamental mode of the multi-mode fibers of the present invention may be matched to the mode of a single mode fiber. These include a bulk optic imaging system, as shown in FIG. 21A, a multi-mode to single-mode splice, as shown in FIG. 21B, and a tapered section of multi-mode fiber, as illustrated in FIG. 21C.
Figure 21B:
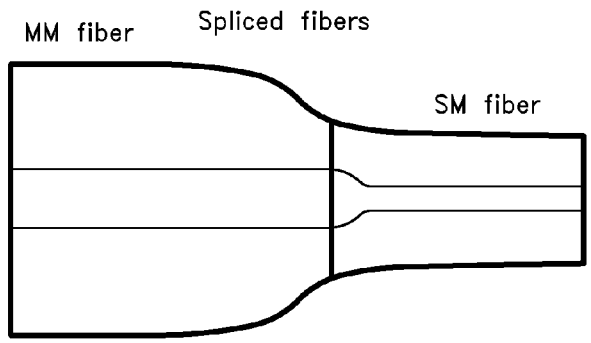
Figure 21C:
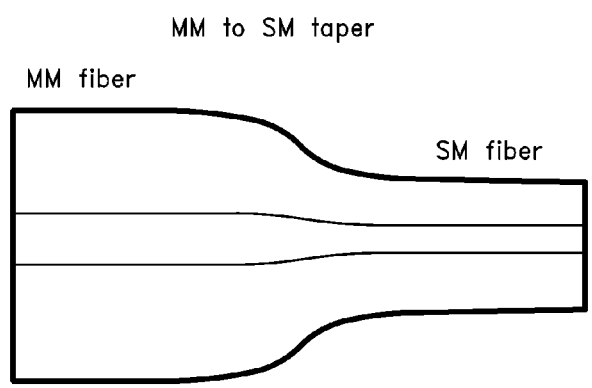

To ensure optimum matching of the fundamental mode of the multi-mode fiber 13 to the mode of the single-mode mode-filter fiber 15 in each of the embodiments of this invention, either a bulk optic imaging system, a splice between the multi-mode fiber 13 and the single-mode fiber 15, or a tapered section of the multi-mode fiber 13 may be used. For example, the multi-mode fiber 13, either in the form shown in one for FIG. 19A and FIG. 19B or in a non-polarization maintaining form may be tapered to an outside diameter of 70 μm. This produces an inside core diameter of 5.6 μm and ensures single mode operation of the multi-mode fiber at the tapered end. By further employing an adiabatic taper, the single-mode of the multi-mode fiber may be excited with nearly 100% efficiency. A graphic representation of the three discussed methods for excitation of the fundamental mode in an multi-mode fiber 13 with a single-mode fiber mode-filter 15 is shown in FIGS. 21A, 21B and 21C, respectively. The implementation in a cavity design is not shown separately, but the splice between the single-mode fiber 15 and the multi-mode fiber 15 shown in any of the disclosed embodiments may be constructed with any of the three alternatives shown in these figures.

Figure 22:
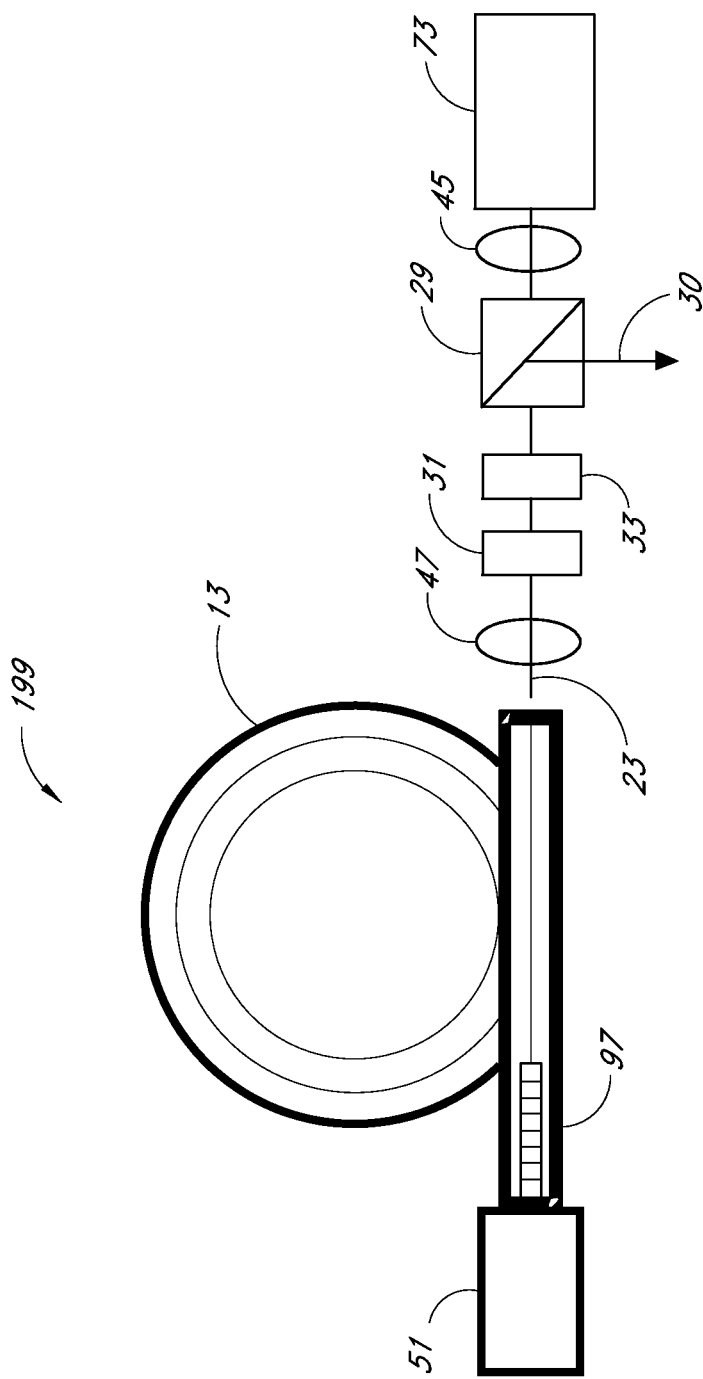
FIG. 22 is a schematic illustration of an alternative embodiment in which a fiber grating is used to predominantly reflect the fundamental mode of a multi-mode fiber.

FIG. 22 shows an additional embodiment of the invention. Here, instead of single-mode mode-filter fibers 15 as used in the previous embodiments, fiber gratings such as a Bragg grating directly written into the multi-mode fiber 13 is used to predominantly reflect the fundamental mode of the multi-mode fiber 13. Light from the pump 51 is injected through the fiber grating 97 to facilitate a particularly simple cavity design 199. Both chirped fiber gratings 97 as well as unchirped gratings can be implemented. Narrow bandwidth (chirped or unchirped) gratings favor the oscillation of pulses with a bandwidth smaller than the grating bandwidth.

Figure 23:
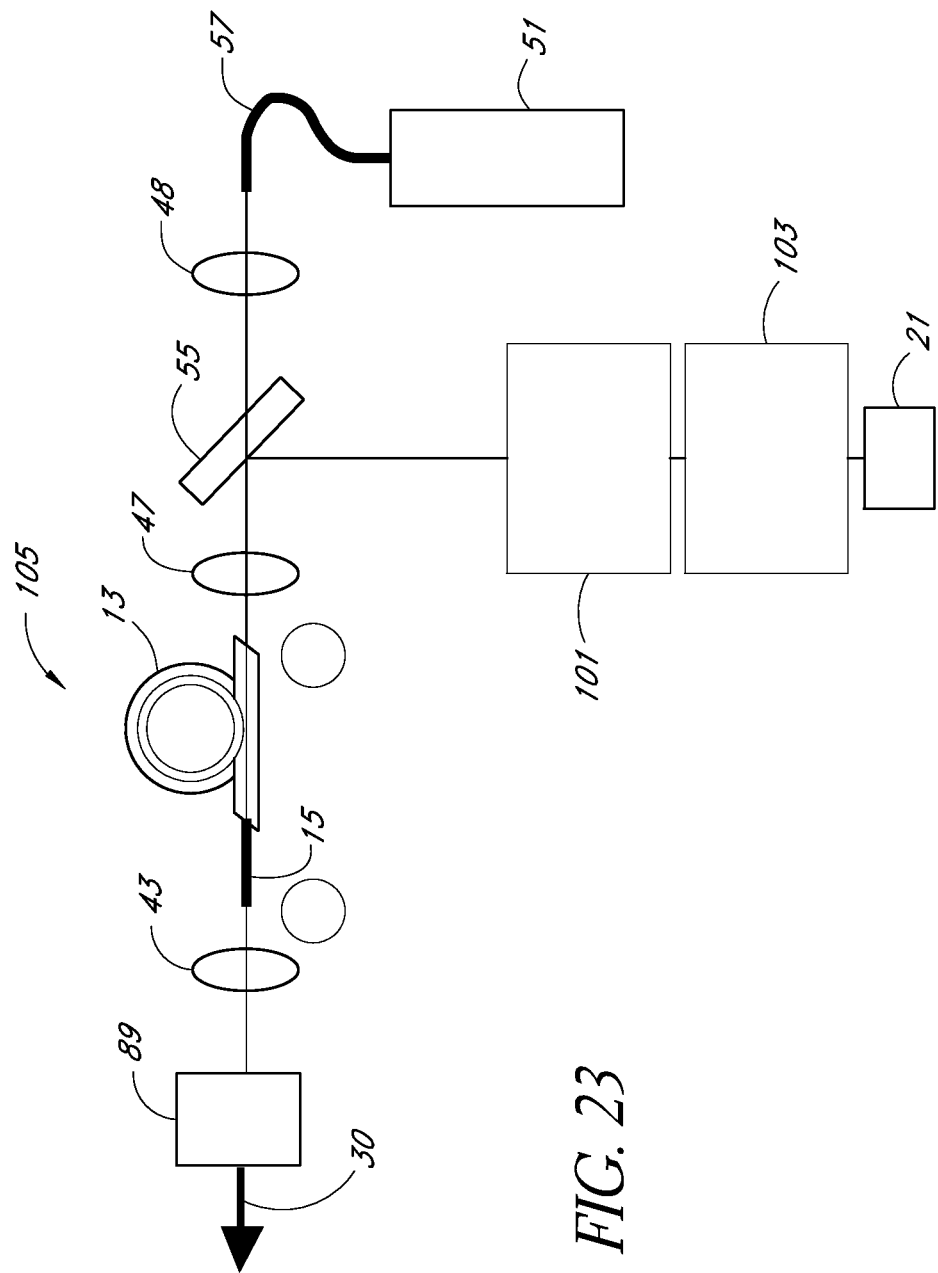
FIG. 23 is a schematic illustration of an alternative embodiment in which active or active-passive mode-locking is used to mode-lock the multi-mode laser.

Finally, instead of passive mode-locking, active mode-locking or active-passive mode-locking techniques may be used to mode-lock multi-mode fibers. For example, an active-passive mode-locked system could comprise an optical frequency or amplitude modulator (as the active mode-locking mechanism) in conjunction with nonlinear polarization evolution (as the passive mode-locking mechanism) to produce short optical pulses at a fixed repetition rate without a saturable absorber. A diagram of a mode-locked multi-mode fiber 13 with an optical mode-locking mechanism 101 is shown in FIG. 23. Also shown is an optical filter 103, which can be used to enhance the performance of the mode-locked laser 105.

Generally, the cavity designs described herein are exemplary of the preferred embodiments of this invention. Other variations are obvious from the previous discussions. In particular, optical modulators, optical filters, saturable absorbers and a polarization control elements are conveniently inserted at either cavity end. Equally, output coupling can be extracted at an optical mirror, a polarization beam splitter or also from an optical fiber coupler attached to the single-mode fiber filter 15. The pump power may also be coupled into the multi-mode fiber 13 from either end of the multi-mode fiber 13 or through the side of the multi-mode fiber 13 in any of the cavity configurations discussed. Equally, all the discussed cavities may be operated with any amount of dispersion. Chirped and unchirped gratings may be implemented at either cavity end to act as optical filters and also to modify the dispersion characteristics of the cavity.

What is claimed is:

1. A light amplifier for amplifying light from a near-diffraction-limited laser source, the light amplifier comprising:
   a length of multi-mode optical fiber, said multi-mode optical fiber including a gain medium;
   a length of single-mode optical fiber optically coupled to the length of multi-mode optical fiber, a fundamental mode of said multi-mode fiber matched to the mode of the single mode fiber,
   an energy source for exciting said gain medium, said energy source arranged for side pumping said optical fiber, and
   an input optically coupled to said multi-mode fiber, said input comprising a near-diffraction-limited laser source providing a nearly diffraction limited input beam having a signal wavelength, said input comprising said length of single-mode optical fiber, said multi-mode fiber providing an output beam having the signal wavelength that is amplified by said gain medium, wherein said output beam having the signal wavelength is substantially in the fundamental mode at an output of said light amplifier,
   wherein said light amplifier is configured to provide a peak output power greater than 10 KW for the output beam having the signal wavelength.

2. The light amplifier of claim 1, wherein said input comprises a section of tapered fiber.

3. The light amplifier of claim 2, wherein an output mode from the tapered fiber is matched to the fundamental mode of the multi-mode fiber.

4. The light amplifier of claim 1, said near-diffraction limited laser source comprising a cw fiber laser.

5. The light amplifier of claim 1, wherein said light amplifier provides a peak output power greater than 20 KW/amplifier length for the output beam having the signal wavelength.

6. The light amplifier of claim 1, wherein said multi-mode optical fiber comprises a core, said gain medium is concentrated centrally in said core, and wherein mode-coupling into higher-order modes is reduced by gain-guiding and the fundamental mode is preferentially amplified.

\* \* \* \* \*